US005732222A

United States Patent [19]

Miyagawa et al.

[11] Patent Number: 5,732,222

[45] Date of Patent: Mar. 24, 1998

[54] ELECTION TERMINAL APPARATUS

[75] Inventors: Takayoshi Miyagawa; Shigenori Matsushita; Takayuki Tsuchida; Yoshiyuki Miura; Naoko Shimojima; Katsutoshi Ishikawa; Kunio Ueda, all of Tokyo, Japan

[73] Assignees: Kabushiki Kaisha Toshiba, Kawasaki; The Center for Political Public Relations, Inc., Tokyo, both of Japan

[21] Appl. No.: 530,532

[22] Filed: Sep. 20, 1995

Related U.S. Application Data

[62] Division of Ser. No. 93,675, Jul. 20, 1993, Pat. No. 5,497, 318.

[30] Foreign Application Priority Data

| | | | |
|---|---|---|---|
| Jul. 20, 1992 | [JP] | Japan | 4-192192 |
| Jul. 20, 1992 | [JP] | Japan | 4-192303 |
| Jul. 20, 1992 | [JP] | Japan | 4-192306 |

[51] Int. Cl.$^6$ .............................. G06F 17/60; G06G 7/48; G06G 13/00

[52] U.S. Cl. ............................ 395/212; 235/51; 395/352; 395/353

[58] Field of Search .................................... 395/201, 212, 395/601, 326, 389, 352, 353, 354; 235/51, 50 R, 50 A, 50 B, 54 R, 54 T, 56; 345/173, 174, 175, 183

[56] References Cited

U.S. PATENT DOCUMENTS

| | | | |
|---|---|---|---|
| 3,779,453 | 12/1973 | Kirby et al. | 235/54 F |
| 3,866,826 | 2/1975 | O'Neal et al. | 235/54 A |
| 3,909,785 | 9/1975 | Howells | 382/187 |

(List continued on next page.)

FOREIGN PATENT DOCUMENTS

| | | |
|---|---|---|
| 0 420 354 | 4/1991 | European Pat. Off. . |
| 40 00 133 | 7/1991 | Germany . |

OTHER PUBLICATIONS

Dialog Record—MIS Week, vol. 11, No. 4, 3 pgs, Jan. 22, 1990, Laurence Swasey, "School District Builds Election System Virtually Overnight with a 4GL; 600 Chicago Schools to Use a Multitude of 4GL–Built Applications".

Dialog Record, Network Computing, 4 pgs, Feb. 1992, Timothy Haight, "Can Network Computing Save The Nation".

Dialog Record, Capitol Publications, Inc., vol. 10, No. 28, 3 pgs, Jul. 13, 1992, "AT&T Has Presidential Convention Sweep, HDTV DEMO In N.Y.".

Dialog Record, PR Newswire, 4 pgs, Jun. 30, 1992, "USA: Democratic National Convention Committee Names AT&T Official Technology and Long–Distance Provider".

Dialog Record, Telephone News, vol. 13, No. 14, 2 pgs, Jul. 13, 1992, "Telephones—And Companies—Take Part in Presidential Convention Processes".

(List continued on next page.)

*Primary Examiner*—Gail O. Hayes
*Assistant Examiner*—Stephen R. Tkacs
*Attorney, Agent, or Firm*—Oblon, Spivak, McClelland, Maier & Neustadt, P.C.

[57] ABSTRACT

An election terminal apparatus includes an integral-type display/input unit constituted by a liquid crystal display unit and a tablet unit for input data. The display unit displays a first screen including icons corresponding to candidates. A voter operates the tablet unit to designate a candidate for whom he/she wants to vote. The election terminal apparatus discriminates the candidate designated by the voter, and causes the liquid crystal display unit to display an image for allowing the voter to input the candidate name or the like with handwriting. When the voter handwrites the candidate name or the like on the table unit, the election terminal apparatus performs character recognition with respect to the handwritten pattern. When a candidate specified by the recognized characters coincides with the candidate designated first, the election terminal apparatus increments the vote count of the candidate by one.

1 Claim, 57 Drawing Sheets

U.S. PATENT DOCUMENTS

| | | | |
|---|---|---|---|
| 3,947,669 | 3/1976 | Simmons et al. | 395/212 |
| 4,641,240 | 2/1987 | Boram | 395/212 |
| 4,672,677 | 6/1987 | Yamakawa | 382/185 |
| 4,774,665 | 9/1988 | Webb | 395/212 |
| 5,056,886 | 10/1991 | Libonati | 370/259 |
| 5,189,288 | 2/1993 | Anno et al. | 235/886 |

OTHER PUBLICATIONS

Dialog Record, Common Carrier Week, 1 pg, Apr. 6, 1992, "Prodigy's High-Tech Political Contributions".

Dialog Record, Communications Daily, vol. 12, No. 4, 1 pg, Jan. 7, 1992, "Telephony".

| CANDIDATE NAME | VALID CANDIDATE NAME DATA | PLURAL CANDIDATE |
|---|---|---|
| DAN DURDA | DAN<br>DURDA<br>DAN D.<br>DAM DURDA<br>D.D<br>D.DURDA<br>⋮ | PRESENT |
| DAN CROSWELL | DAN<br>CROSWELL<br>DAN C.<br>D.C<br>⋮ | PRESENT |

FIG. 77

FIG. 78A DAN DURDA

FIG. 78B DAN

FIG. 78C D.DURDA

ELECTION TERMINAL APPARATUS

This is a division of application Ser. No. 08/093,675 filed on Jul. 20, 1993, now U.S. Pat. No. 5,497,318.

BACKGROUND OF THE INVENTION

1. Field of the Invention

The present invention relates to a computer terminal apparatus used for voting and totaling the votes cast in an election, and an electronic system for voting and totaling the votes cast in an election.

2. Description of the Related Art

Conventionally, in presidential elections, elections of Diet members, and the like, voters go to polling stations, where they write candidate names on ballot papers and cast the ballot papers into ballot boxes. Thereafter, vote counting and totaling of election returns are manually performed.

As described above, in the conventional voting at elections, voting operations, totaling operations, and the like are not automated much. Therefore, it takes much time to perform voting and totaling operations. In addition, vote totaling errors often occur.

A conventional method of making entries on ballot papers is based on a verbal explanation given by an attendant in a polling station when the attendant hands a ballot paper to a voter, and a notice put up at a place where the voter makes an entry on the ballot paper. Some voters sometimes cannot properly understand the method of making entries on ballot papers.

In some cases, it is difficult for voters to acquire accurate, detailed information associated with candidates at a polling station.

SUMMARY OF THE INVENTION

The present invention has been made in consideration of the above situation, and has as its first object to provide a computer terminal apparatus and a computer system, which can be used for voting and totaling operations and the like.

It is the second object of the present invention to provide an election terminal apparatus which can provide detailed information associated with each candidate and which allows voters to smoothly select candidates in voting.

It is the third object of the present invention to provide an election terminal apparatus which can teach the respective voting methods to voters.

It is the fourth object of the present invention to provide an election terminal apparatus which allows election observers to easily recognize the condition of voting by voters and voting stages.

It is the fifth object of the present invention to provide an election terminal apparatus which can easily total election returns.

In order to achieve the above objects, an election terminal apparatus according to the present invention has:

first display means for displaying an item of candidates;

selection means for selecting one of the candidates displayed by the first display means;

second display means, responsive to the selection means, for displaying an input area for causing a voter to input handwritten information (name or the like) specifying the candidate selected by the selection means;

input means for inputting the handwritten information specifying the candidate;

recognition means for recognizing a pattern date corresponding to the handwritten information input by the input means and outputting a recognized character; and comparison means for checking whether a candidate specified by characters recognized by the recognition means coincides with a candidate selected by the selection means.

Additional objects, constructions, and advantages of the invention will be set forth in the description which follows, and in part will be obvious from the description, or may be learned by practice of the invention. The objects, constructions, and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 77 is a view showing rule information for sort processing;

FIGS. 78A to 78C are views respectively showing handwriting analysis results.

DETAILED DESCRIPTION OF THE PREFERRED EMBODIMENTS

Embodiments of the present invention will be described below with reference to the accompanying drawings.

(First Embodiment)

Figure 1:
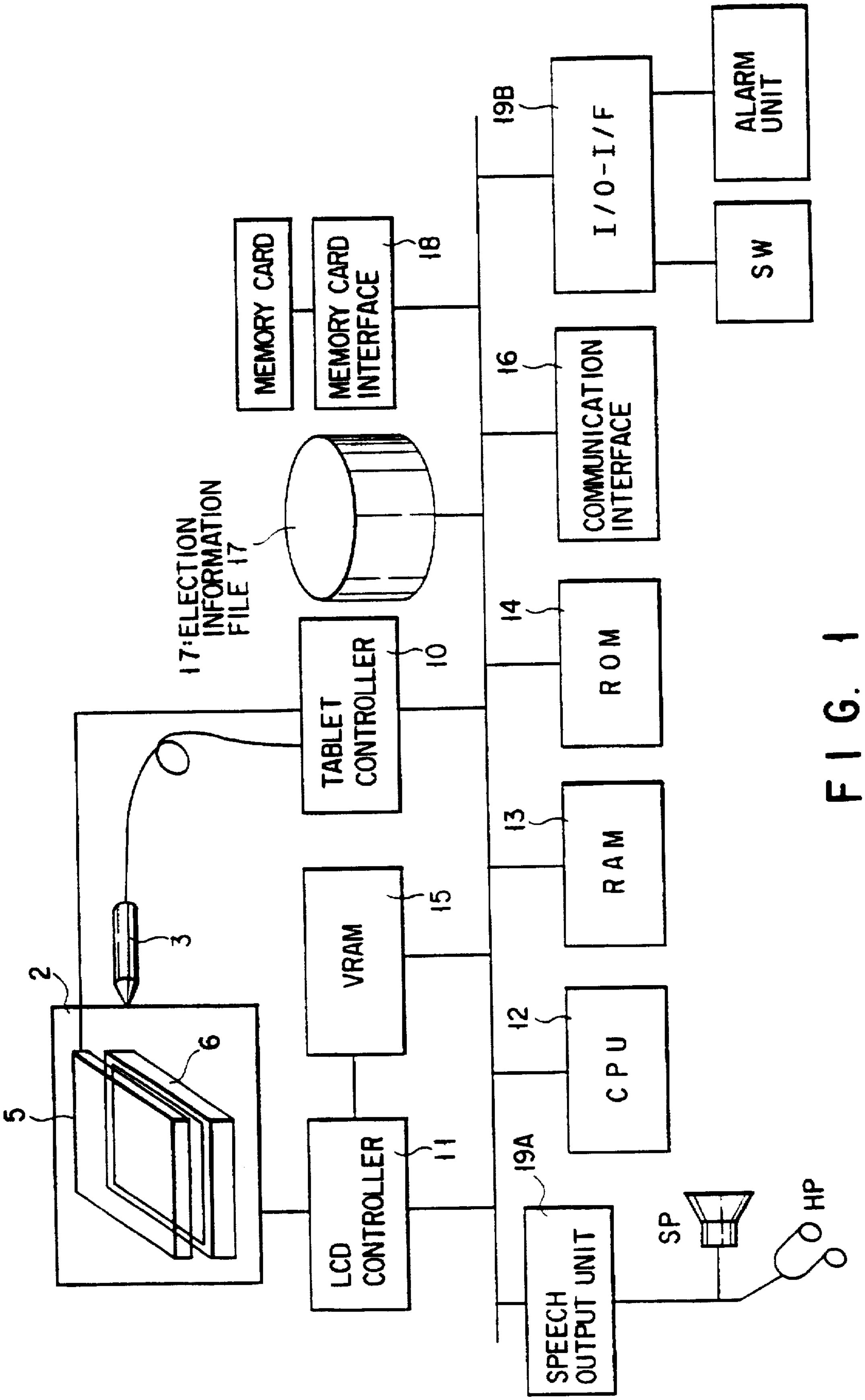
FIG. 1 is a block diagram of an election terminal apparatus according to the first embodiment of the present invention.
Figure 2:
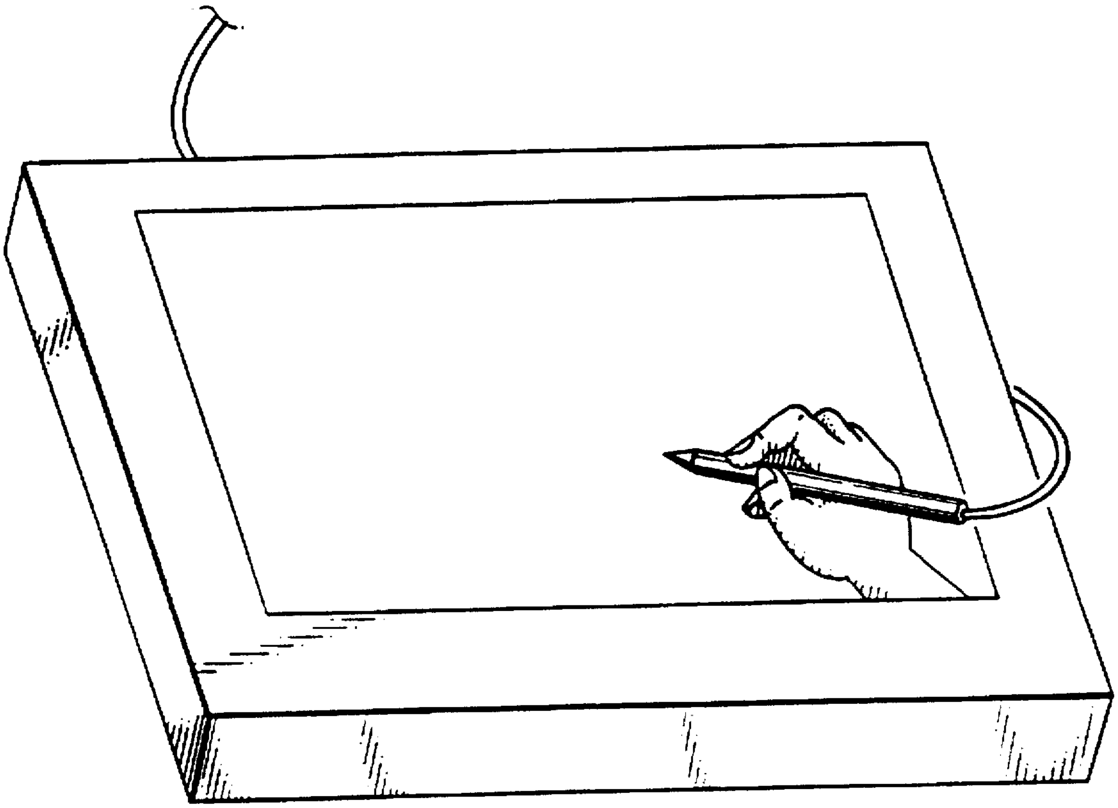
FIG. 2 is a perspective view showing an outer appearance of an integral-type display/input unit in FIG. 1.
Figure 3:
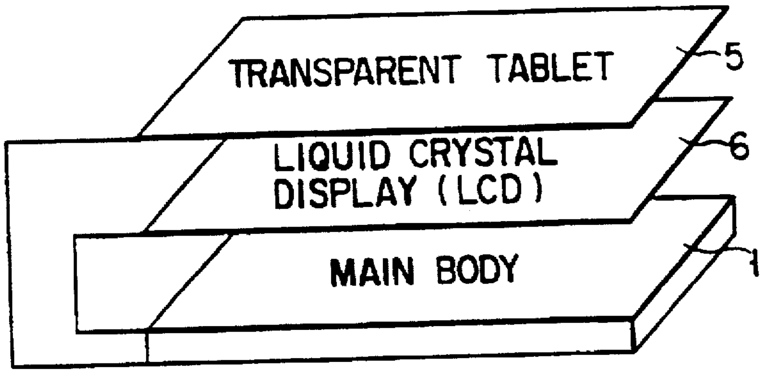
FIGS. 3 to 5 are views for explaining the arrangement of the integral-type display/input unit.
Figure 4:
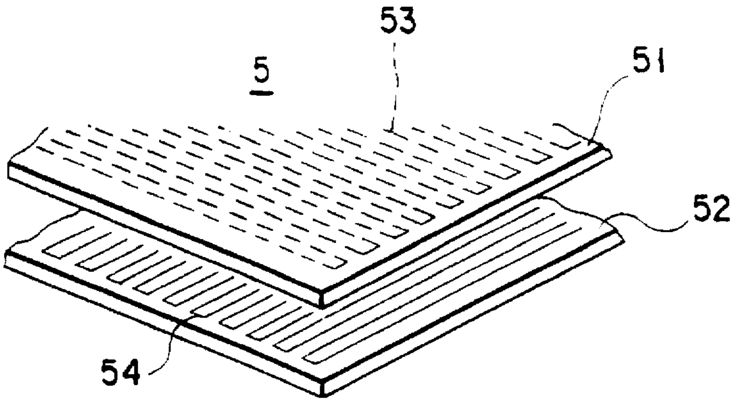
Figure 5:
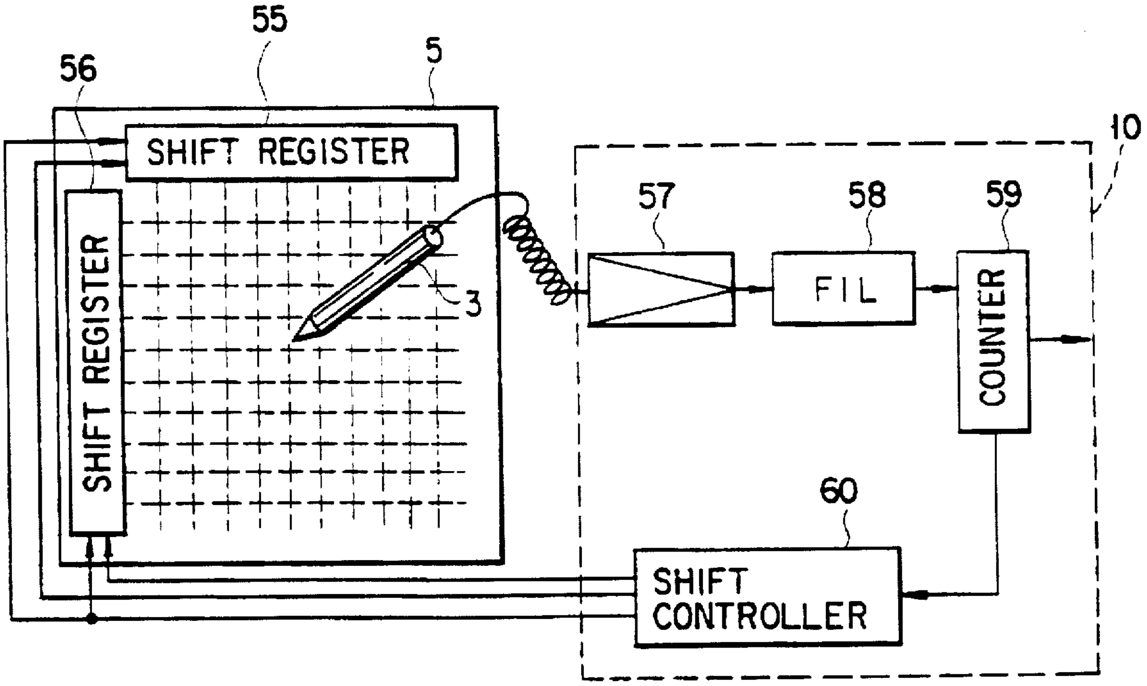

FIG. 1 is a block diagram showing the arrangement of an election terminal apparatus according to the first embodiment of the present invention. FIG. 2 shows an outer appearance of the election terminal apparatus of this embodiment. FIGS. 3 to 5 are views for explaining the arrangement of an integral-type display/input unit in FIG. 1.

The election terminal apparatus includes an integral-type display/input unit 2 arranged on the upper surface of a box-like casing 1 and a pen 3, as shown in FIG. 2. The casing 1 incorporates a tablet controller 10, an LCD controller 11, a central processing unit (CPU) 12, a RAM 13, a ROM 14, a video RAM (VRAM) 15, a communication interface (communication IF) 16, an election information file 17, a memory card interface 18, a speech output unit 19A, and an input/output interface (I/O-I/F) 19B.

As shown in FIG. 3, the integral-type display/input unit 2 is formed by stacking an electrostatic transparent tablet 5 for coordinate input on a liquid crystal display 6. The integral-type display/input unit 2 allows both display and input operations of data on the same coordinate plane.

The pen 3 is used to indicate a position on the transparent tablet 5.

The pen 3 incorporates a detection electrode for detecting a voltage applied by electrostatic induction and a switch for detecting the contact of the distal end of the pen 3 with the transparent tablet 5. A voltage detected by the detection electrode and an ON/OFF signal from the built-in switch are supplied to the CPU 12 through a line 4 and the tablet controller 10.

The CPU 12 checks the eligibility of a voter. Upon determining that the voter is eligible, the CPU 12 receives the signal from the pen 3.

As shown in FIG. 4, the transparent tablet 5 is constituted by a pair of transparent glass plates 51 and 52 bonded to each other through an insulating protective layer (not shown). A plurality of transparent electrodes 53 are arranged on the transparent glass plate 51 at predetermined intervals to be parallel to each other. A plurality of transparent electrodes 54 are arranged on the transparent glass plate 52 in the same manner. The transparent electrodes 53 and 54 are arranged to be orthogonal to each other.

As shown in FIG. 5, the transparent electrodes 53 and 54 are connected to shift registers 55 and 56, respectively. The shift registers 55 and 56 sequentially apply pulse voltages to the transparent electrodes 53 and 54 in response to shift clocks supplied from a shift controller 60. The detection voltage from the detection electrode of the pen 3 is converted in accordance with the voltages applied to the transparent electrodes 53 and 54 owing to electrostatic induction. The detection voltage is then applied to a counter 59 through an amplifier 57 and a low-pass filter 58. The counter 59 counts count clocks synchronized with the shift clocks output from the shift controller 60. The designated coordinates can be discriminated from the count value of the counter 59, which corresponds to the maximum detection voltage. The tablet controller 10 detects the position (X- and Y-coordinates) designated by the pen 3 on the basis of the state of the built-in switch and the count value of the counter 59, and also controls, for example, transmission of X- and Y-coordinate data to the RAM 13.

The liquid crystal display 6 is controlled by the LCD controller 11 under the control of the CPU 12.

Pattern information such as character information input through the integral-type display/input unit 2, i.e., a set of coordinates indicated by the distal end of the pen 3, is supplied to the CPU 12 through the tablet controller 10 so as to be processed. The CPU 12 controls a display operation of the liquid crystal display 6 through the LCD controller 11 in accordance with the processing result. For example, in the handwriting input mode, a character handwritten on the transparent tablet 5 is directly displayed on the same position on the liquid crystal display 6. Therefore, a voter can input a character and the like with the pen 3 as if he/she writes it on paper. In the input character recognition mode, a character recognized by the CPU 12 in accordance with the trace of the pen 3 is displayed on the liquid crystal display 6. In the item selection mode, the display contents are changed in accordance with an icon selected and displayed on the liquid crystal display 6. Input information is stored in the RAM 13 as needed, and is retained in the election information file 17 as needed.

The CPU 12 is constituted by a microprocessor and is designed to control the overall operation of the apparatus. In the first embodiment, the CPU 12 executes the processing shown in FIG. 10 in accordance with programs stored in the RAM 13.

The RAM 13 is a memory capable of read/write operations, which is accessed under the control of the CPU 12. The RAM 13 stores operation programs and various data for the CPU 12. The RAM 13 also stores information (e.g., position information) associated with icons displayed on the liquid crystal display 6, information associated with patterns handwritten on the transparent tablet 5, and the like.

The ROM 14 is a read-only memory which is accessed under the control of the CPU 12. The ROM 14 stores a diagnosis program used after the power switch of the election terminal apparatus is turned on, a boot program for starting the system, and the like.

The VRAM 15 is a bit map memory for storing information displayed on the liquid crystal display 6. The LCD controller 11 controls transfer of information from the VRAM 15 to the liquid crystal display 6, and also controls transfer of information from the CPU 12 to the VRAM 15.

The communication interface 16 includes a communication unit of a wired or radio scheme and controls data communication with an external terminal control unit or a host computer. For example, information on election returns is transmitted to an external totaling terminal unit through the communication interface 16.

The election information file 17 is constituted by, e.g., an HDD (hard disk drive) and serves to store various databases (DBs) such as a party management database, a candidate database, a guidance database, and a voting management database, dictionary data for character recognition, information input by the apparatus to be retained, and the like. A memory card is connected to the memory card interface 18. This memory card stores an application program for election for operating the apparatus shown in FIG. 1 as an election terminal apparatus. The application program for election is stored in the ROM 14 through the memory card interface 18 under the control of the CPU 12 when the system is started.

The speech output unit 19A outputs information on an operation sequence of this terminal apparatus, candidate names, and the like through a speaker (SP) or a headphone speaker (HP).

The input/output interface 19B receives information from an external unit and outputs a signal to an external unit. A switch for calling an attendant, an alarm unit for informing that the calling switch is operated, and the like are connected to the input/output interface 19B.

Figure 6:
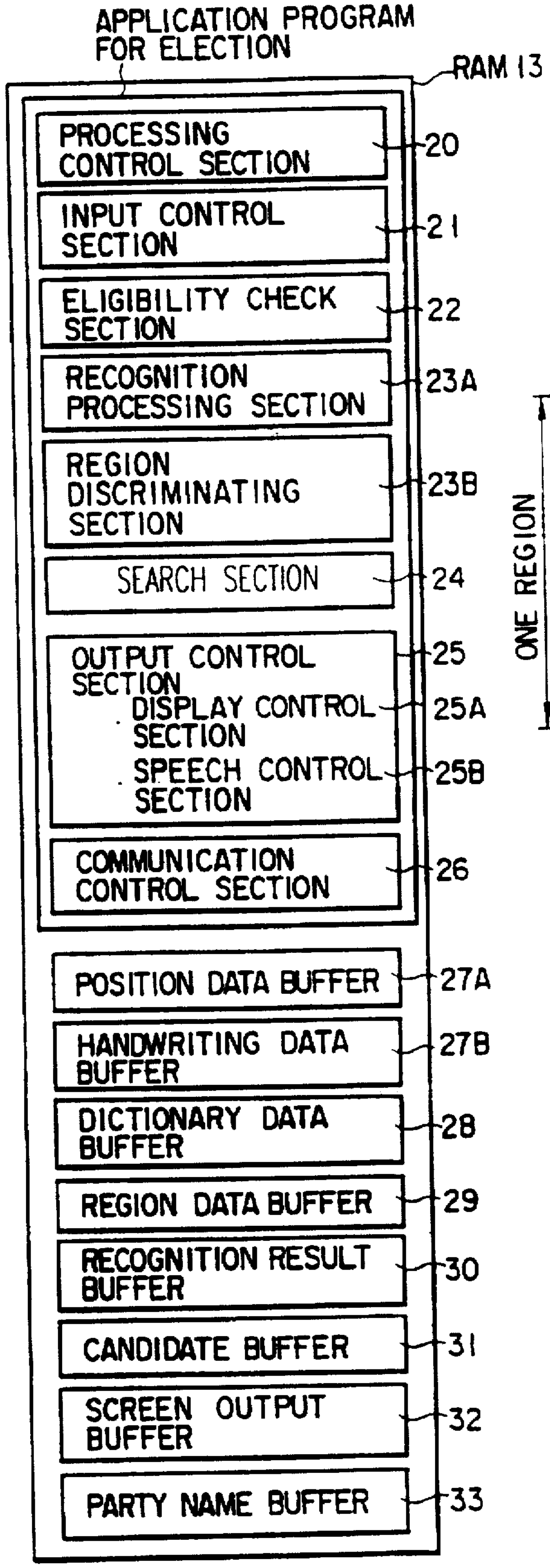
FIG. 6 is a view showing the memory map of a RAM 13 in FIG. 1.

FIG. 6 shows the memory map of the RAM 13 in which the application program for election is stored. The application program for election includes a processing control section 20, an input control section 21, an eligibility check section 22, a recognition processing section 23A, a region discriminating section 23B, a search section 24, an output control section 25, and a communication control section 26. The RAM 13 also includes a position data buffer 27A, a handwriting data buffer 27B, a dictionary data buffer 28, a region data buffer 29, a recognition result buffer 30, a candidate buffer 31, a screen output buffer 32, and a party name buffer 33. The output control section 25 is constituted by a display control section **25*a* and a speech control section 25*b***.

The processing control section 20 is a program for controlling the overall system. The input control section 21 receives data on the ON/OFF state of the built-in switch of the pen 3 and the coordinate data of a position designated by the pen 3 on the transparent tablet 5, and stores the data in the position data buffer 27A. The eligibility check section 22 serves to check the eligibility of a voter. For example, the eligibility check section 22 checks whether a voter tries to vote two times or more. Upon detection of an ineligible voter, the eligibility check section 22 invalidates the operation performed by the voter with respect to the election terminal apparatus.

When the handwritten character recognition mode is designated, the recognition processing section 23A recognizes handwritten characters from coordinate data input through the input control section 21, and discriminates the candidate who has received the vote. The region discriminating section 23B recognizes a region designated by the pen 3, and a command and a candidate name assigned to the region.

The search section 24 searches the candidate buffer 31 to obtain information associated with a candidate designated by a voter.

The display control section 25*a* transfers display data, stored in the screen output buffer 32, to the VRAM 15 through the LCD controller 11, and displays the strokes of a character written with the pen 3 in real time on the basis of coordinate data input through the input control section 21. The display control section 25*a* also displays a command for instructing an operation to be processed in a display region. The speech control section 25*b* outputs speech data, stored in the screen output buffer 32, to the speech output unit 19A. The communication control section 26 controls the communication interface 16 to control data transmission with respect to an external unit.

The position data buffer 27A stores data on the ON/OFF state of the built-in switch of the pen 3 and input coordinate data. The handwriting data buffer 27B stores a coordinate data group indicating handwriting. The dictionary data buffer 28 stores dictionary data used for character recognition processing performed by the recognition processing section 23A. The dictionary data is transferred from the election information file 17 to the RAM 13 when the system is started.

Figure 7:
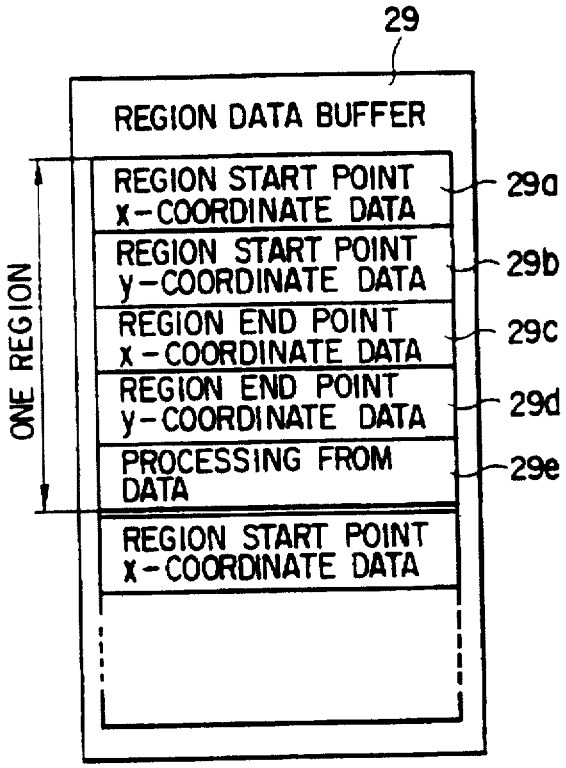
FIG. 7 is a view showing the data structure of a region data buffer 29 in FIG. 6.

As shown in FIG. 7, the region data buffer 29 stores start point x-coordinate data 29*a*, start point y-coordinate data 29*b*, end point x-coordinate data 29*c*, and end point y-coordinate data 29*d* of an icon to be displayed on the liquid crystal display 6, and processing form data 29*e* indicating the contents of an operation corresponding to the icon, in units of screens and regions.

Figure 8:
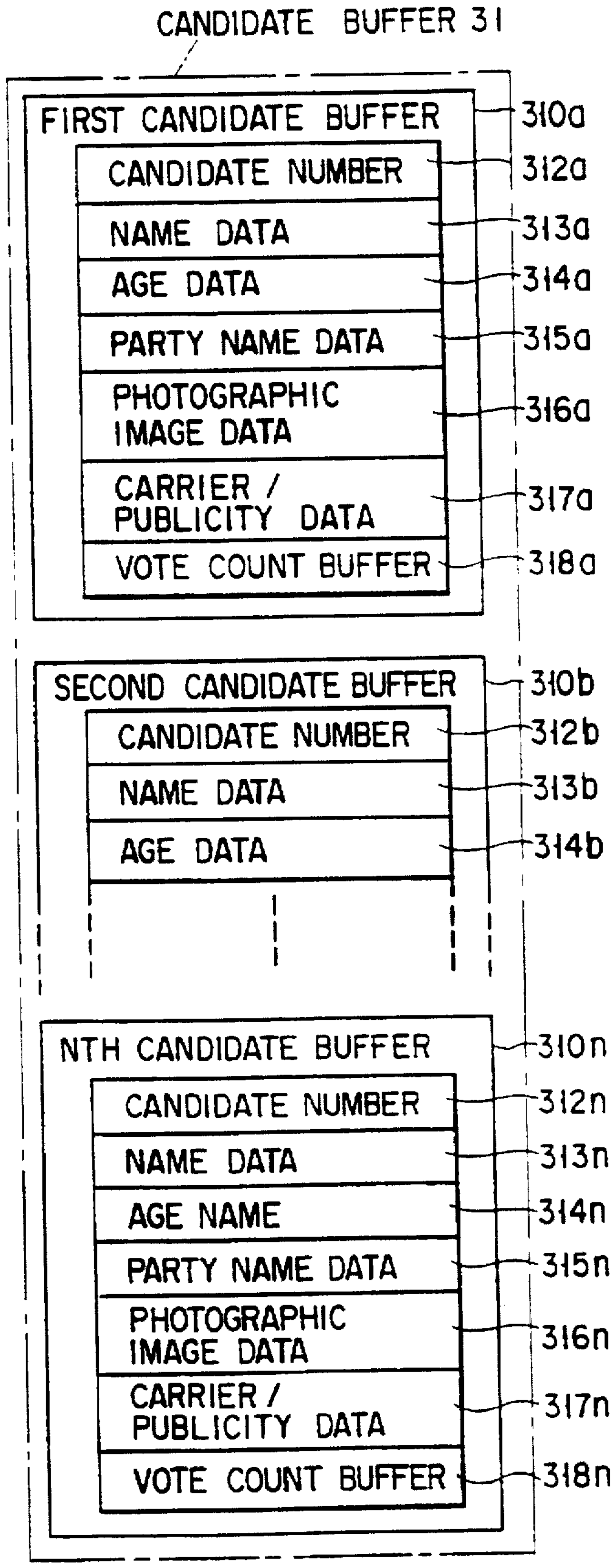
FIG. 8 is a view showing the structure of a candidate buffer 31 in FIG. 6.

As shown in FIG. 8, the candidate buffer 31 (310*a* to 310*n*) stores a candidate number 312, name data 313, age data 314, party name data 315, photographic image data 316, carrier/publicity data 317, vote count buffer 318, and the like. These data are prepared for all candidates (a to n) to be managed by the election terminal apparatus.

The vote count buffer 318 is incremented by one when the corresponding candidate receives a vote. Candidate number region coordinate data 311 is coordinate data indicating the region of the number of each candidate displayed on the screen. The candidate number 312 is a number assigned to each candidate.

An operation of the election terminal apparatus according to the first embodiment of the present invention will be described below with reference to FIGS. 1 to 11.

Figure 10:
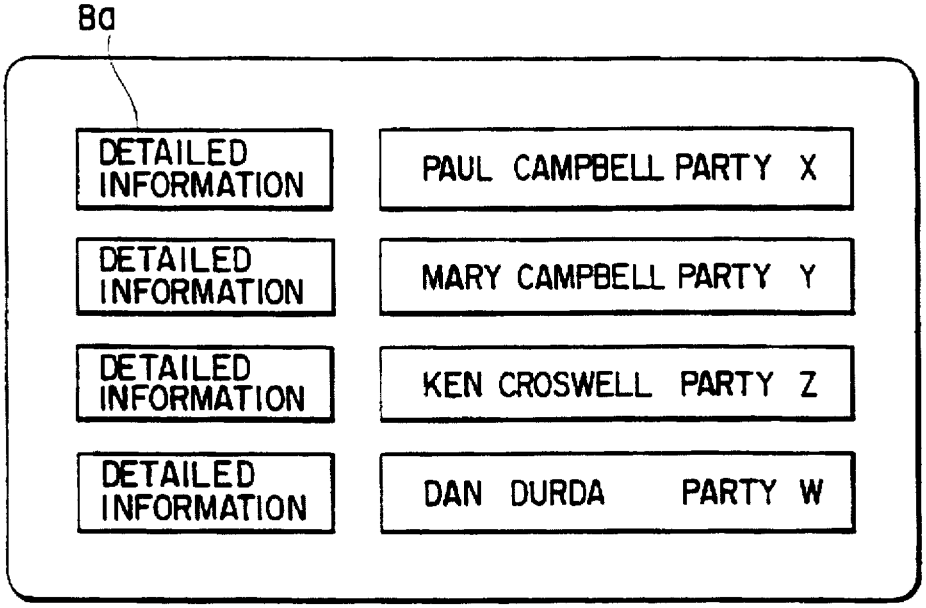
FIGS. 10 and 11 are views respectively showing display screens in the first embodiment.

When the application program for election is started in the election terminal apparatus described with reference to FIGS. 1 to 8, system initialization processing is performed first under the control of the CPU 12 to display an initial screen (step A1). The system initialization processing includes initialization of data for voting processing, processing of ensuring a memory area, and the like. FIG. 10 shows an initial screen. This initial screen includes icons indicating candidate and party names and icons Ba for displaying detailed information.

When a voter brings the pen 3 near the transparent tablet 5, the tablet controller 10 detects a position designated by the pen 3 and the state of the built-in switch of the pen 3. Under the control of the input control section 21, the CPU 12 causes interruptions with respect to the tablet controller 10 at predetermined intervals, and stores the detected coordinate values and the switch states in the position data buffer 27A.

Figure 9:
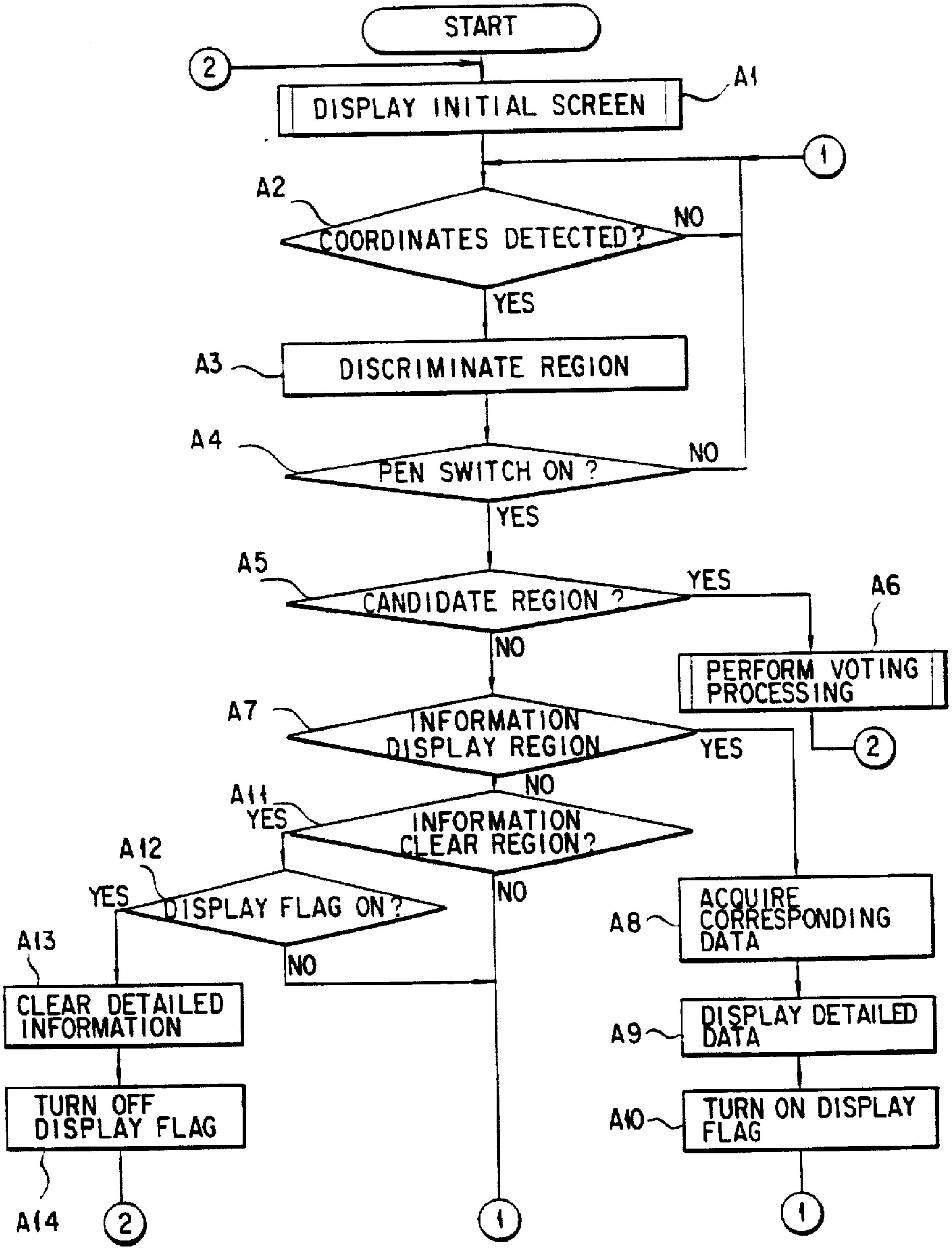
FIG. 9 is a flow chart showing an operation sequence of the election terminal apparatus according to the first embodiment.

In step A2 in FIG. 9, the CPU 12 refers to the contents of the position data buffer 27A to check whether any coordinates are detected. If NO in step A2, the CPU 12 waits for detection of coordinates.

If coordinates are stored in the position data buffer 27A, the region discriminating section 23B discriminates the region to which the coordinates belong, on the basis of the data stored in the region data buffer 29 (step A3).

It is then checked on the basis of the data retained in the position data buffer 27A whether the built-in switch of the pen 3 is ON. If the built-in switch is OFF, the flow returns to step A2. If the built-in switch is ON, the flow advances to branch processing constituted by steps A5, A7, and A11.

If the position designated by the pen 3 is in an icon indicating a candidate name and the name of the party to which the candidate belongs, voting processing is performed (step A6). In this voting processing, the CPU 12 adds "1" to the count value of the vote count buffer 318, of the candidate buffer 31, which corresponds to the selected candidate. Upon completion of the voting operation, the flow returns to step A2 to display the initial screen in FIG. 10 again for the next voter.

Figure 11:
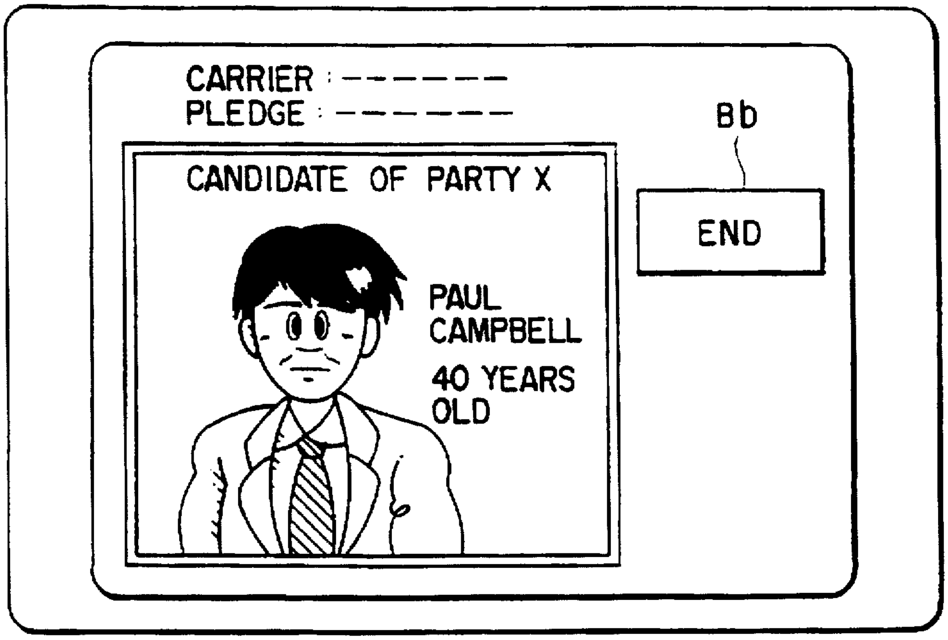

If one of the icons Ba in FIG. 10 is designated by the pen 3, YES is obtained in step A7. As a result, the flow advances to step AS. The CPU 12 discriminates the candidate corresponding to the designated icon Ba under the control of the region discriminating section 23B, and searches the candidate buffer 31, under the control of the search section 24, to acquire data on the corresponding candidate (step AS). The CPU 12 stores the acquired data in the screen output buffer 32, displays the detailed data under the control of the display control section 25*a*, as shown in FIG. 11, and turns on a display flag in the RAM 13 (steps A9 and A10). As such detailed information, FIG. 11 shows a party name, a candidate name, an age, an image of the face, a carrier, campaign promises, and the like. Subsequently, the flow returns to step A2 to wait for the next input.

If "END" as an icon Bb in FIG. 10 is designated, YES is obtained in step All, and it is further checked whether the display flag in the candidate buffer 31 is ON. If the display flag is ON, the displayed detailed information is cleared, and the display flag is turned off (steps A11 to A14). Thereafter, the flow returns to step A1 to display the initial screen shown in FIG. 10.

According to this embodiment, a voter can perform voting with a simple operation upon confirming detailed information on each candidate.

The process of checking the eligibility of each voter by means of the eligibility check section 22 may be performed so that the display processing for the initial screen in step A1, the region discrimination processing in step A5, or the like is performed only when the eligibility of a voter is confirmed. For example, an identification number may be assigned to each voter so that an eligibility check can be performed by causing each voter to input his/her identification number.

(Second Embodiment)

An election terminal apparatus according to the second embodiment of the present invention will be described next.

The arrangement of the election terminal apparatus of this embodiment is substantially the same as that of the election terminal apparatus of the first embodiment described with reference to FIGS. 1 to 8. For this reason, an operation of the apparatus will be mainly described with reference to FIGS. 12 to 16.

When an application program for election is started in the election terminal apparatus, system initialization processing is performed under the control of a CPU 12 (step B1). An initial screen is then displayed on a liquid crystal display 6 (step B2). This initial screen includes a list of candidate names, the names of the parties to which the candidates belong, and the like.

Figure 13:
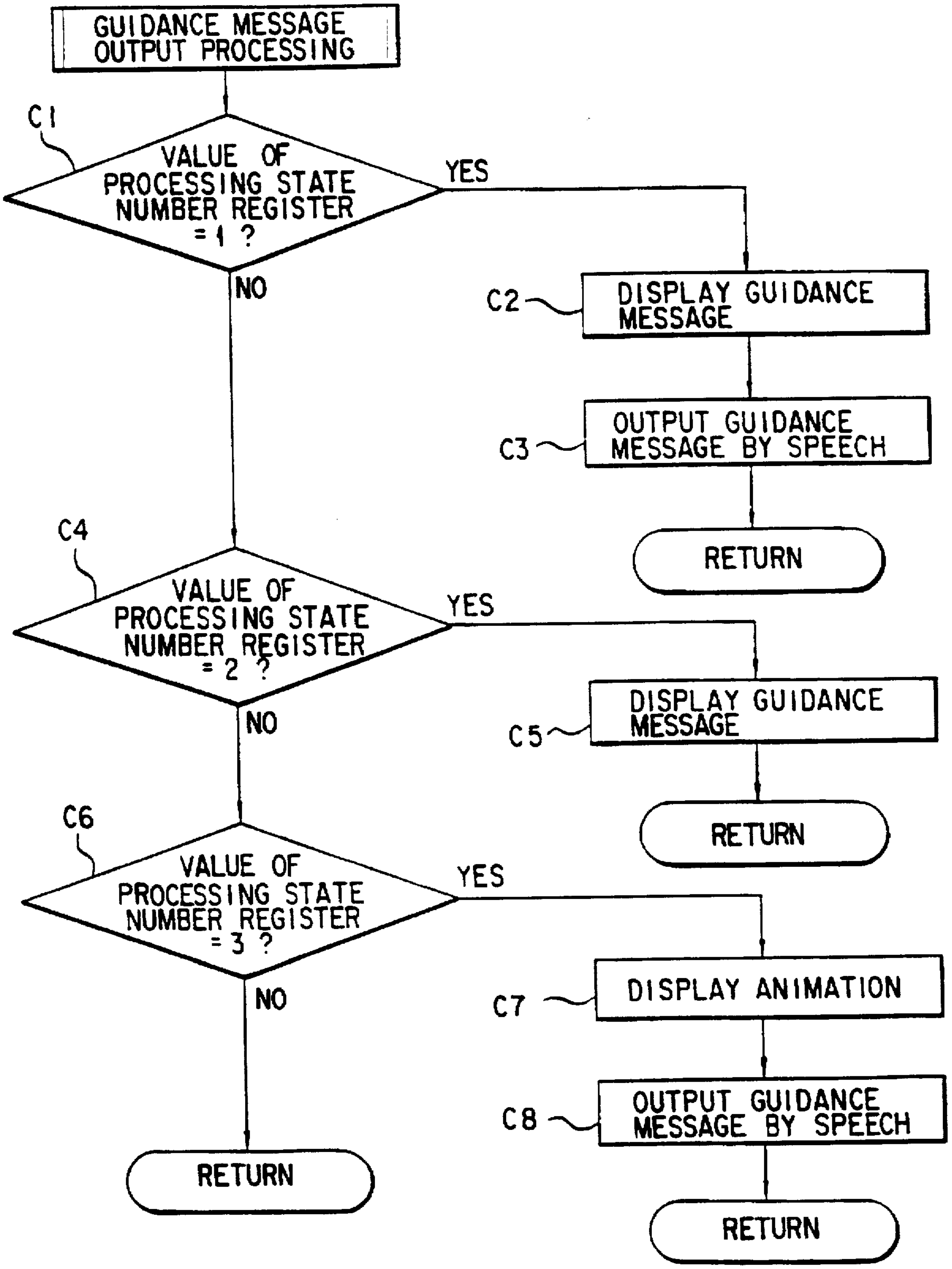
Figure 14:
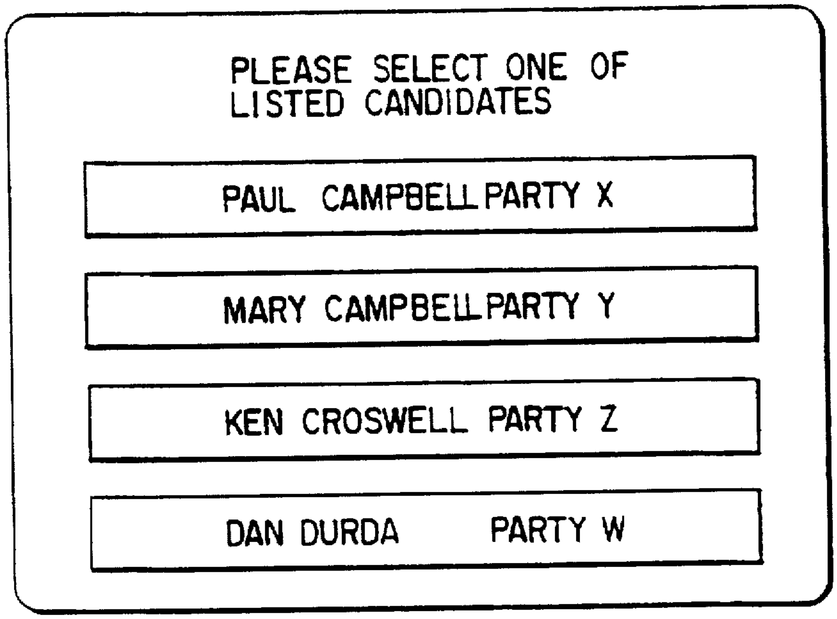
FIGS. 14 to 16 are views respectively showing display screens.

The CPU 12 stores "1" in a processing state number register in a RAM 13 to display proper guidance information (message) upon superposing it on the initial screen (step B3). Guidance output processing is performed (step B4) to display a guidance message "PLEASE SELECT ONE CANDIDATE" or the like and to further output a guidance message "PLEASE SELECT ONE OF LISTED CANDIDATES" or the like by speech. Note that the guidance output processing itself will be described later with reference to FIG. 13. FIG. 14 shows an example of how the initial screen and a guidance message are superposed and displayed.

Under the control of an input control section 21, the CPU 12 causes interruptions with respect to a tablet controller 10 at predetermined intervals, and stores the coordinate values of positions designated by a pen 3 and the state data of the built-in switch of the pen 3 in a position data buffer 27A.

Figure 12:
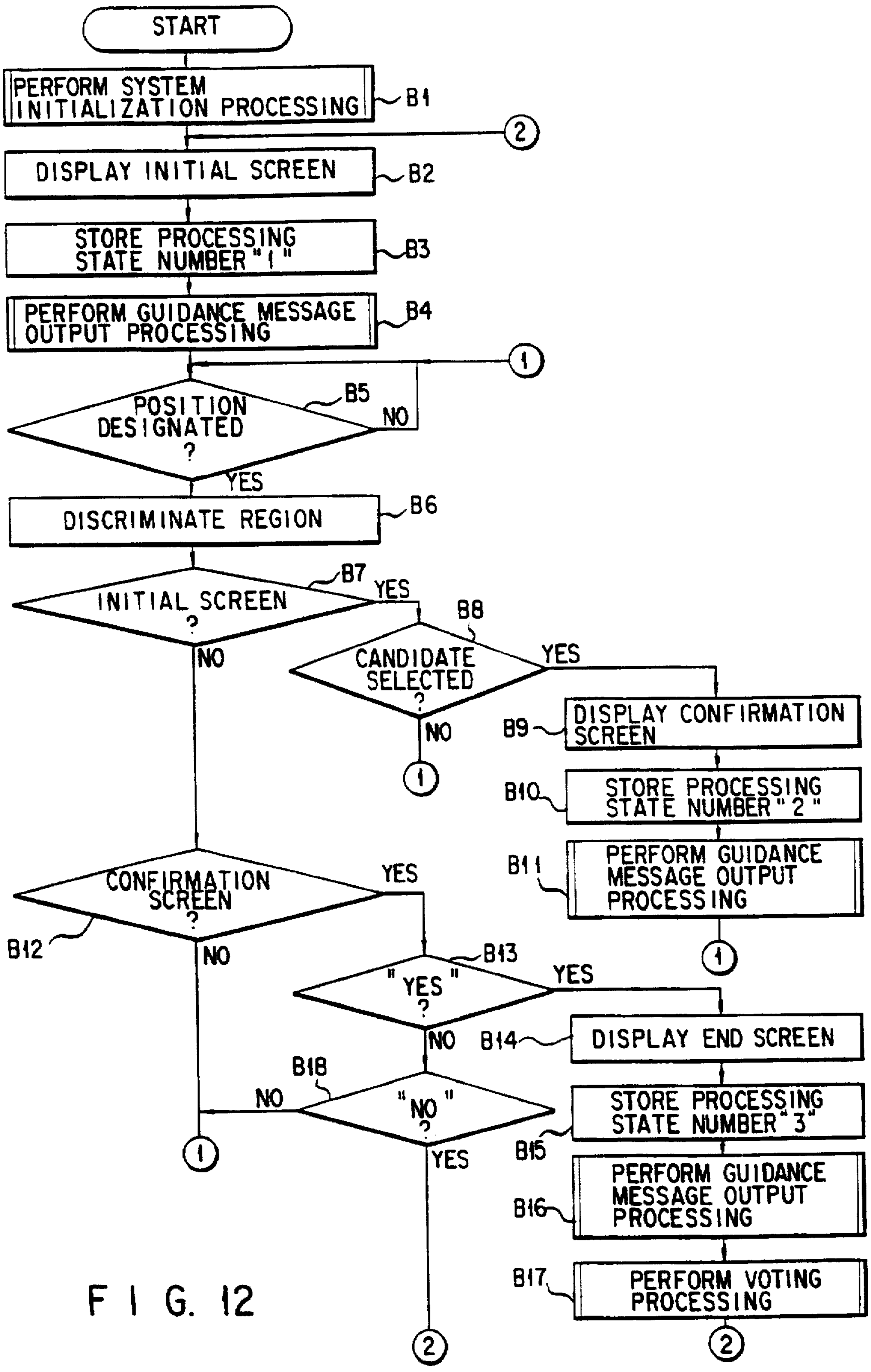
FIGS. 12 and 13 are flow charts showing an operation sequence of an election terminal apparatus according to the second embodiment of the present invention.

In step B5 in FIG. 12, the CPU 12 reads out the stored contents from the position data buffer 27A, and checks whether a position on a transparent tablet 5 is designated by the pen 3 (step B5). If no position is designated, the CPU 12 waits until a position is designated. If a position is designated, a region discriminating section 23B discriminates the designated icon on the basis of the data stored in the region data buffer 29 (step B6).

It is then checked whether the initial screen is displayed (step B7). If the initial screen is displayed, the flow advances to step B8 to check whether a candidate is designated. If NO in step S8, the flow returns to step B5 to wait until the voter designates a candidate.

Figure 15:
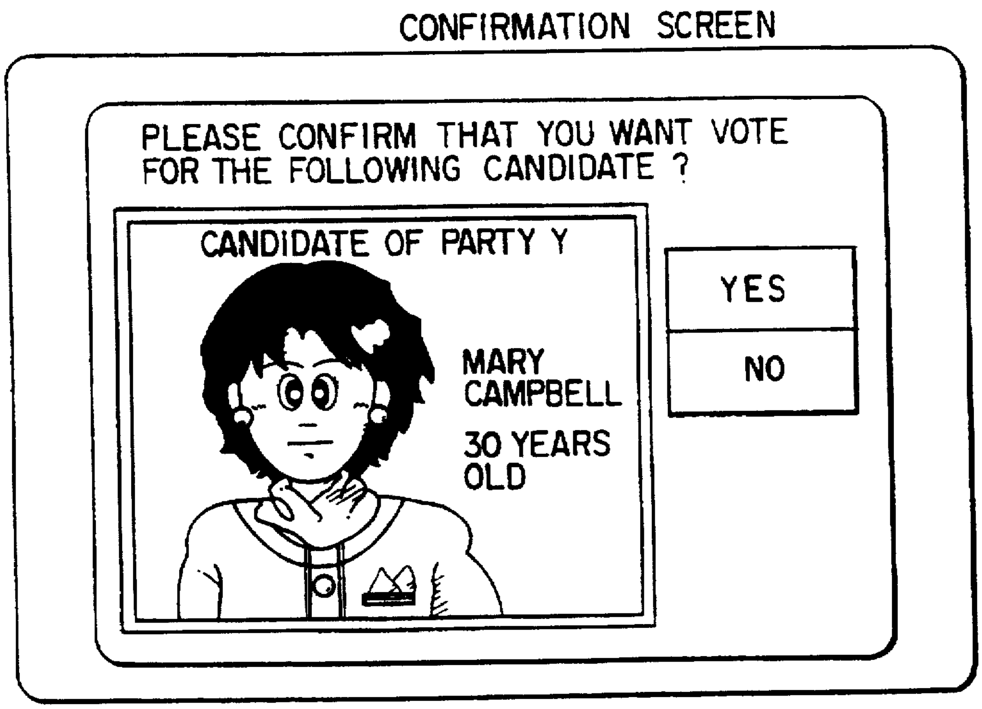

If YES in step B8, a confirmation screen for allowing the voter to confirm that he/she votes for the designated candidate is displayed (step B9). In order to output proper a guidance message, "2" is stored in the processing state number register in the RAM 13 (step B10). In the subsequent guidance output processing (step B11), the proper guidance message is displayed on the confirmation screen, as shown in FIG. 15. As such information, FIG. 15 shows a guidance message "PLEASE CONFIRM THAT YOU WANT VOTE FOR THE FOLLOWING CANDIDATE?" displayed on the confirmation screen. Thereafter, the flow returns to step B5 to wait for the next input.

Figure 16:
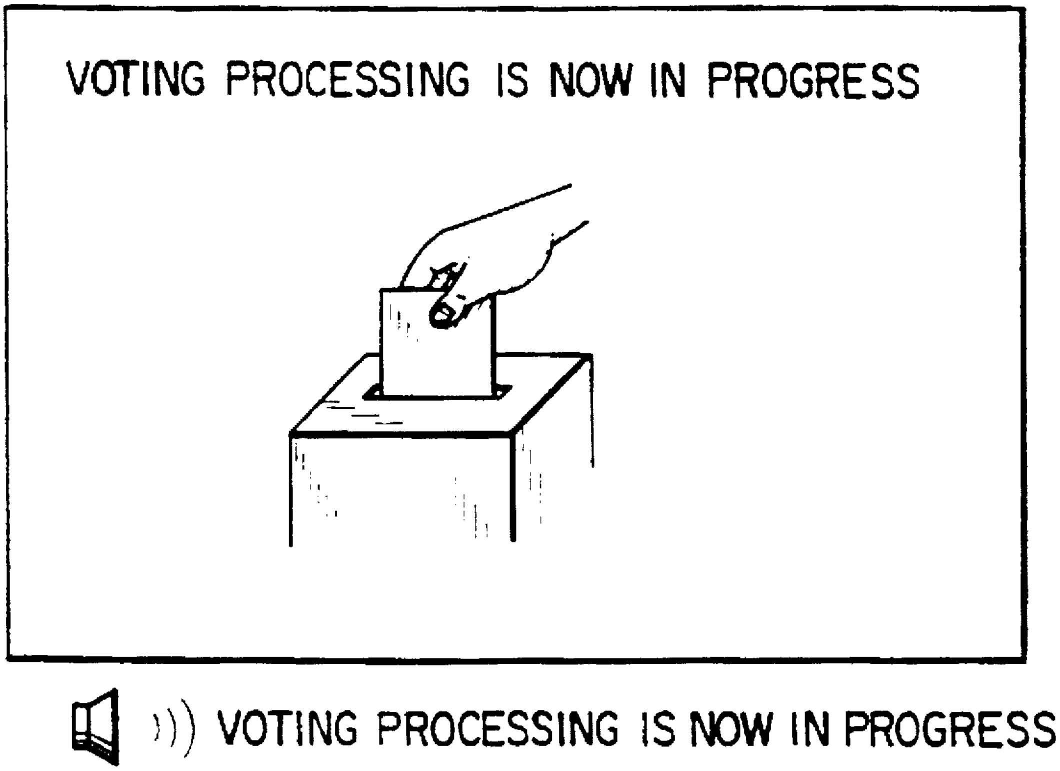
Figure 17A:
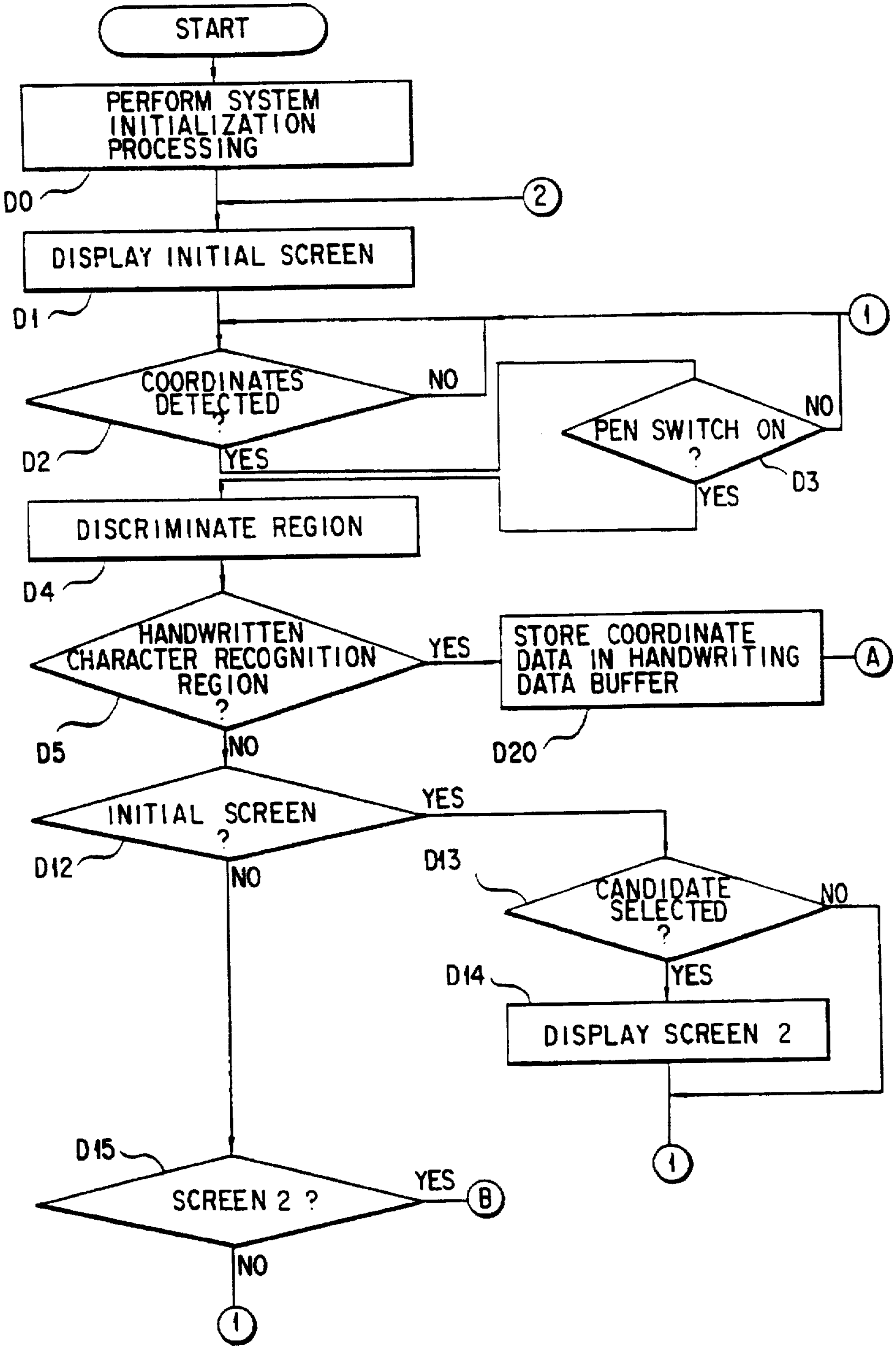
FIGS. 17A to 17C are flow charts showing an operation sequence of an election terminal apparatus according to the third embodiment of the present invention.
Figure 17B:
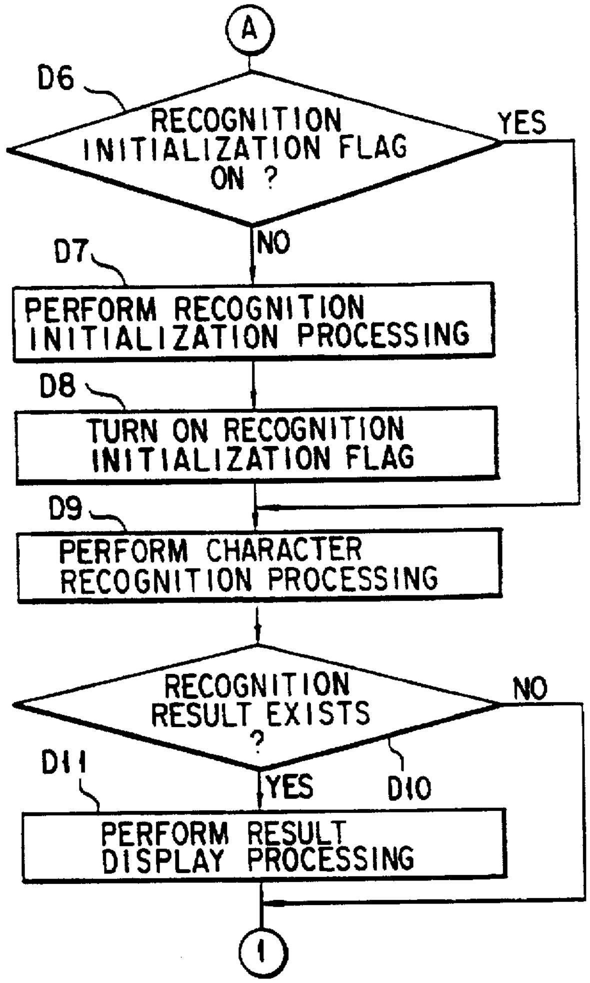
Figure 17C:
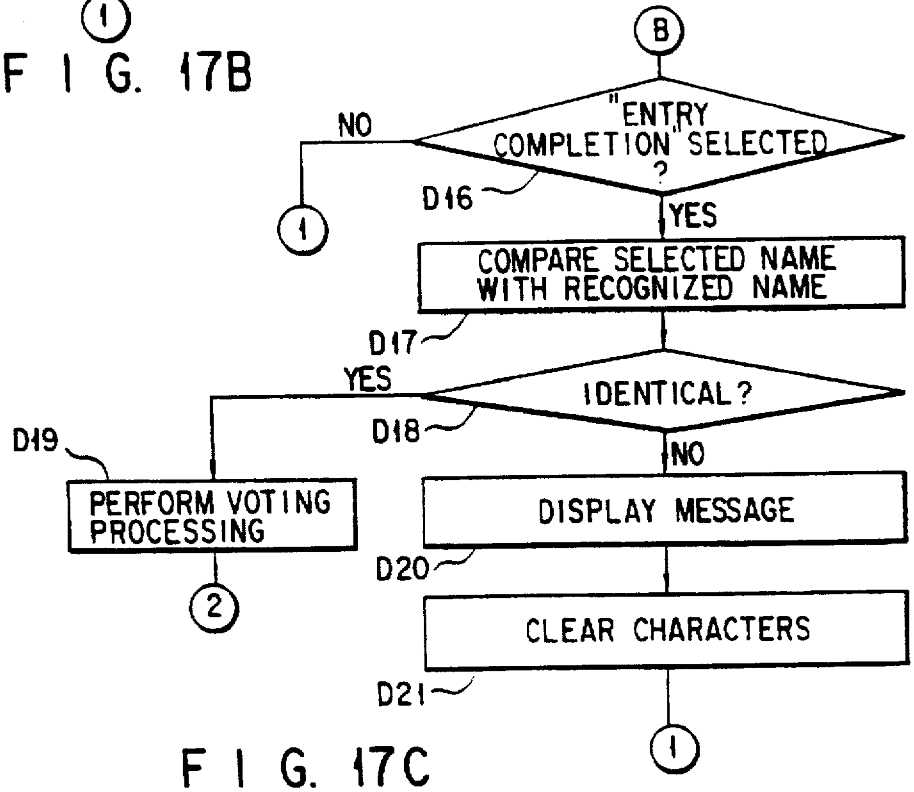

If an icon "YES" is designated while the confirmation screen is displayed, the flow advances to step B14 through steps B5, B6, B7, B12, and B13. In step B14, an end screen indicating the completion of the voting operation is displayed. In order to output a proper guidance message, "3" is stored in the processing state number register (step B15). Upon guidance output processing (step B16), the proper guidance message is output. In this embodiment, as shown in FIG. 16, an animation indicating that a voting operation is being performed is displayed, and that information is further given to a voter by speech.

Subsequently, the count value of a vote count buffer 318 corresponding to the designated candidate is incremented by one (step B17). The initial screen is displayed for the next voter (step B2).

If an icon "NO" is designated on the confirmation screen (FIG. 15), the flow returns to step B2 through steps B5 to B7, B12, B13, and B18 so as to display the initial screen. If a region corresponding to neither the icon "YES" nor the icon "NO" is designated on the confirmation screen, the flow returns to step B5 through steps B5 to B7, B12, B13, and B18, and the screen remains the same.

The guidance output processing executed in steps B4, B11, and B16 will be described next with reference to FIG. 13.

If the count value of the processing state number register is "1" (YES in step C1), the guidance message "PLEASE SELECT ONE OF LISTED CANDIDATES" or the like is displayed (step C2), and the same guidance message is output by speech.

If the count value of the processing state number register is "2" (YES in step C4), the guidance message "PLEASE CONFIRM THAT YOU WANT VOTE FOR THE FOLLOWING CANDIDATE?" or the like is displayed (step C5).

If the count value of the processing state number register is "3" (YES in step C6), an animation indicating that a voting operation is being performed is displayed (step C7), and a message "VOTING OPERATION IS CURRENTLY PERFORMED" or the like is output by speech (step C8).

Note that a speech output unit 19A includes an input interface, a D/A converter, a voice amplifier, a volume controller, and the like, and outputs a guidance message by speech through a speaker SP or headphones HP.

Note that a guidance message may be output only when a voter requests it. For example, an icon "HELP" may be displayed on the screen or a help button may be arranged on the terminal so that a guidance message can be output when the icon or the button is designated or depressed. The contents of a guidance message are arbitrarily set and may include a warning message or data indicating a progress state of processing.

According to this embodiment, a voter can smoothly perform a voting operation according to guidance information. In addition, voting errors are small in number because the confirmation screen is displayed after each candidate is selected.

(Third Embodiment)

An election terminal apparatus according to the third embodiment of the present invention will be described next. The arrangement of the election terminal apparatus of this embodiment is substantially the same as that of the election terminal apparatus of the first embodiment described with reference to FIGS. 1 to 9. For this reason, an operation of the apparatus will be mainly described with reference to FIGS. 14 and 17A to 19.

When voting processing is started in the election terminal apparatus, system initialization processing is executed (step D1), and the initial screen shown in FIG. 14 is displayed (step D2).

A CPU 12 causes interruptions with respect to a tablet controller 10 at predetermined intervals, and stores the coordinate values of positions designated by a pen 3 and the state data of the built-in switch of the pen 3 in a position data buffer 27A. In step D3 in FIG. 17A, the CPU 12 reads out the stored contents from the position data buffer 27A to check whether a position on a transparent tablet 5 is designated by the pen 3. If no position is designated, the CPU 12 waits until a position is designated. If a position is designated, a region discriminating section 23B discriminates the designated region on the basis of the data stored in a region data buffer 29 (step D4).

Figure 18:
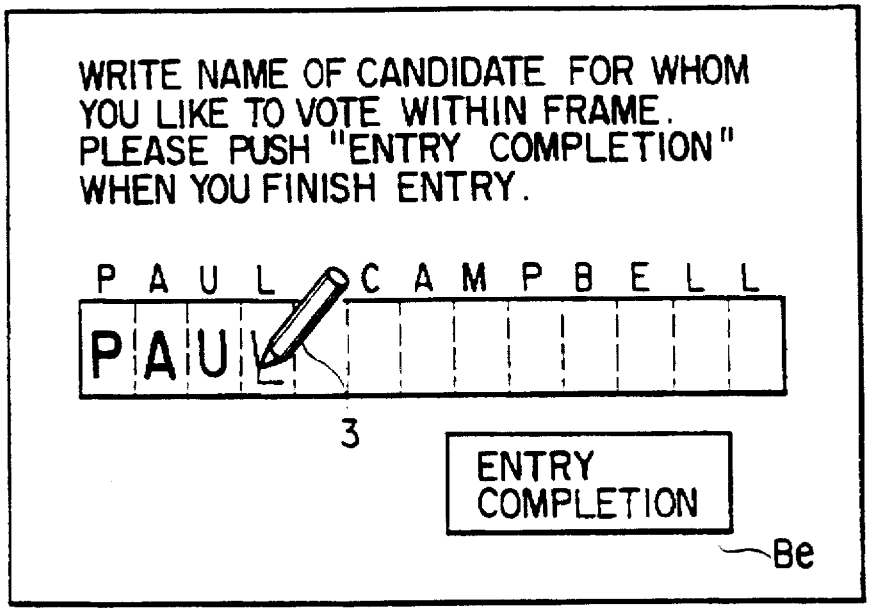
FIGS. 18 and 19 are views respectively showing display screens in the third embodiment.

It is then checked whether the region discriminated in step D4 is a handwritten character recognition region (step D5). No handwritten character recognition region is present on the initial screen. Therefore, the flow advances to step D13 through steps D5 and D12. In step D13, it is checked on the basis of the region check in step D4 whether a candidate is selected. If YES in step D13, screen 2 is displayed (step D14). Thereafter, the flow returns to step D2 to wait for the next input. As shown in FIG. 18, screen 2 has a region in which the voter writes the name of the candidate for whom he/she votes, along the name of the candidate selected on the initial screen by the voter.

While screen 2 is displayed, the voter writes the name of a desired candidate within a frame (the handwritten character recognition region) in accordance with a guidance message. The flow then advances to step D20 through steps D3, D4, and D5. In step D20, the CPU 12 causes a handwriting data buffer 27B to store the coordinate data held in the position data buffer 27A. With this processing, a coordinate data group indicating handwriting is retained in the handwriting data buffer 27B. Subsequently, in step D21, the handwriting data is displayed at the entry position, where entry was performed with the pen 3, on the basis of the coordinate data.

In step D6 (FIG. 17B), the CPU 12 checks, under the control of a recognition processing section 23A, whether a recognition initialization flag in a RAM 13 is ON. If NO in step D6, the CPU 12 performs initialization processing for handwritten character recognition (step D7), and turns on the recognition initialization flag (step D8). If YES in step D6, since recognition initialization need not be performed, the flow jumps to step D9.

In step D9, the CPU 12 performs handwritten character recognition processing under the control of the recognition processing section 23A. More specifically, there are entry frames in which characters are written one by one as shown in FIG. 18. When a voter writes a character on the transparent tablet 5, the coordinate data of the position indicated by the pen 3 is stored in the handwriting data buffer 27B. When the voter starts to write a character in the next entry region, recognition of the character written in the immediately preceding entry region starts. The recognition processing section 23A acquires a character code corresponding to the handwritten pattern on the basis of the coordinate data stored in the handwriting data buffer 27B and a recognition dictionary stored in a dictionary data buffer 28. A recognition result output upon completion of character recognition processing is displayed, for example, as shown in FIG. 18 (step D11). Subsequently, the flow returns to step D3 to wait for the next input.

When "ENTRY COMPLETION" as an icon B3 on screen 2 is designated, the flow advances to step D17 (FIG. 17C) through steps D3, D5, D12, D15, and D16. In step S17, the selected name is compared with the name recognized by the character recognition processing (step D9).

If the selected name coincides with the recognized name, voting processing is performed to add "1" to the count value of a vote count buffer 318 of the corresponding candidate. The flow then returns to step D2 to display the initial screen for the next voter.

Figure 19:
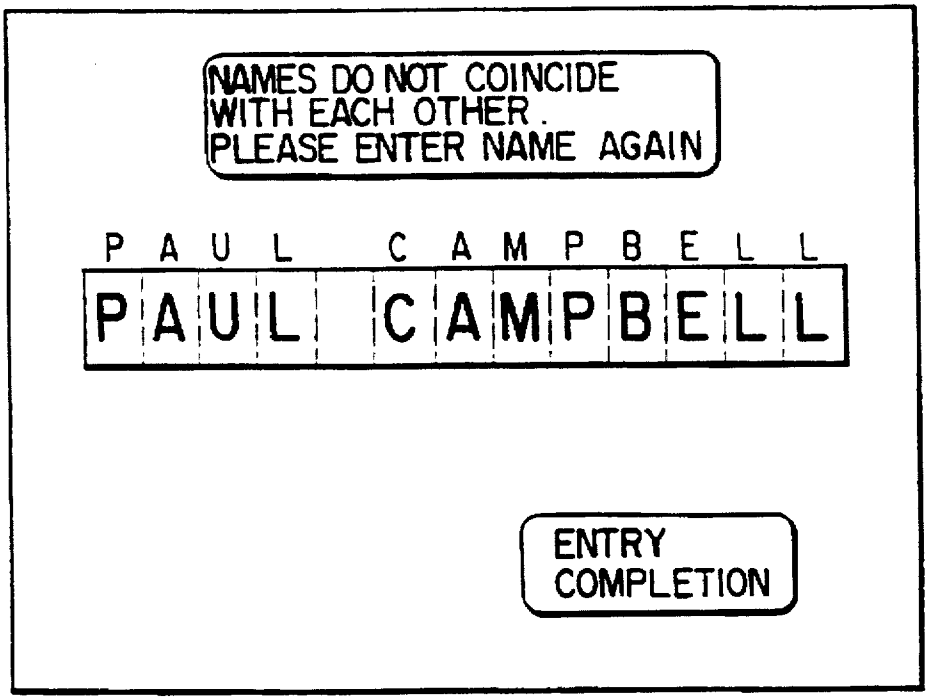
Figure 20A:
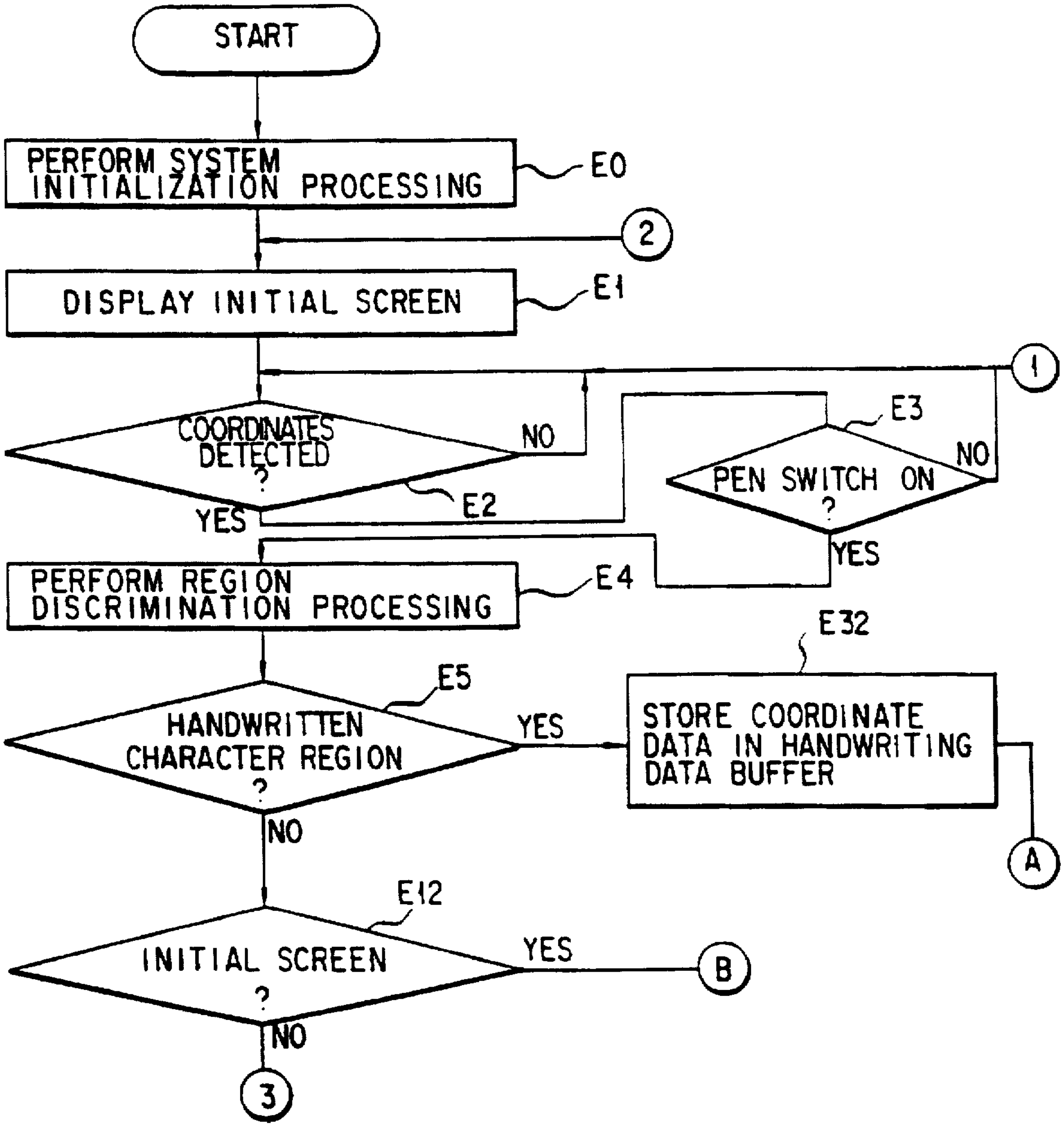
FIGS. 20A to 20D are flow charts showing an operation sequence of an election terminal apparatus according to the fourth embodiment of the present invention.
Figure 20B:
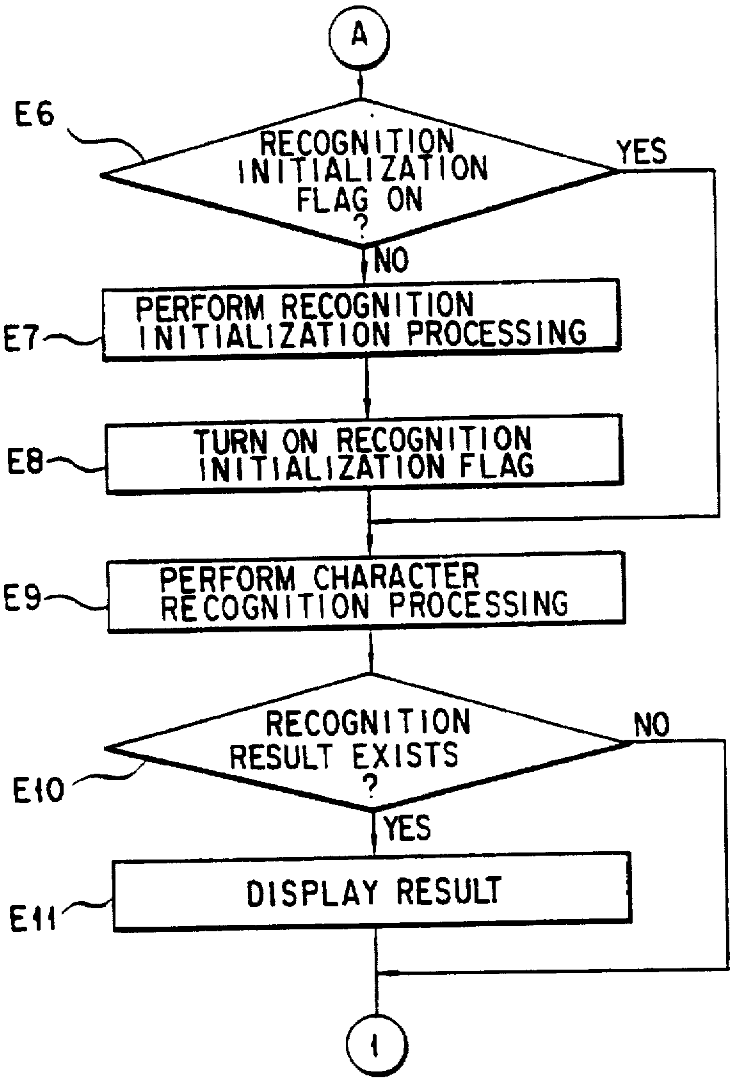

If it is determined in step D18 that the selected name and the recognized name do not coincide with each other, the screen shown in FIG. 19 is displayed to request the voter to write the candidate name again (step D20), and the recognized character is cleared (step D21). The flow then returns to step D3 to wait for the next input.

According to this embodiment, voting processing is performed only when a selected candidate name coincides with a handwritten name. Therefore, voting errors are small in number.

In the third embodiment, when a candidate selected by a voter coincides with a candidate recognized by character recognition, the operation performed by the voter is accepted as a valid operation. However, other methods may be employed. For example, a voter is requested to handwrite the name of the party to which a selected candidate belongs. When the selected candidate and the party name coincide with each other, the operation performed by the voter is accepted as a valid operation.

In the above-described embodiment, when writing of a character in a given entry frame is completed, and writing of a character in the next frame is started, character recognition for the given entry frame starts. However, recognition processing is not limited to this. For example, no entry frame may be formed. In this case, the boundary between characters is detected on the basis of the moving distance of character stroke coordinate data, a period of time during which the pen switch is OFF, and the like, thereby starting character recognition.

In the third embodiment, if NO in step D18, the flow may return to step D2. Alternatively, if NO in step D18, a voter may be requested to select whether to return to step D2 or step D3, or to perform another processing such as blank vote processing.

(Fourth Embodiment)

An election terminal apparatus according to the fourth embodiment of the present invention will be described next. The arrangement of the election terminal apparatus of this embodiment is substantially the same as that of the election terminal apparatus of the first embodiment described. For this reason, an operation of the apparatus will be mainly described with reference to FIGS. 15 and 20A to 22.

Figure 21:
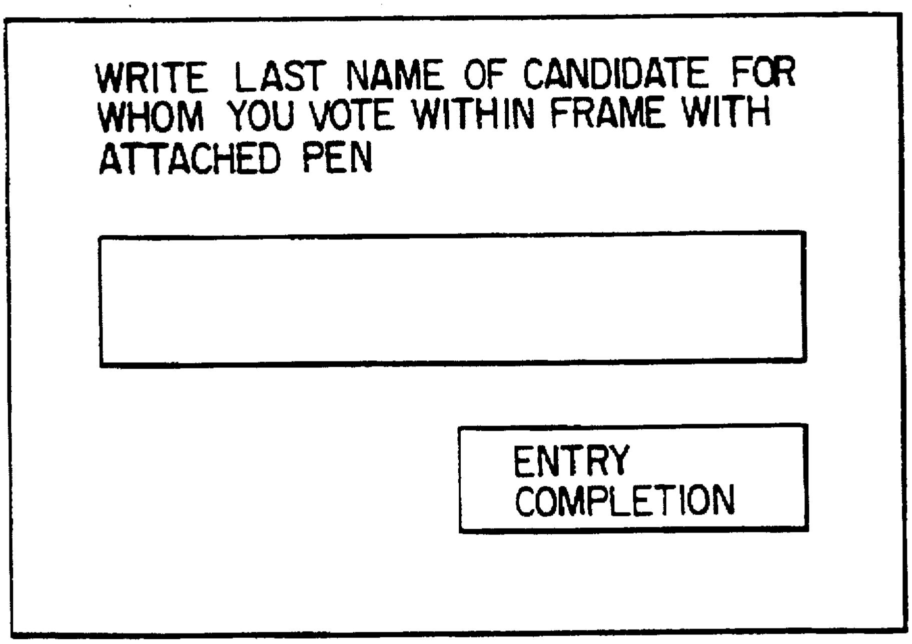
FIGS. 21 and 22 are views respectively showing display screens.

When an application program for election is started in the election terminal apparatus, system initialization processing is performed under the control of a CPU 12 (step El), and an initial screen is displayed (step E2). In the system initialization processing, initialization of processing data, processing of ensuring a memory area, and the like are performed. FIG. 21 shows an example of an initial screen. This initial screen includes a message "PLEASE WRITE NAME OF CANDIDATE FOR WHOM YOU WANT TO VOTE WITHIN FRAME WITH ATTACHED PEN", a region in which characters are written (handwritten character recognition region), and an icon designating "ENTRY COMPLETION".

The CPU 12 causes interruptions with respect to a tablet controller 10 at predetermined intervals, and stores the coordinate values of positions designated by a pen 3 and the state data of the built-in switch of the pen 3 in a position data buffer 27A. In step E3, the CPU 12 reads out the stored contents from the position data buffer 27A to check whether a position on a transparent tablet 5 is designated by the pen 3. If no position is designated, the CPU 12 waits until a position is designated. If a position is designated, the CPU 12 checks the designated region on the basis of data in a region data buffer 29 under the control of a region discriminating section 23B (step E4).

If, for example, a voter writes a candidate name within a frame while the initial screen is displayed, the flow advances to step E32 through steps E3, E4, and E5. In step E32, the CPU 12 causes a handwriting data buffer 27B to store the coordinate data held in the position data buffer 27A. With this processing, a coordinate data group indicating handwriting is retained in the handwriting data buffer 27B. In step E6 (FIG. 20B), the CPU 12 checks whether a recognition processing flag in a RAM 13 is ON. If NO in step E6, the CPU 12 performs recognition initialization processing for character recognition (step E7). Upon completion of the recognition initialization processing, the recognition initialization flag is turned on (step E8). If YES in step E6, the flow jumps to step E9.

In step E9, the CPU 12 performs handwritten character recognition processing under the control of a recognition processing section 23A. More specifically, when a voter writes a character in a handwritten character recognition region (frame), the coordinate data of a position designated by the pen 3 is stored in the handwriting data buffer 27B. The CPU 12 superposes/displays the trace of the pen 3 in the character recognition region. The recognition processing section 23A acquires a character code corresponding to the handwritten pattern on the basis of the coordinate data stored in the handwriting data buffer 27B and a dictionary stored in a dictionary data buffer 28. A recognition result output upon completion of the character recognition processing is displayed on the handwritten character recognition region (step E11). Thereafter, the flow returns to step E3 to wait for the next input.

When the candidate name is completely written, and "ENTRY COMPLETION" as an icon Bf is designated by the pen 3, the flow advances to step E16 (FIG. 20C) through steps E3, E4, E5, and E12. If YES in step E16, the flow advances to step E17.

In step E17, the CPU 12 starts a search section 24 to search out a candidate corresponding to the characters recognized in step E9 from the candidates registered in a candidate buffer 31. If it is determined upon this search processing that there is only one candidate corresponding to the input character string (YES in step E18; NO in step E19), confirmation screen 2 such as the one shown in FIG. 15 is displayed on the basis of the corresponding candidate data in the candidate buffer 31 (step E20). Thereafter, the flow returns to step E3 to wait for the next input.

When the voter designates an icon "YES" with the pen 3 while screen 2 is displayed, the flow advances to step E26 (FIG. 20D) through steps E3 to E5, E12, E24, and E25. In step E26, the CPU 12 performs voting processing, and adds "1" to the count value of a vote count buffer 318 corresponding to the candidate who has received the vote. The flow then returns to step E2 to display the initial screen for the next voter.

If the voter designates an icon "NO" with the pen 3 on screen 2, the initial screen is displayed again (steps E27 and E28).

Figure 22:
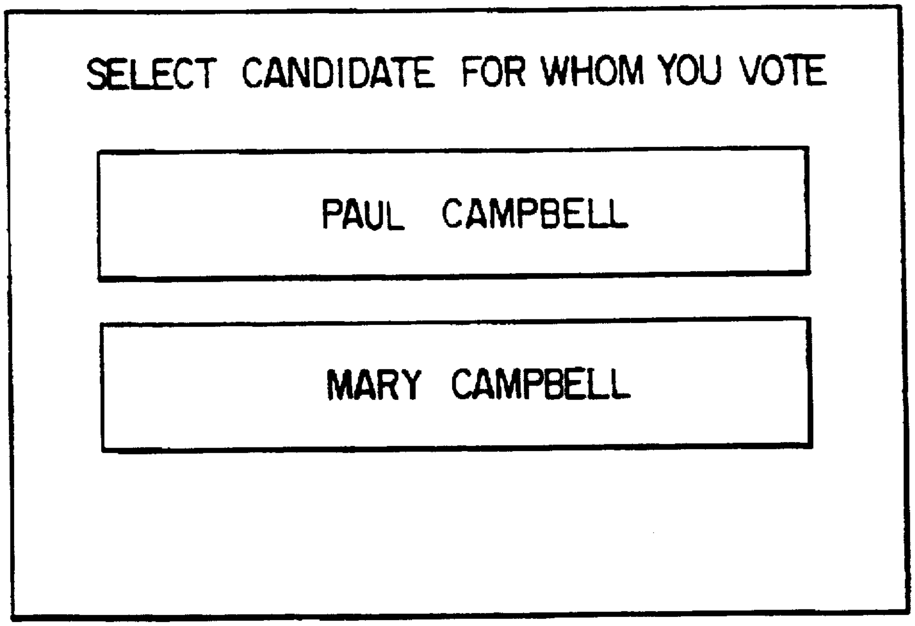

If it is determined upon the search processing in step E17 that there are a plurality of candidates corresponding to the input character string, screen 3 having such a plurality of candidates to be selected is displayed, as shown in FIG. 22 (steps E19 and E21).

When the voter designates an icon corresponding to one candidate with the pen 3 while screen 3 shown in FIG. 22 is displayed, screen 2 associated with the designed candidate is displayed to urge the voter to confirm the candidate (steps E29 to E31).

If no corresponding candidate is searched out upon the search processing in step E17, a message "PLEASE WRITE CANDIDATE NAME AGAIN" or the like is displayed, and the input data is deleted (steps E18, E22, and E23).

In this embodiment, a voter is requested to write the last name of a candidate. However, a voter may be requested to write the initials or first name of a candidate.

According to the fourth embodiment, when part of a candidate name is written, corresponding candidates are displayed. One candidate is selected from the displayed candidates. Such operations can be easily performed, and voting errors are small.

(Fifth Embodiment)

An election terminal apparatus according to the fifth embodiment of the present invention will be described next.

The arrangement of the election terminal apparatus of this embodiment is substantially the same as that of the election terminal apparatus of the first embodiment described with reference to FIGS. 1 to 9. For this reason, an operation of the apparatus will be mainly described with reference to FIGS. 14 and 23.

When an application program for election is started in the election terminal apparatus, system initialization processing is performed under the control of a CPU 12 (step F1), and the initial screen shown in FIG. 14 is displayed (step F2). In the system initialization processing, initialization of processing data, processing of ensuring a memory area, and the like are performed.

When a voter selects a candidate with a pen 3 while the initial screen shown in FIG. 14 is displayed, screen 2 (FIG. 18) associated with the selected candidate is displayed (steps F5, F6, and F7). The CPU 12 stores candidate information (private information) representing the selected candidate in a vote data record in an election information file 17 (Step F16). When the voter writes the candidate name in an input region with the pen 3 in accordance with the guidance message on screen 2, the coordinates designated by the distal end of the pen 3 are detected in step F3. The flow then advances to step F15 through steps F3 to F5, FS, and F9. In step F15, coordinate data representing the handwriting is retained in a handwriting data buffer 27B. In step F10, the handwriting is displayed. Thereafter, the flow returns to step F3 to wait for the next input.

Upon writing the candidate name, the voter designates "ENTRY COMPLETION" as an icon Be with the pen 3. The flow then advances to step F12 through steps F3 to F5, F8, F9, and F11. In step F12, the CPU 12 performs recognition processing with respect to the handwritten characters under the control of a recognition processing section 23A.

If the candidate defined by the recognized characters coincides with the candidate selected on the initial screen, the CPU 12 performs voting processing and adds "1" to the vote count of the candidate (steps F13 and F14). In addition, the CPU 12 stores the position data group and the corresponding candidate information, retained in the handwriting data buffer 27B, in the election information file 17. Subsequently, the flow returns to step F2 to display the initial screen.

If the candidate defined by the recognized characters does not coincide with the selected candidate, the flow returns from step F13 to step F2 to display the initial screen.

Figure 23B:
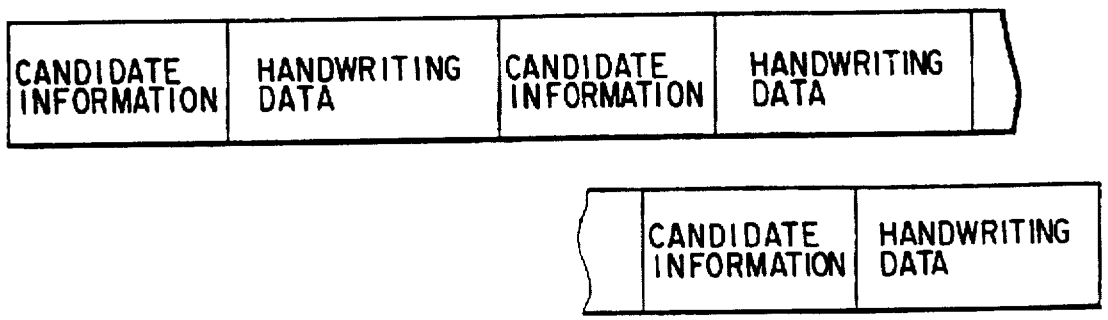
FIG. 23B is a view showing a record format of vote data including private data and handwriting data.
Figure 20C:
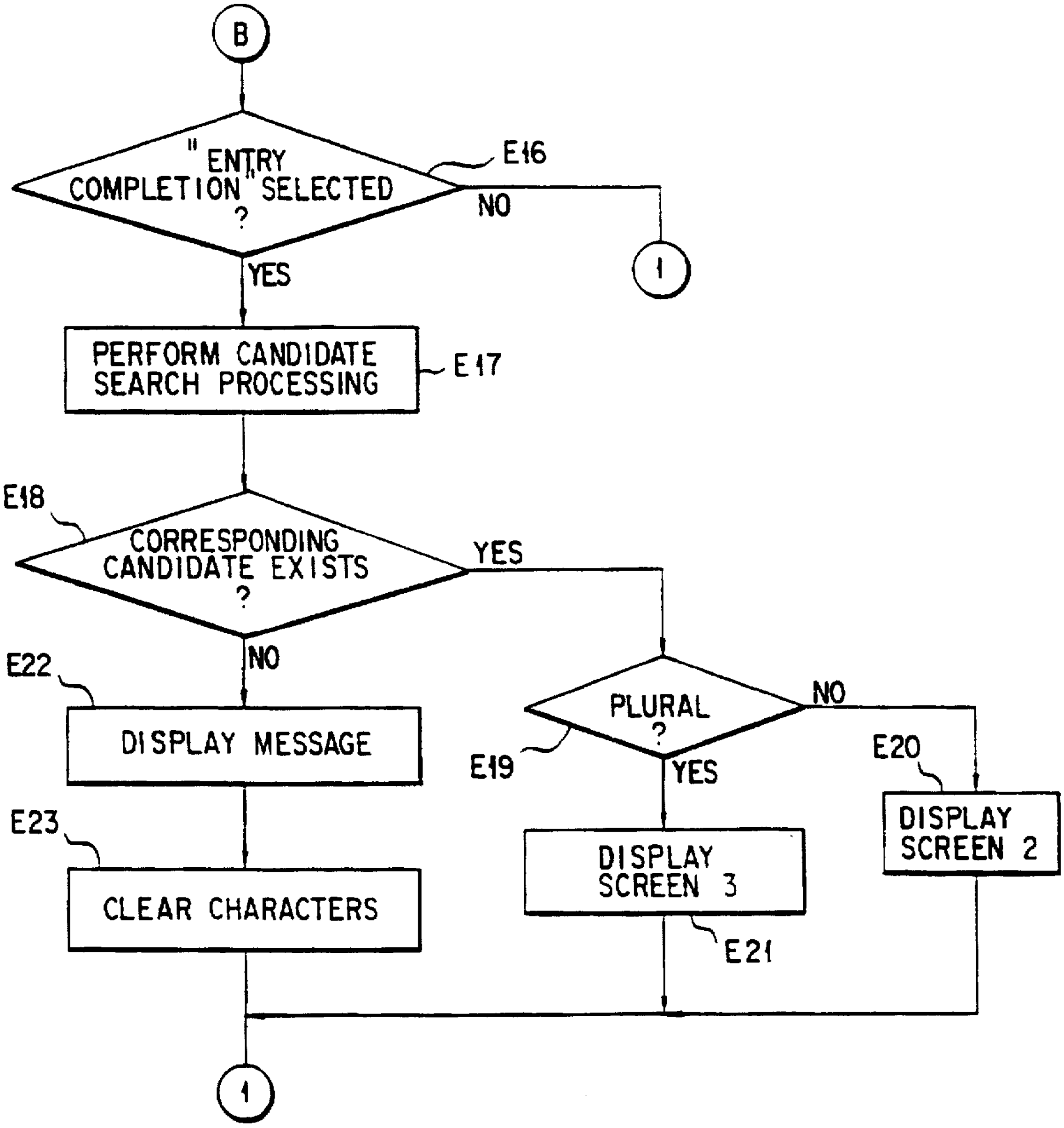
Figure 20D:
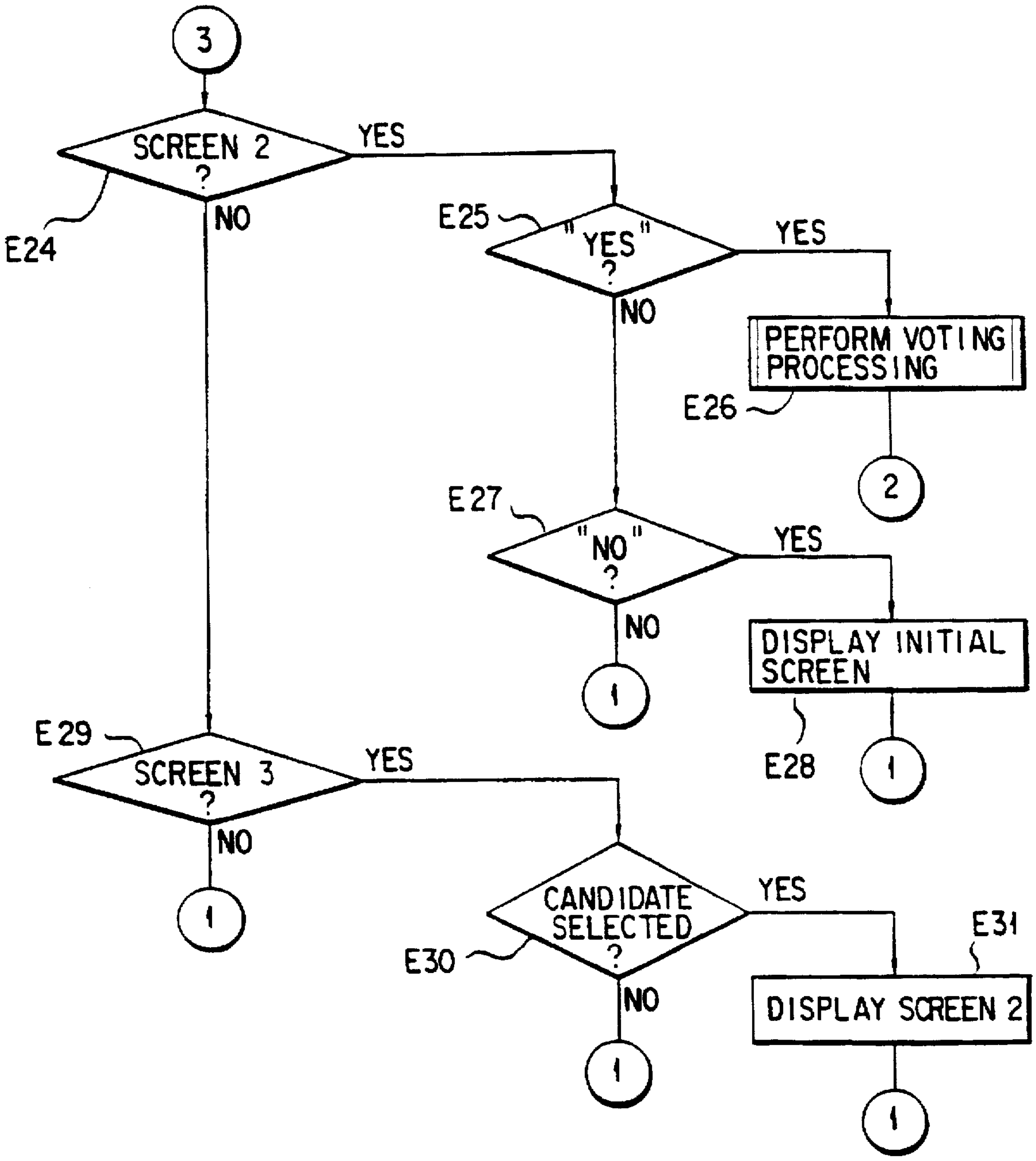
Figure 23A:
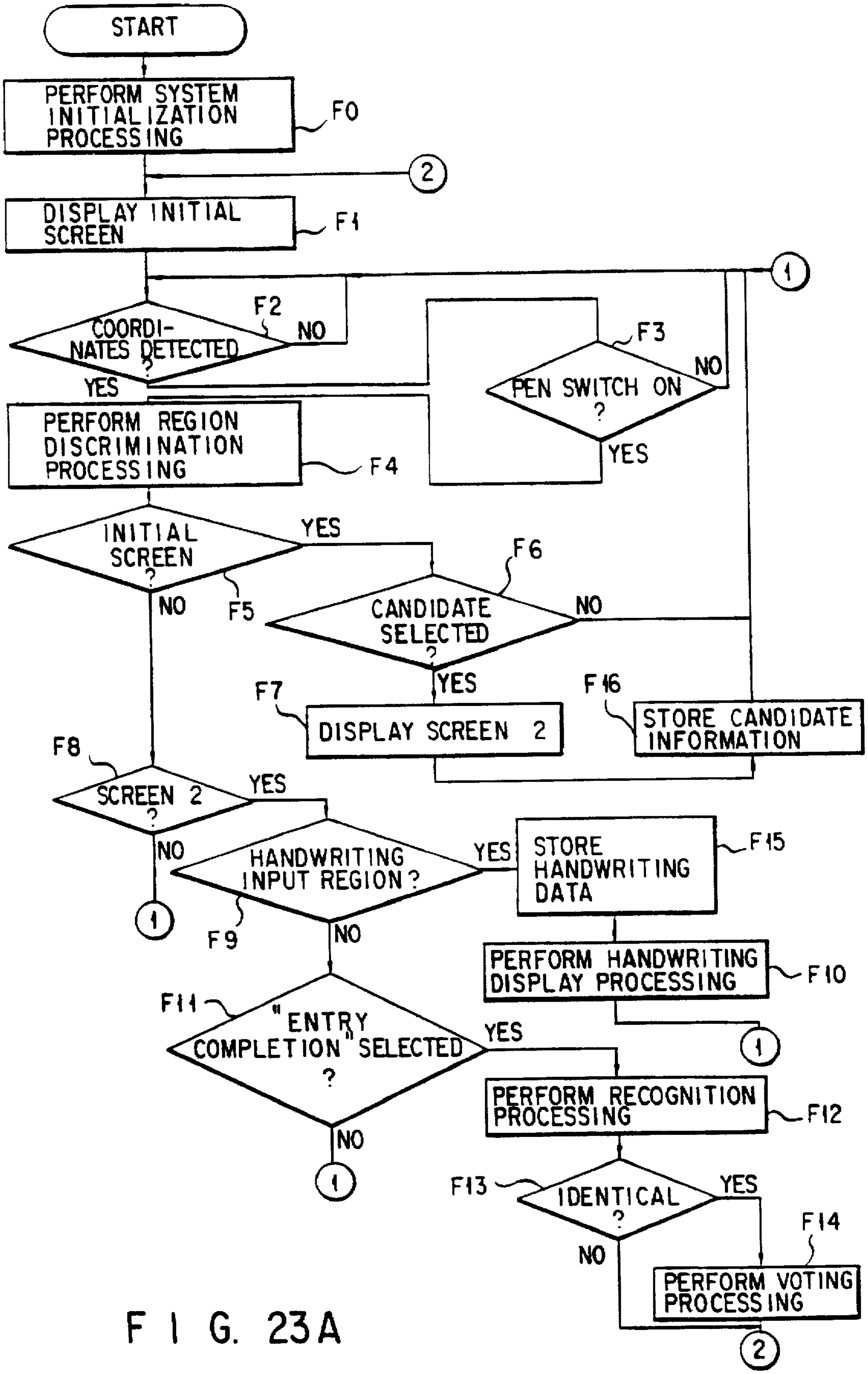
FIG. 23A is a flow chart showing an operation sequence of an election terminal apparatus according to the fifth embodiment of the present invention.

In this embodiment, the candidate information and handwriting data representing each candidate are stored in the election information file 17 in the form shown in FIG. 23B.

At the end of election, at predetermined intervals, or after a predetermined number of votes are cast, vote data including private information and handwriting data is transmitted to a host computer (totaling terminal) together with division data indicating each polling station. If a question about reliability of the election returns is raised, the host computer outputs the vote data associated with a specific polling station in such a manner that each candidate information and a corresponding handwriting image can be checked. With this operation, the votes cast can be checked again.

According to the fifth embodiment, voting errors are small because voting processing is performed only when a selected candidate name and a handwritten candidate name coincide with each other.

(Sixth Embodiment)

Figure 24:
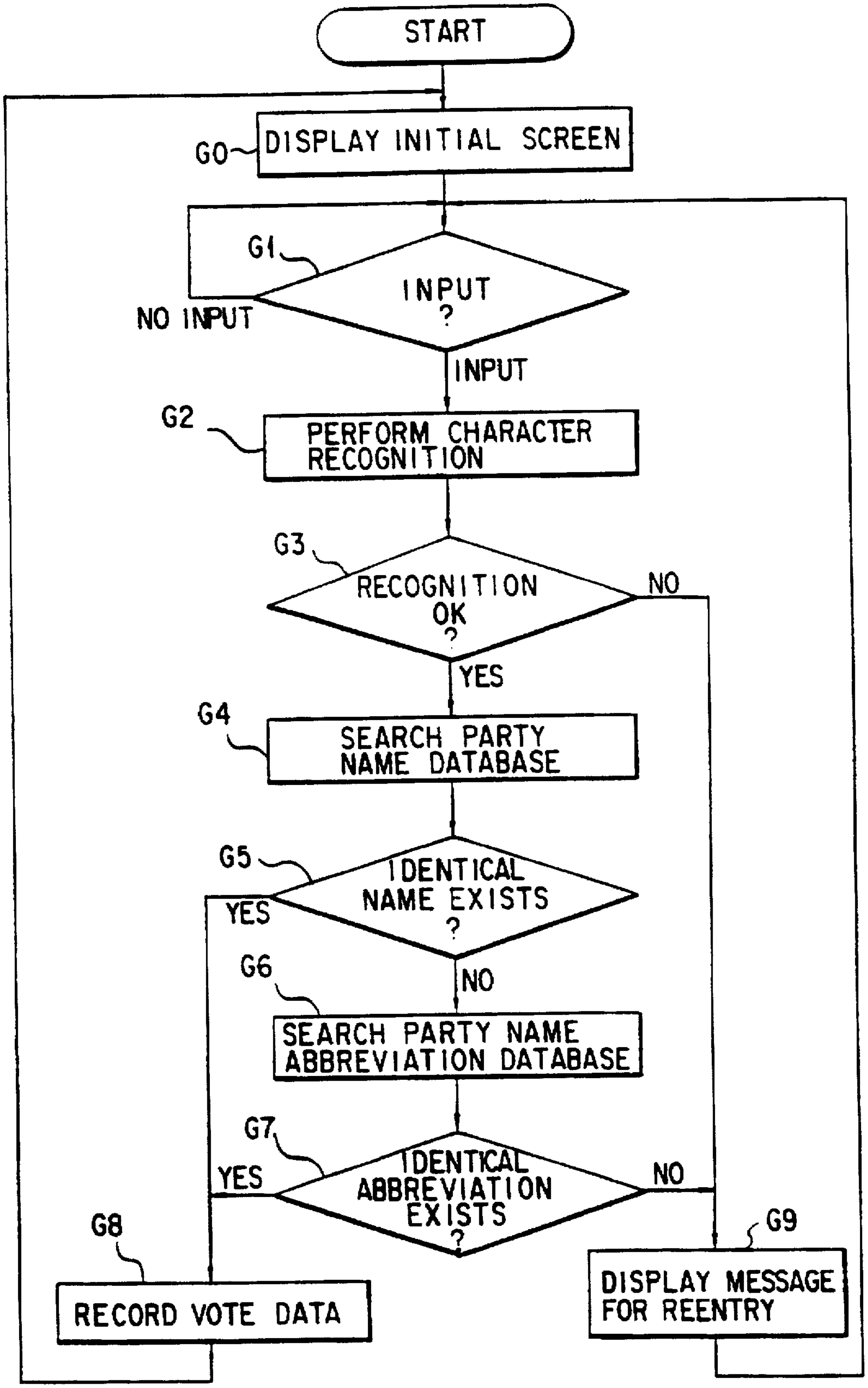
FIG. 24 is a flow chart showing an operation sequence of an election terminal apparatus according to the sixth embodiment of the present invention.

An election terminal apparatus according to the sixth embodiment of the present invention will be described next. The arrangement of the election terminal apparatus of this embodiment is substantially the same as that of the election terminal apparatus of the first embodiment. For this reason, only characteristic features of the sixth embodiment will be described below with reference to FIGS. 24 and 25.

Figure 25:
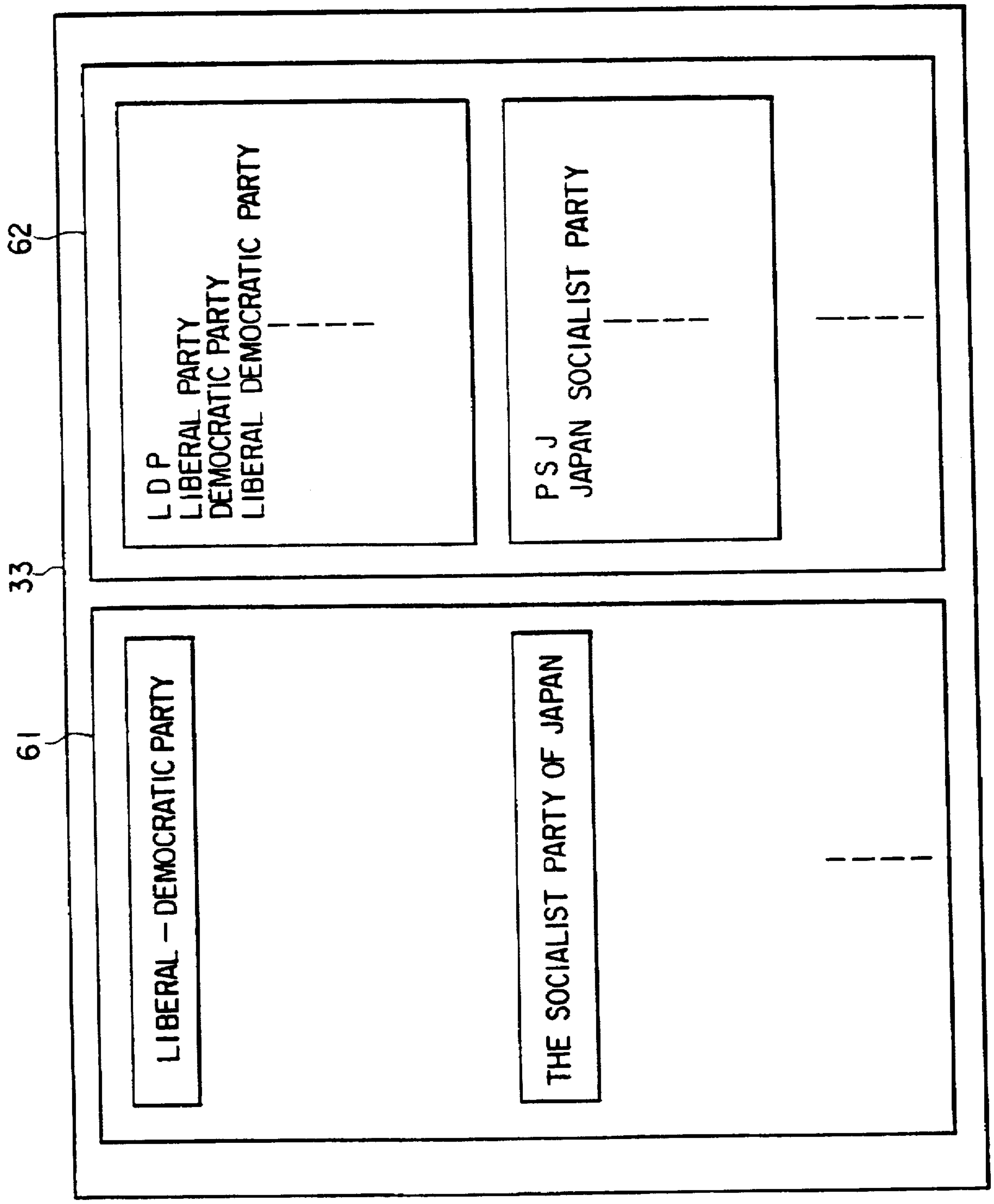
FIG. 25 is a view showing the arrangement of a party name buffer 33 in FIG. 6.
Figure 26:
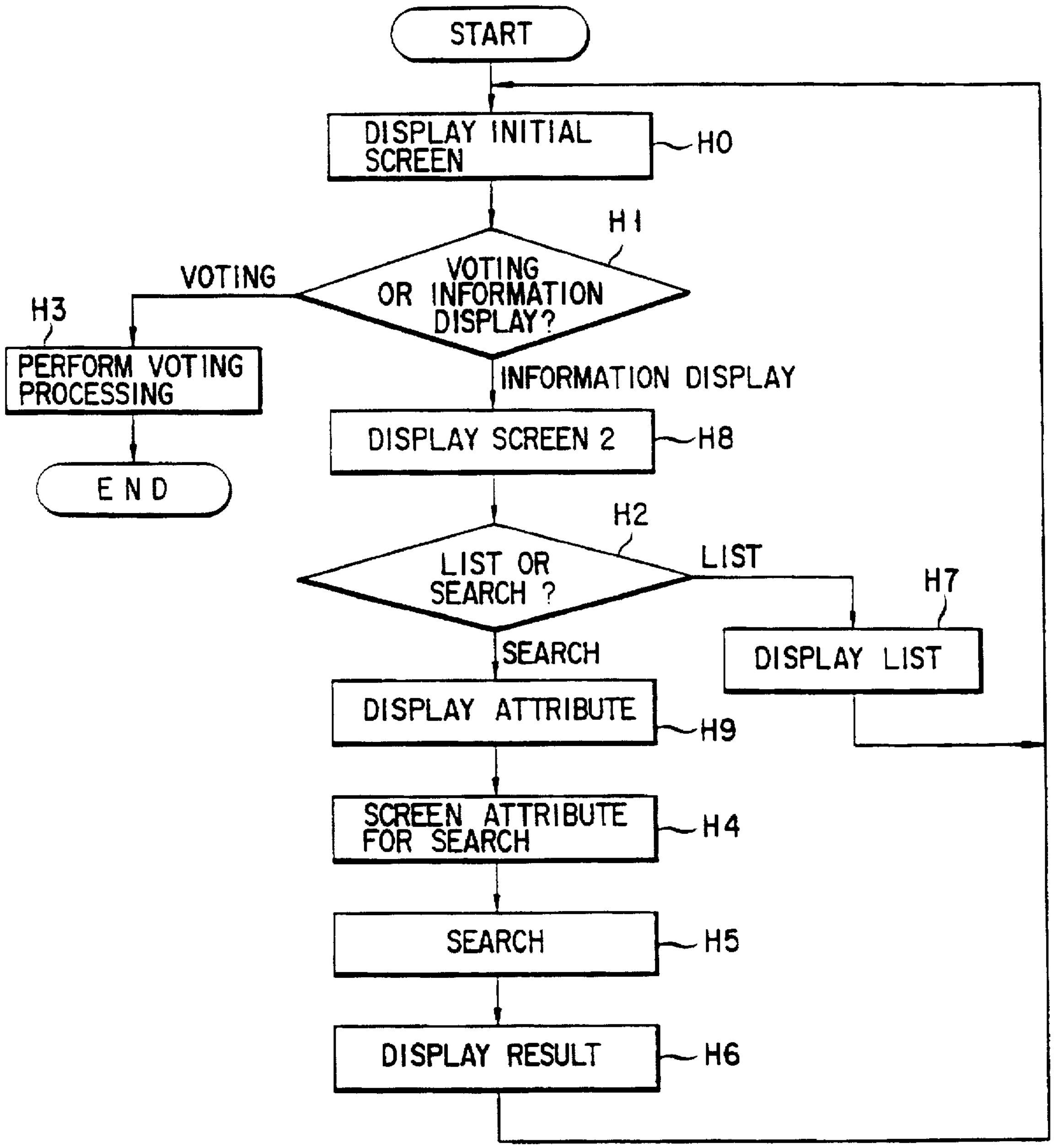
FIG. 26 is a flow chart showing an operation sequence of an election terminal apparatus according to the seventh embodiment of the present invention.

In the embodiment, as shown in FIG. 25, a party name buffer 33 stores a database 61 constituted by a list of the formal names of parties, and a database 62 constituted by a list of the abbreviations of the parties.

When an application program for election is started in the election terminal apparatus, an initial screen is displayed (step GO). This initial screen includes a handwritten character recognition region in which a party name is written.

When a voter writes the name of a party (or its abbreviation) for which he/she wants to vote in the handwritten character recognition region with a pen 3, the coordinates representing the trace of the pen 3 are retained in a handwriting data buffer 27B. A CPU 12 recognizes the written characters by using a handwritten character recognition technique on the basis of the coordinate data group retained in the handwriting data buffer 27B (steps G1 and G2).

If the written characters cannot be recognized, a message for urging the voter to write the party name again is displayed on a liquid crystal display 6 (steps G3 and G9). The flow then returns to step G1 to wait for an input operation.

When the written characters are successfully recognized, it is checked whether a name identical to the name defined by the recognized characters is included in the party name database 61 (step G4). If no corresponding name is included, it is checked whether a name identical to the name defined by the recognized characters is included in the party name abbreviation database 62 (steps G5 and G6). If no corresponding name is found again (step G7), a message for urging the voter to write the party name again is displayed on the liquid crystal display 6 (step G9). Thereafter, the flow returns to step G1 to wait for an input operation (step G1).

If a name coinciding with the character string recognized in step G2 is present in the database 61 or 62, "1" is added to the vote count of the corresponding party (step G8).

Note that the party name database 61 and the party name abbreviation database 62 may be integrated into one database. The apparatus of the sixth embodiment is not limited to voting for parties and may be applied to voting for candidates. In this Case, full names, last names, first names, initials, and the like are registered in a database.

According to this embodiment, even when a voter writes a party name or candidate name incorrectly or writes an abbreviation or the like, a voting operation accurately reflecting a voter's will can be performed.

(Seventh Embodiment)

An election terminal apparatus according to the seventh embodiment of the present invention will be described below. The arrangement of the election terminal apparatus of this embodiment is substantially the same as that of the election terminal apparatus of the first embodiment. For this reason, only an operation of the apparatus will be described below with reference to FIGS. 26 to 28B.

Figure 27:
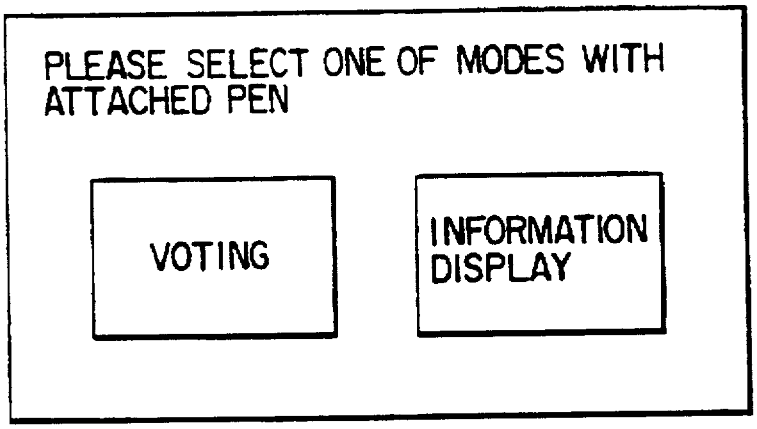
FIGS. 27 to 28B are views respectively showing display screens in the seventh embodiment.

When the power switch of the election terminal apparatus of this embodiment is turned on, an initial screen is displayed on a liquid crystal display 6 (step H0). As shown in FIG. 27, this initial screen includes an icon "VOTING", an icon "INFORMATION DISPLAY", and a message stating that one of the icons should be selected. A voter selects one of the two icons with a pen 3 (step H1).

Figure 28A:
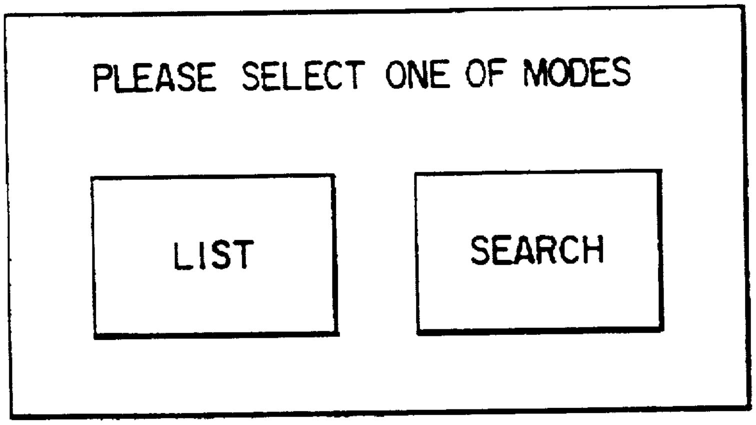

If the voter selects the icon "INFORMATION DISPLAY" with the pen 3, screen 2 shown in FIG. 28 is displayed (step H8). Screen 2 includes an icon "LIST" for displaying a list of candidates, and an icon "SEARCH" for searching and displaying candidates which coincide with a specific condition. If, for example, the voter selects the icon "LIST" (step H2), a list of candidate names is displayed for a predetermined period of time (step H7). Note that if all candidate names cannot be displayed on one screen, they are separately displayed a plurality of number of times.

Figure 28B:
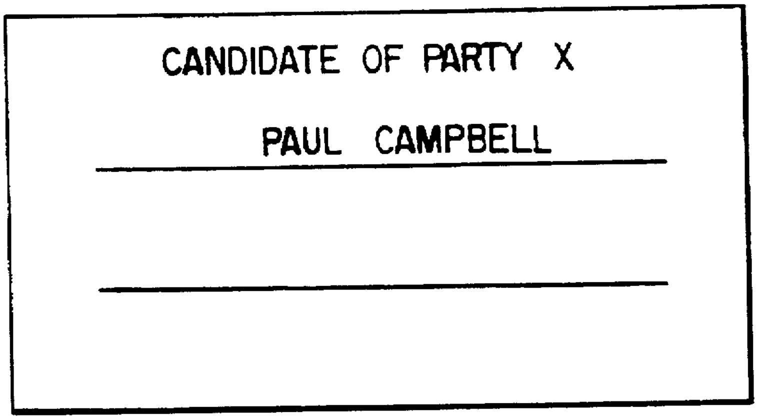

If the icon "SEARCH" is designated while screen 2 is displayed, the CPU 12 refers to a candidate buffer 31 to display attributes (e.g., party names and ages) which can used for a search (step H9). The voter selects one of the displayed attributes with the pen 3 (step H4). When an attribute is selected, the CPU 12 searches the candidate buffer 31 to find candidates who satisfy the attribute selected by the voter, under the control of a search section 24 (step H5). Subsequently, the search result is displayed, for example, as shown in FIG. 28B, for a predetermined period of time (step H6). The flow returns to step H0.

If the voter selects the icon "VOTING" while the initial screen is displayed, voting processing similar to the processing described in the first to sixth embodiments is executed.

Information associated with each candidate may be displayed as follows. When a voter designates a specific candidate, information associated with the candidate is displayed.

According to the seventh embodiment, a voter can search out candidates who satisfy a given condition. This facilitates selection of a candidate.

(Eighth Embodiment)

An election terminal apparatus according to the eighth embodiment of the present invention will be described next.

A voter may call an attendant if, for example, he/she cannot understand the method of using the election terminal apparatus of the present invention. In this case, if a candidate or the like is displayed on a liquid crystal display 6, the content of the vote may be exposed to the attendant. Therefore, in this embodiment, when the voter operates a switch SW for calling the attendant, part or all of the display on the liquid crystal display 6 is cleared in response to the switching operation.

Figure 29:
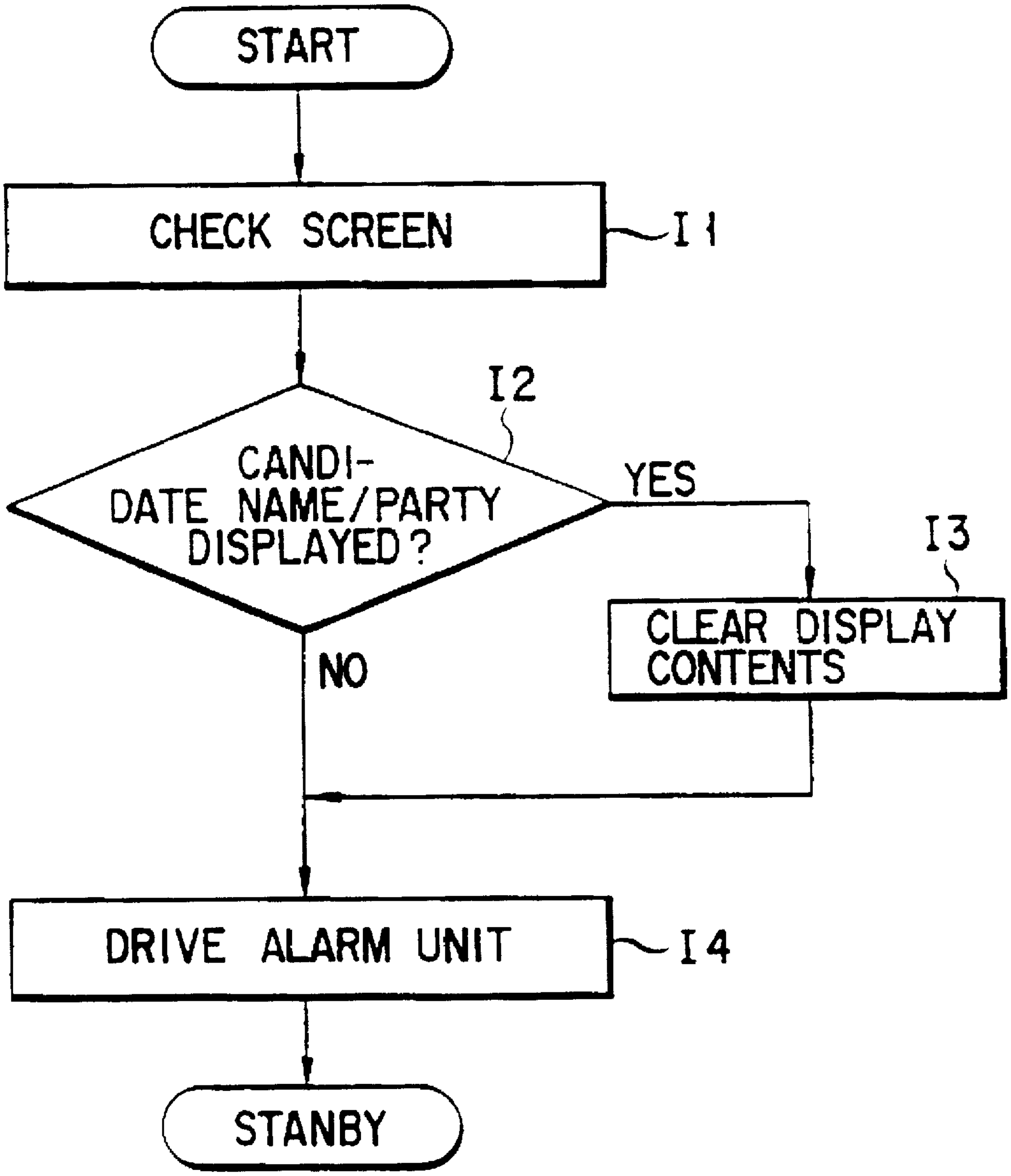
FIG. 29 is a flow chart showing an operation sequence of an election terminal apparatus according to the eighth embodiment of the present invention.

FIG. 29 is a flow chart showing an operation of the election terminal apparatus in a case wherein the switch for calling the attendant is operated. When the voter operates the switch SW for calling the attendant, an input/output interface 19B supplies an interruption signal to a CPU 12. The CPU 12 specifies the cause for the interruption and starts the processing shown in FIG. 29.

First, the CPU 12 checks whether the liquid crystal display 6 is displaying information indicating the content of the vote, e.g., information directly or indirectly indicating a candidate name or a party name (step I1). The display contents of the liquid crystal display 6 can be checked on the basis of the contents of a VRAM 15. If it is determined upon this checking that information indicating the content of the vote is displayed, the CPU 12 clears part or all of the display to prevent the attendant from seeing the information (steps I2 and I3). The CPU 12 then drives an alarm unit through the input/output interface 19B (step I4).

Even if it is determined in step I2 that no information indicating the content of the vote is displayed, the CPU 12 drives the alarm unit (step I4).

In response to the driving operation of the alarm unit, the attendant goes to the election terminal apparatus whose calling switch has been operated, and explains the operation method to the voter.

Such alarm units may be arranged in units of election terminal apparatuses, or one alarm unit may be arranged for a plurality of election terminal apparatuses. In the latter case, for example, a lamp is turned on in different manners or a speaker generates different sounds to allow the attendant to know which one of the calling switches of the election terminal apparatuses is operated. Alternatively, an icon for calling the attendant may be displayed on the liquid crystal display 6 to be designated with the pen 3.

According to the eighth embodiment, when an attendant teaches a voter how to operate the election terminal apparatus, the secrecy of a vote can be reliably protected.

(Ninth Embodiment)

An election terminal apparatus according to the ninth embodiment of the present invention will be described next. The election terminal apparatus of this embodiment is characterized in that a progress state of a voting operation performed by each voter is informed to a third person, e.g., an attendant.

Figure 30:
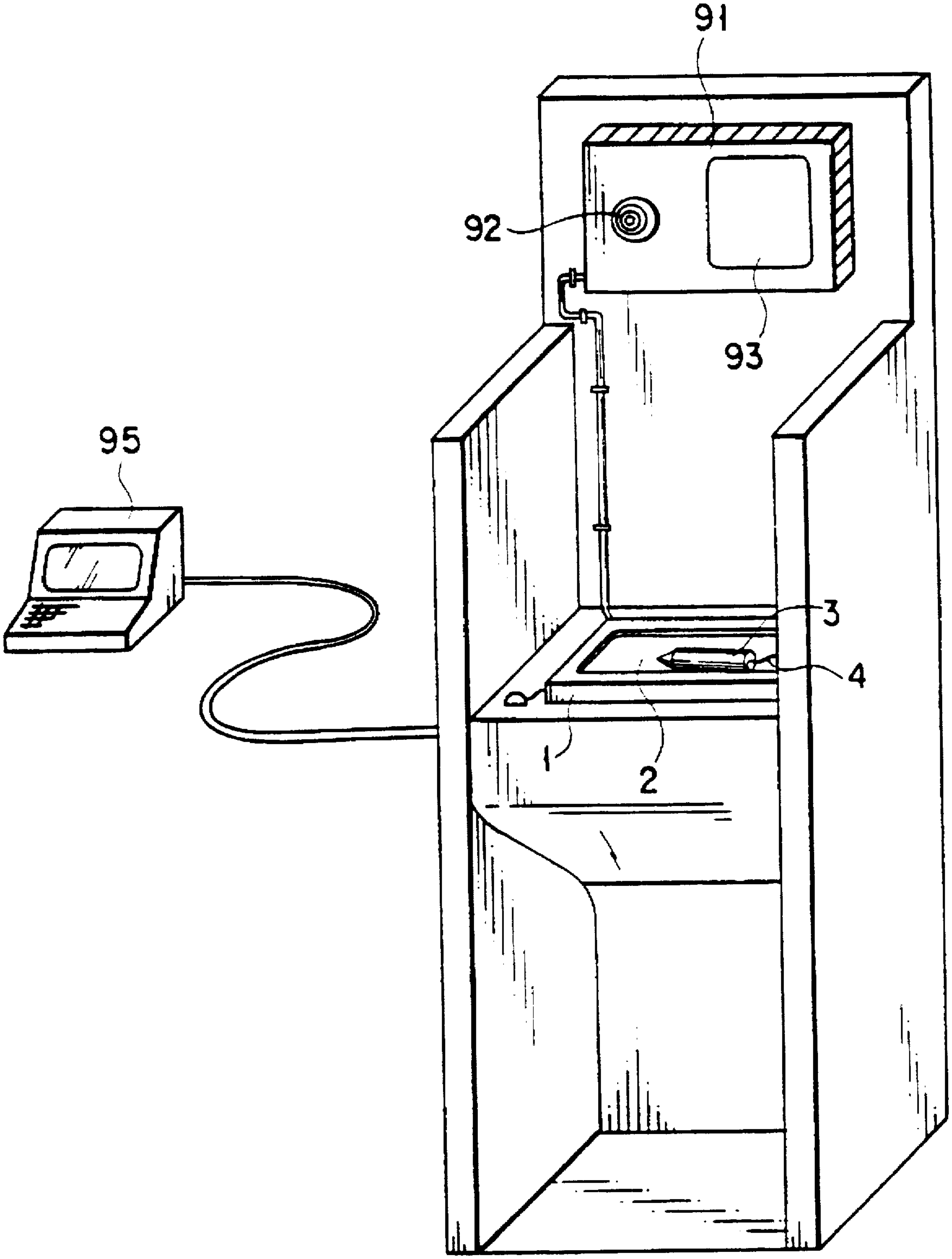
FIG. 30 is a perspective view showing an outer appearance of an election terminal apparatus according to the ninth embodiment of the present invention.

As shown in FIG. 30, a state display unit 91 as a characteristic feature of the ninth embodiment is connected to the election terminal apparatus through an input/output interface 19B. The state display unit 91 includes a lamp 92 for displaying a progress state of a voting operation, and a state display screen 93.

An attendant monitor 95 is also connected to the input/output interface 19B.

An operation of the election terminal apparatus according to the ninth embodiment will be described next with reference to FIGS. 31A and 31B.

Figure 31A:
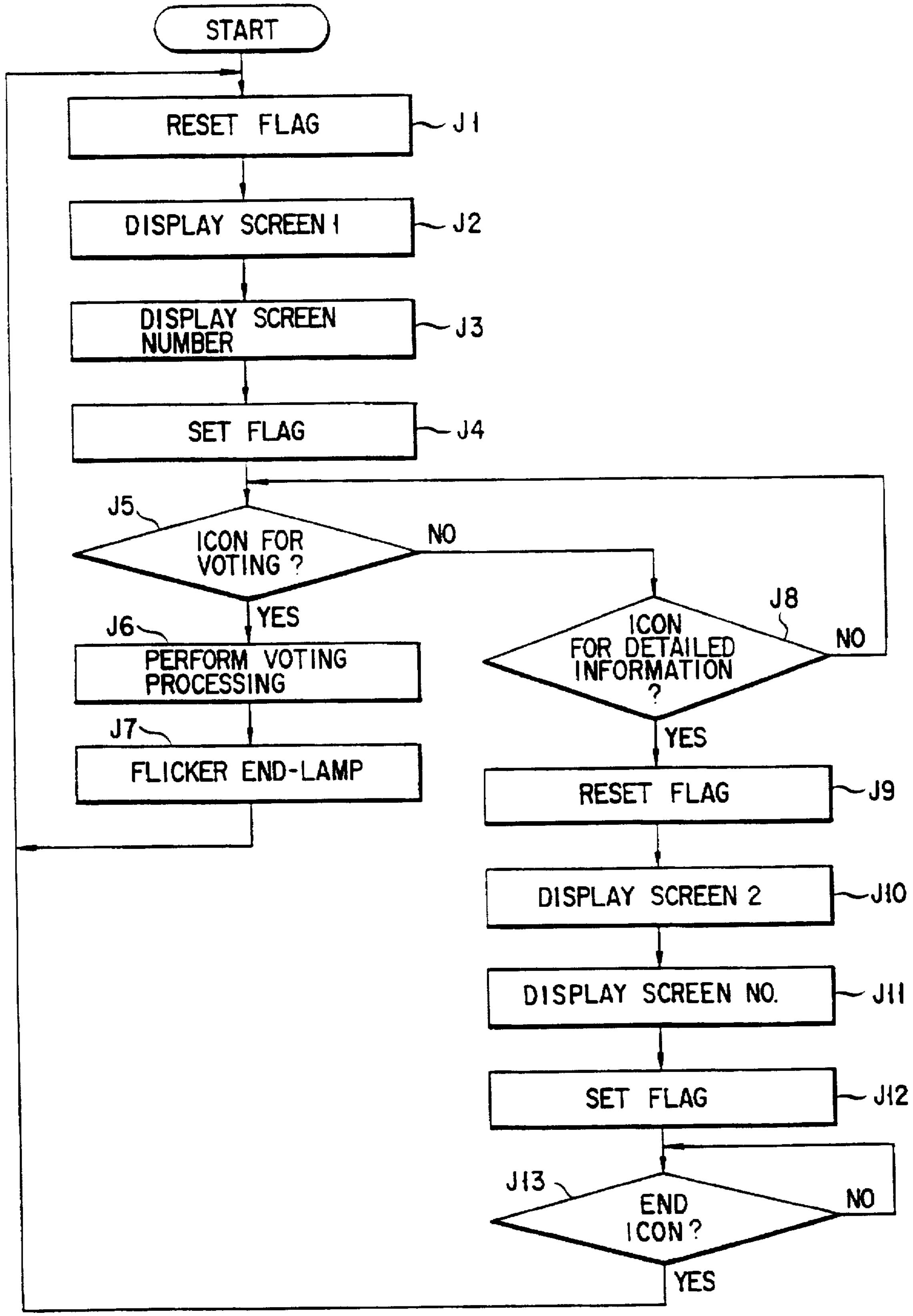
FIGS. 31A and 31B are flow charts showing an operation sequence of the election terminal apparatus according to the ninth embodiment.
Figure 31B:
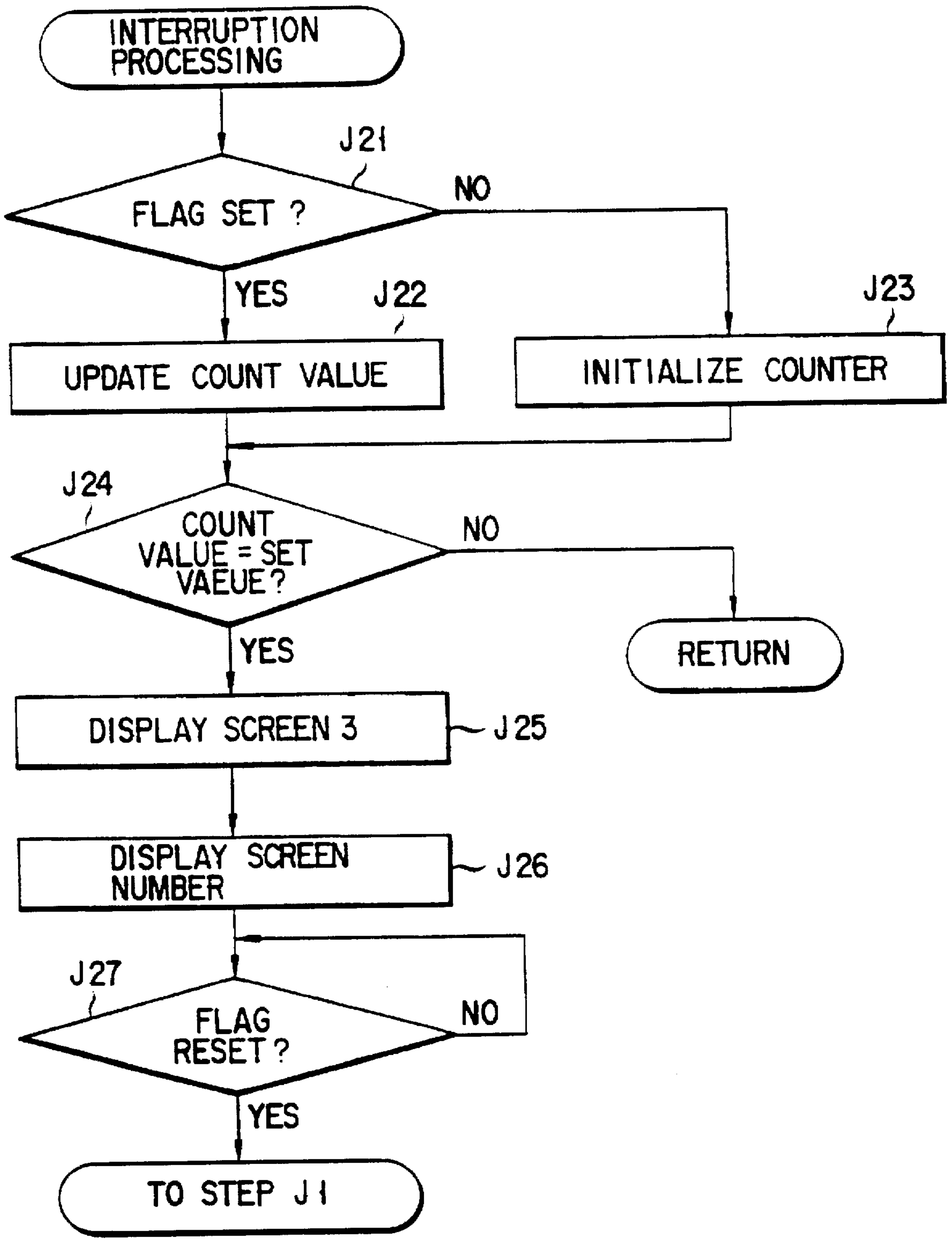
Figure 32:
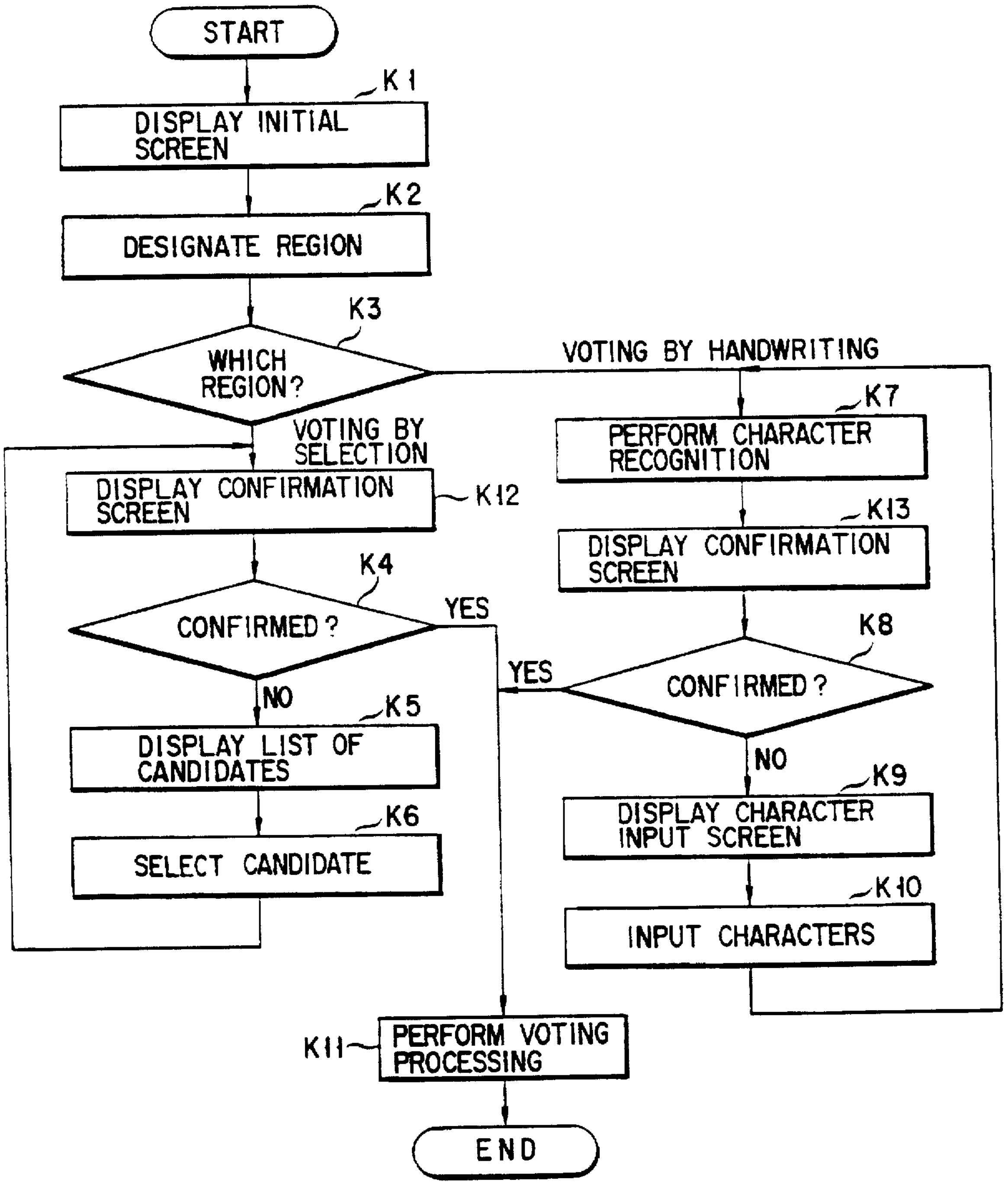
FIG. 32 is a flow chart showing an operation sequence of an election terminal apparatus according to the tenth embodiment of the present invention.

The election terminal apparatus of the embodiment executes the processing shown in FIG. 31A as a main routine. Interruption signals are supplied from a software timer or the like to a CPU 12 at predetermined intervals. The CPU 12 executes the processing shown in FIG. 31B in response to each interruption signal.

The main routine shown in FIG. 31A will be described first.

A counter control flag for initializing a counter is reset first (step J1). Screen 1 such as the one shown in FIG. 10 is displayed on a liquid crystal display 6 (step J2). Subsequently, a screen number currently displayed on the liquid crystal display 6, i.e., "1", is displayed on the state display screen 93 (step J3). The counter control flag is set (step J4).

It is checked in step J5 whether an icon for voting (an icon indicating a candidate name in FIG. 10) on screen 1 is designated with a pen 3. If YES in step J5, the vote count of the corresponding candidate (or party) is incremented by one (voting processing in step J6). Thereafter, the end lamp 92 for indicating the end of voting processing is flickered (step J7), with the flickering end lamp 92, the attendant can recognize the end of voting processing.

If NO in step J5, the flow advances to step J8. In step J8, it is checked whether a detailed information icon Ba is designated. If, NO in step J8, the flow returns to step J5.

If YES in step J8, the count control flag is reset to initialize the count value of the counter (step J9). Screen 2 shown in FIG. 11 is displayed (step J10). The screen number of screen 2, i.e., "2", is then displayed on the state display screen 93 (step J11). The counter control flag is set (step J12).

It is checked whether an icon "END" on the screen 2 is designated (step J13). If the icon "END" is not designated, decision in step J13 is repeated. If it is determined in step J13 that the icon "END" is designated, the flow returns to step J1 to display screen 1.

Interruption processing will be described next with reference to FIG. 31B. This interruption processing is started at a predetermined period in response to a timer interruption signal or the like. First, it is checked whether the counter control flag is set (step J21). If the counter control flag is set, the count value of the counter is updated (e.g., incremented) (step J22). If the counter control flag is reset, it is determined that the display screen is changed, and the count value of the counter is initialized (step J23).

It is checked in step J24 whether the count value of the counter has reached a .predetermined value. If NO in step J24, the interruption processing is completed.

If YES in step J24, screen 3 (not shown) is displayed on the liquid crystal display 6. Screen 3 includes a message for informing the voter that the display time of one screen exceeds a time limit. The screen number of screen 3, i.e., "3", is displayed on the state display screen 93 (step J26). The attendant then operates the attendant monitor 95 to reset the system. The flow then jumps to step J1 to display screen 1 again.

According to the ninth embodiment, an attendant can check a progress state of voting processing performed by a voter, and can teach the operation method as needed. Note that data displayed on the state display screen 93 need not be a numeral but may be a code or image indicating a screen number.

(Tenth Embodiment)

An election terminal apparatus according to the tenth embodiment of the present invention will be described next. The arrangement of the election terminal apparatus of this embodiment is substantially the same as that of the election terminal apparatus of the first embodiment. For this reason, only an operation of the apparatus will be described below with reference to FIGS. 14, 15, 32, and 33.

Figure 33:
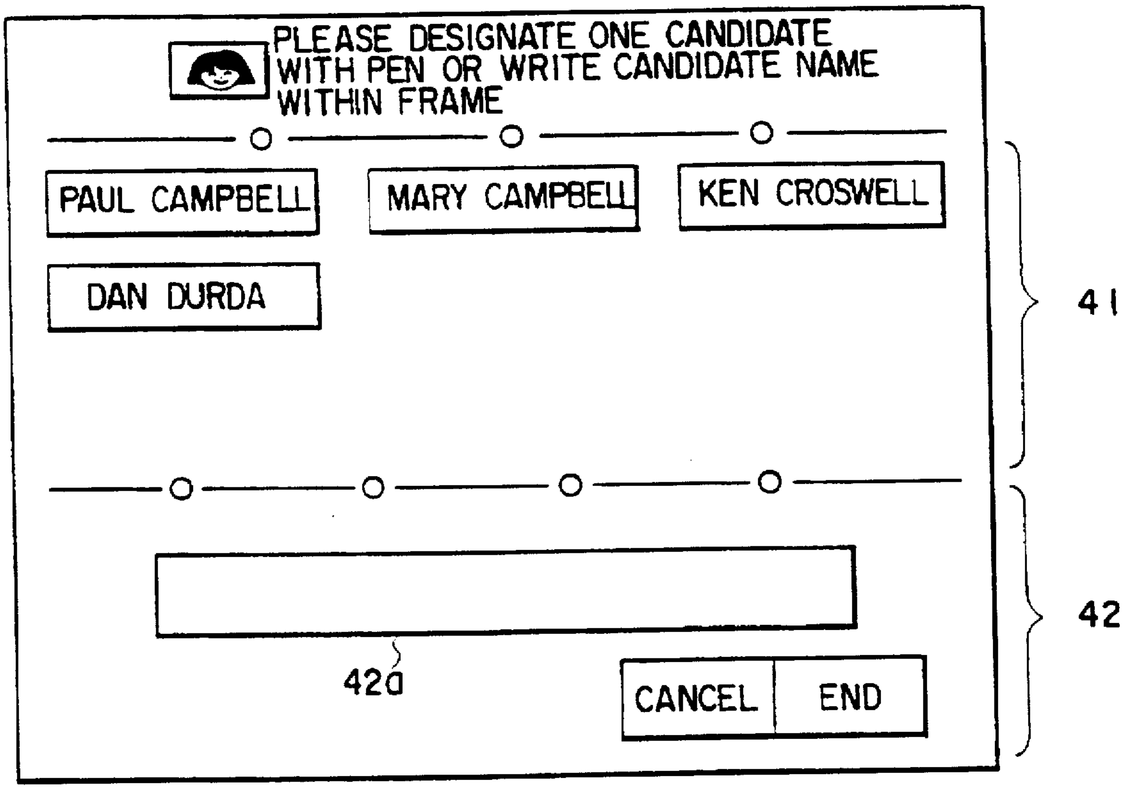
FIG. 33 is a view showing a display screen in the tenth embodiment.
Figure 34:
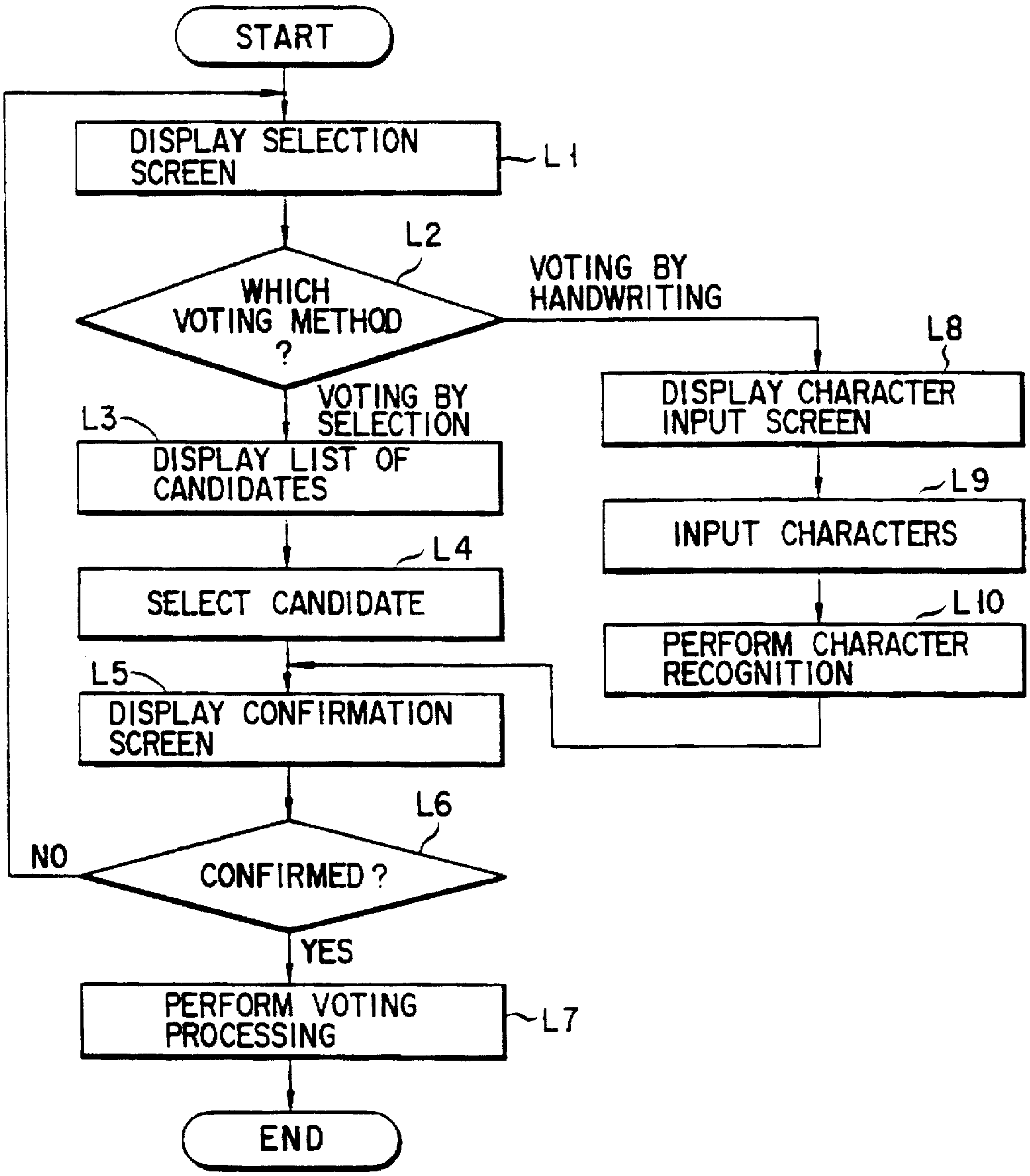
FIG. 34 is a flow chart showing an operation sequence of an election terminal apparatus according to the eleventh embodiment of the present invention.

When an application program for election is started in the election terminal apparatus, an initial screen is displayed on a liquid crystal display 6 (step K1). FIG. 33 shows an example of an initial screen. This initial screen includes a "VOTING BY SELECTION" region 41 for performing a voting operation by selecting one of icons indicating candidate names, and a "VOTING BY HANDWRITING" region 42 for performing a voting operation by handwriting a candidate name with a pen 3.

When a voter designates a candidate for whom he/she wants to vote, with the pen 3, in accordance with the guidance message (step K2), a region discriminating section 23B discriminates the designated region (step K3). The confirmation screen shown in FIG. 15 is then displayed on the liquid crystal display 6 (step K12). If the voter designates an icon "YES" with the pen 3 in accordance with the guidance message, the content of the vote is confirmed (steps K4 and K11), and the count value of a corresponding vote count buffer 318 is incremented by one. Thereafter, the flow returns to step K1 to display the initial screen for the next voter (step K1).

If the voter designates an icon "NO" with the pen 3 while the confirmation screen is displayed, the list of candidates shown in FIG. 14 is displayed (step K8). When the voter designates a candidate for whom he/she wants to vote, with the pen 3, in accordance with the guidance message (step K6), the flow returns to step K12 to display the confirmation screen. Subsequently, the above-described operation is repeated.

If the voter writes the name of a desired candidate in a region 42*a* with the pen 3 in step K1 while the initial screen is displayed, the flow advances from step K3 to step K7. In step K7, the CPU 12 recognizes the characters written in the region 42*a* under the control of a recognition processing section 23A (step K7). The CPU 12 displays a confirmation screen in accordance with the recognized characters (step K13). If the voter designates the icon "YES" with the pen 3, the content of the vote is confirmed (step K8), and the count value of the corresponding vote count buffer 318 is incremented by one (step K11).

If the voter designates the icon "NO" with the pen 3 while the confirmation screen is displayed in step K13, the candidate entry screen shown in FIG. 21 is displayed (step K9). If the voter writes a candidate name within the frame (step K10), the flow returns to step K7 to perform character recognition processing.

If the written characters cannot be recognized in step K7, or if there is no candidate corresponding to the recognized characters, the flow jumps to step K9.

According to the tenth embodiment, a voter can perform a voting operation by selecting a preferable one of the voting methods described above, i.e., the method of voting by selecting an icon, and the method of voting by writing a candidate name.

(Eleventh Embodiment)

An election terminal apparatus according to the eleventh embodiment of the present invention will be described next. The arrangement of the election terminal apparatus of this embodiment is substantially the same as that of the election terminal apparatus of the first embodiment. For this reason, only an operation of the apparatus will be described below with reference to FIGS. 14, 15, 21, 34, and 35.

Figure 35:
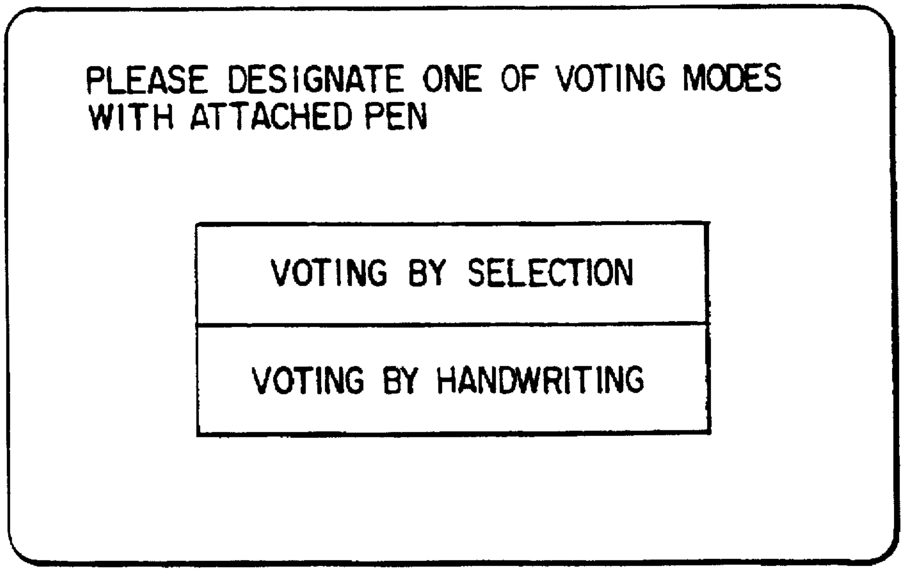
FIG. 35 is a view showing an initial screen in the eleventh embodiment.

When an application program for election is started in the election terminal apparatus, a selection screen such as the one shown in FIG. 35 is shown first (step L1). The selection screen is used to select either a voting method using a handwriting input screen or a voting method using a selection input screen.

When a voter designates either an icon "VOTING BY SELECTION" or an icon "VOTING BY HANDWRITING" with a pen 3, a region discriminating section 23B discriminates the designated icon on the basis of detected coordinates (step L2).

If the voter designates the icon "VOTING BY SELECTION" with the pen 3, a list of candidate names such as the one shown in FIG. 14 is displayed (step L3). When the voter selects one of the displayed candidates with the pen 3 (step L4), a confirmation screen including detailed information associated with the selected candidate is displayed, as shown in FIG. 15 (step L5).

If the voter selects "YES" in accordance with the guidance message, confirmation processing (incrementing the count value of a corresponding vote count buffer 318 by one; steps L6 and L7) is executed. If the voter selects "NO", the flow returns to step L1 to display the selection screen again.

If the voter selects the icon "VOTING BY HANDWRITING" while the selection screen is displayed, the flow advances from step L2 to step L8 to display the candidate entry screen shown in FIG. 21 (step L8). When the voter writes the name of a desired candidate within the frame with the pen 3 (step L9), the CPU 12 starts a character recognition section to recognize the written characters (step L10). The CPU 12 displays the confirmation screen shown in FIG. 15 in accordance with the recognized characters (step L5). If the voter designates the icon "YES" with the pen 3 in accordance with the guidance message, the content of the vote is confirmed (steps L6 and L7). If the voter designates the icon "NO" with the pen 3, the flow returns to step L1 to display the selection screen.

According to the eleventh embodiment, a voter can perform a voting operation by selecting a preferable one of the voting methods, i.e., the method of voting by selecting an icon, and the method of voting by writing a candidate name.

(Twelfth Embodiment)

An election terminal apparatus according to the twelfth embodiment of the present invention will be described next. The arrangement of the election terminal apparatus of this embodiment is substantially the same as that of the election terminal apparatus of the first embodiment. For this reason, only an operation of the apparatus will be described below with reference to FIGS. 36 to 40.

Figure 37:
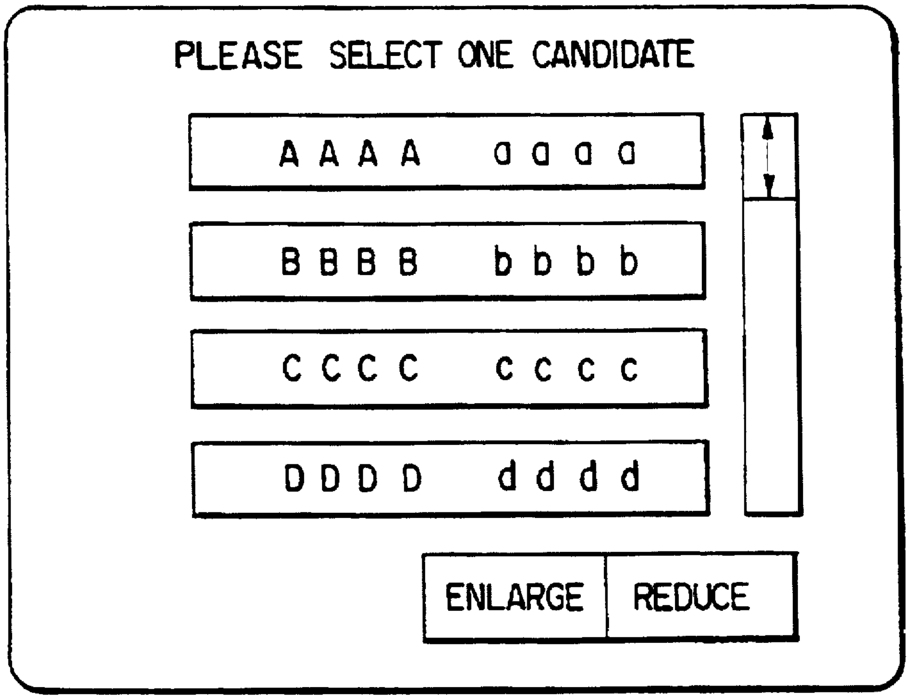
FIGS. 37 to 40 are views respectively showing display screens in the twelfth embodiment.
Figure 36:
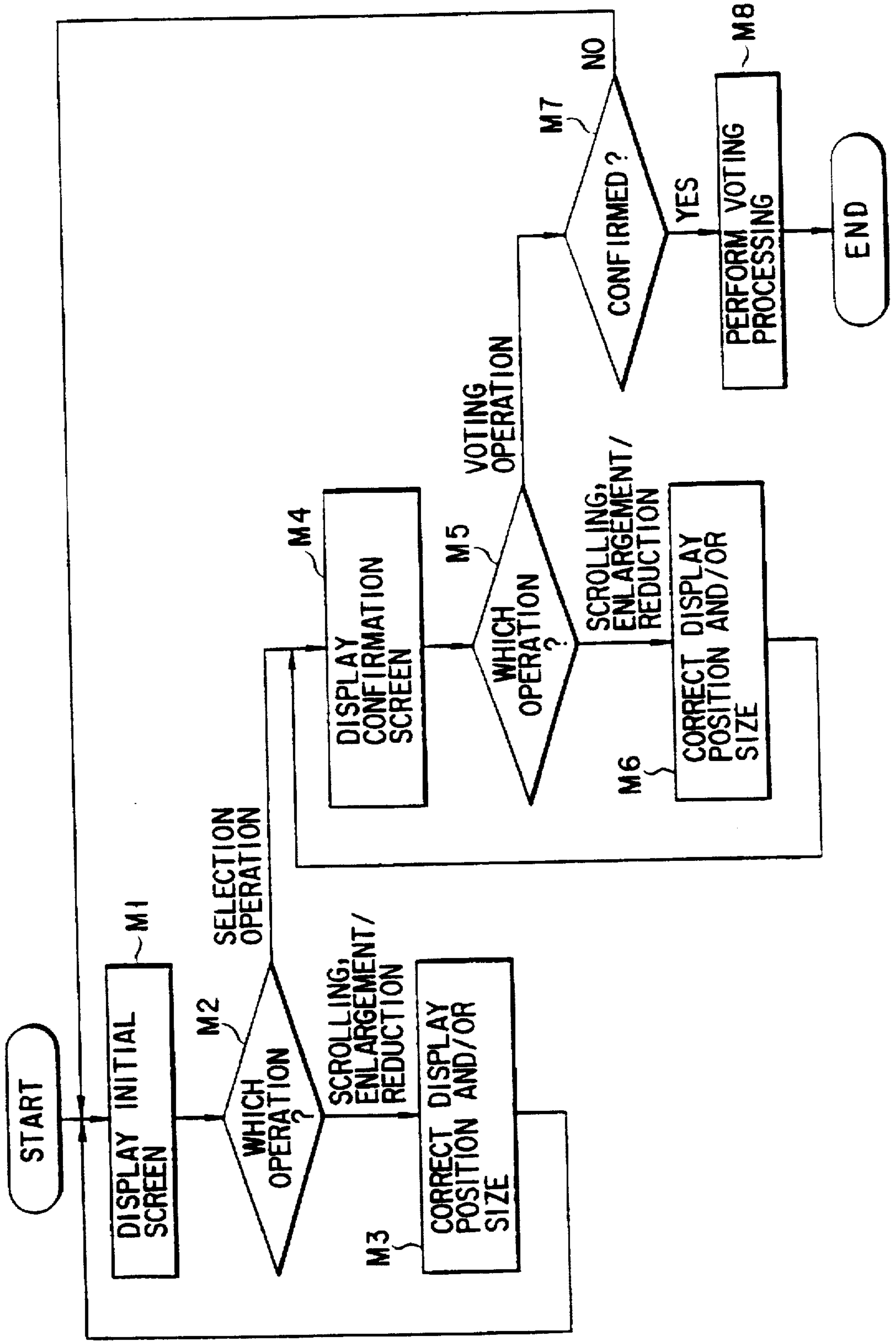
FIG. 36 is a flow chart showing an operation sequence of an election terminal apparatus according to the twelfth embodiment of the present invention.

When an application program for election is started in the election terminal apparatus, the initial screen shown in FIG. 37 is displayed (step M1 in FIG. 36). This initial screen includes a list of candidates, an icon SR for display scrolling, an icon for display enlargement, and an icon for display reduction.

When a voter designates one of the icons with a pen 3, a region discriminating section 23B discriminates the designated region (step M2). If any one of the icons for display scrolling, display enlargement, and display reduction is selected, the flow advances from step M2 to step M3. In step M3, a CPU 12 corrects the display position and the display size under the control of a display control section 25*a*. Thereafter, the flow returns to step M1.

Figure 38:
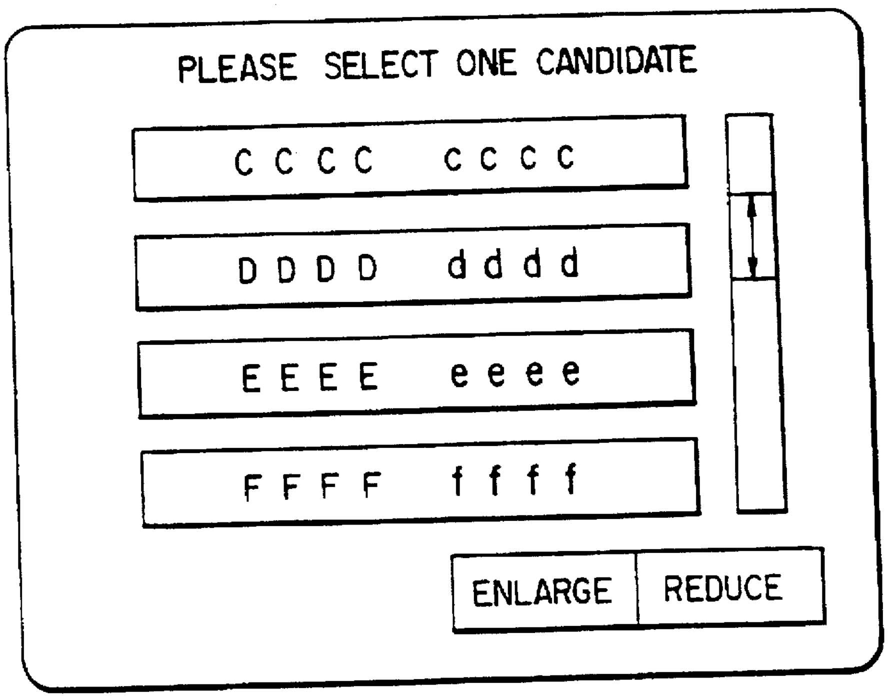
Figure 39:
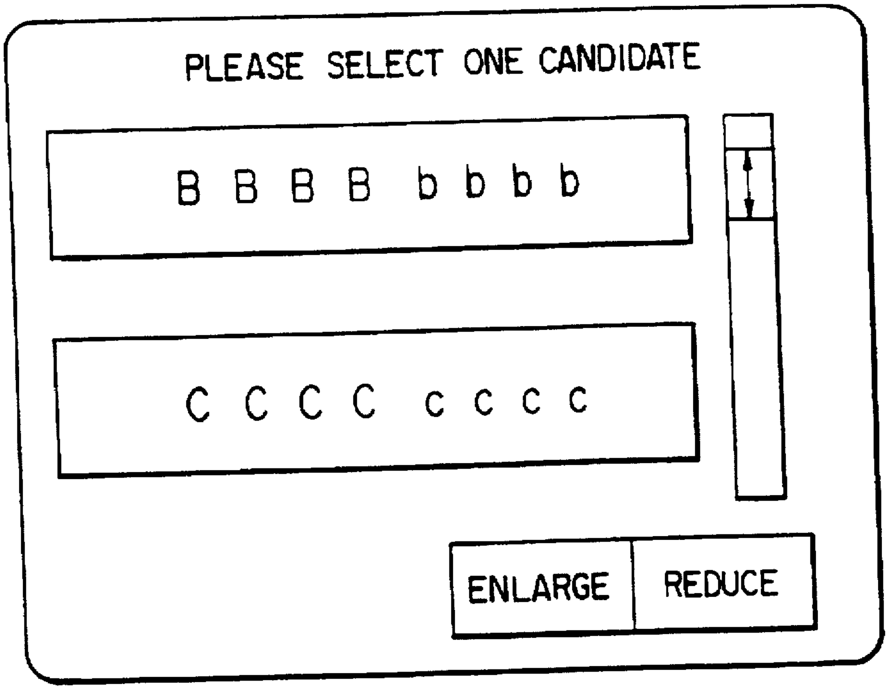

If, for example, the voter designates the icon SR for display scrolling with the pen 3, the display screen is scrolled, for example, as shown in FIG. 38, in step M3. If, for example, the voter designates the icon "ENLARGEMENT" with the pen 3, the candidate list is enlarged, for example, as shown in FIG. 39.

Figure 40:
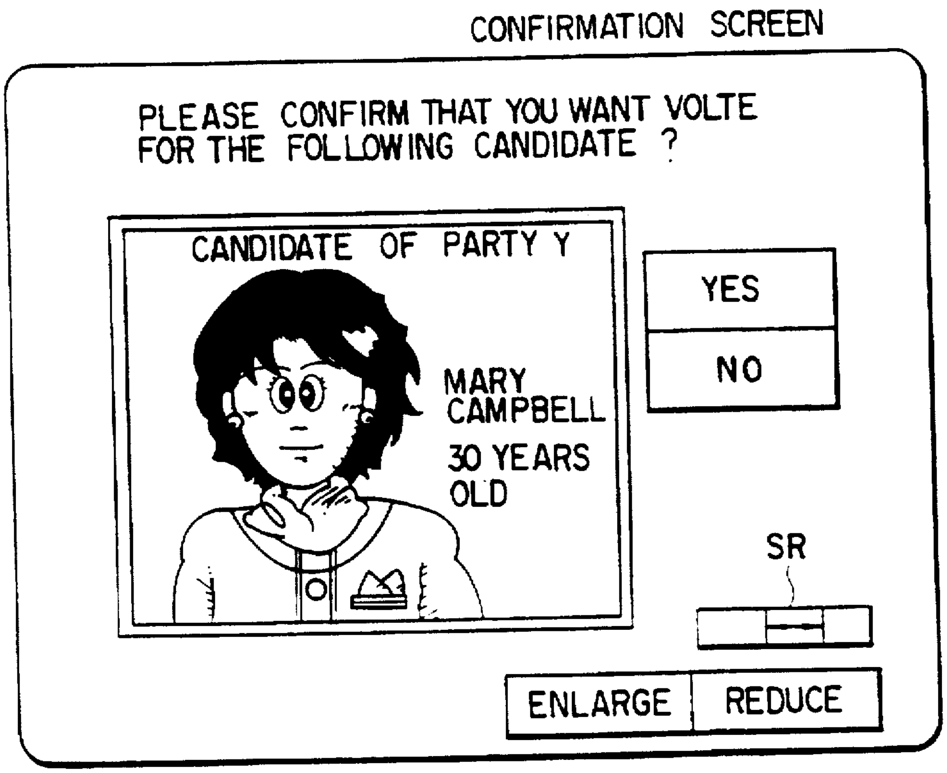

If the voter selects a candidate with the pen 3 while the candidate list is displayed, the flow advances from step M2 to step M4 to display the confirmation screen shown in FIG. 40. This confirmation screen includes detailed information associated with the selected candidate, an icon "YES" indicating that a vote is cast for a displayed candidate, an icon "NO" indicating that a vote is not cast for the displayed candidate, an icon SR for display scrolling, an icon for display enlargement, an icon for display reduction, and the like.

When the voter designates one of the icons with the pen 3 while the confirmation screen is displayed, the region discriminating section 23B discriminates the designated region (step M5). If any one of the icons for display scrolling, display enlargement, and display reduction is designated, the flow advances from step M5 to step M6. In step M6, the CPU 12 corrects the display position and the display size under the control of the display control section 25*a*. The flow then returns to step M4.

If the voter designates the icon "YES" on the confirmation screen with the pen 3, the flow advances from step M5 to step M8 through step M7. The content of the vote is confirmed, and the count value of a corresponding vote count buffer 318 is incremented by one.

If the voter designates the icon "NO" on the confirmation screen with the pen 3, the flow returns from step M7 to step M1 to display the initial screen. The voter performs the above-described operation from the beginning.

According to the twelfth embodiment, information which cannot be completely displayed on one screen can be seen by scrolling the display. In addition, display information can be arbitrarily enlarged or reduced on the screen as needed. With such operations, a voting operation can be smoothly performed.

(Thirteenth Embodiment)

An election terminal apparatus according to the thirteenth embodiment of the present invention will be described next. The arrangement of the election terminal apparatus of this embodiment is substantially the same as that of the election terminal apparatus of the first embodiment. For this reason, only an operation of the apparatus will be described below with reference to FIGS. 15 and 41 to 44.

Figure 42:
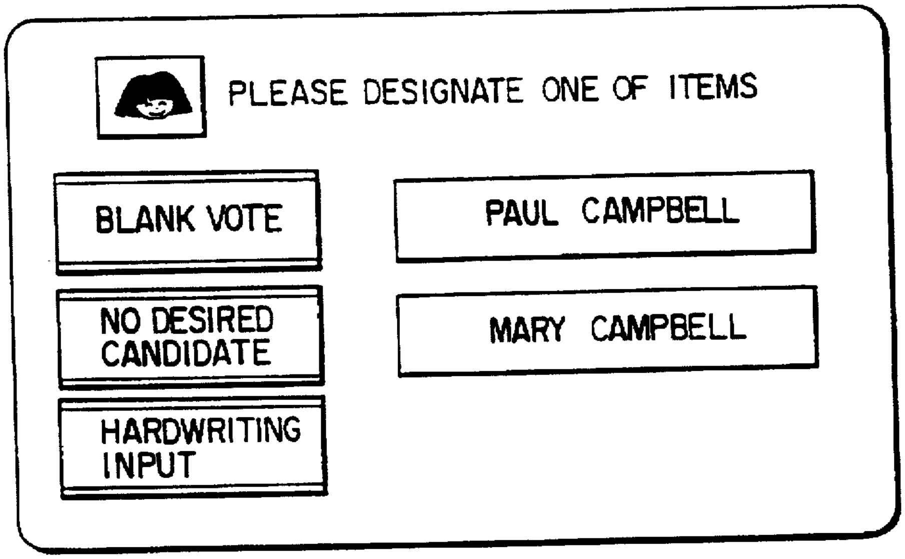
FIGS. 42 to 44 are views respectively showing display screens in the thirteenth embodiment.
Figure 41:
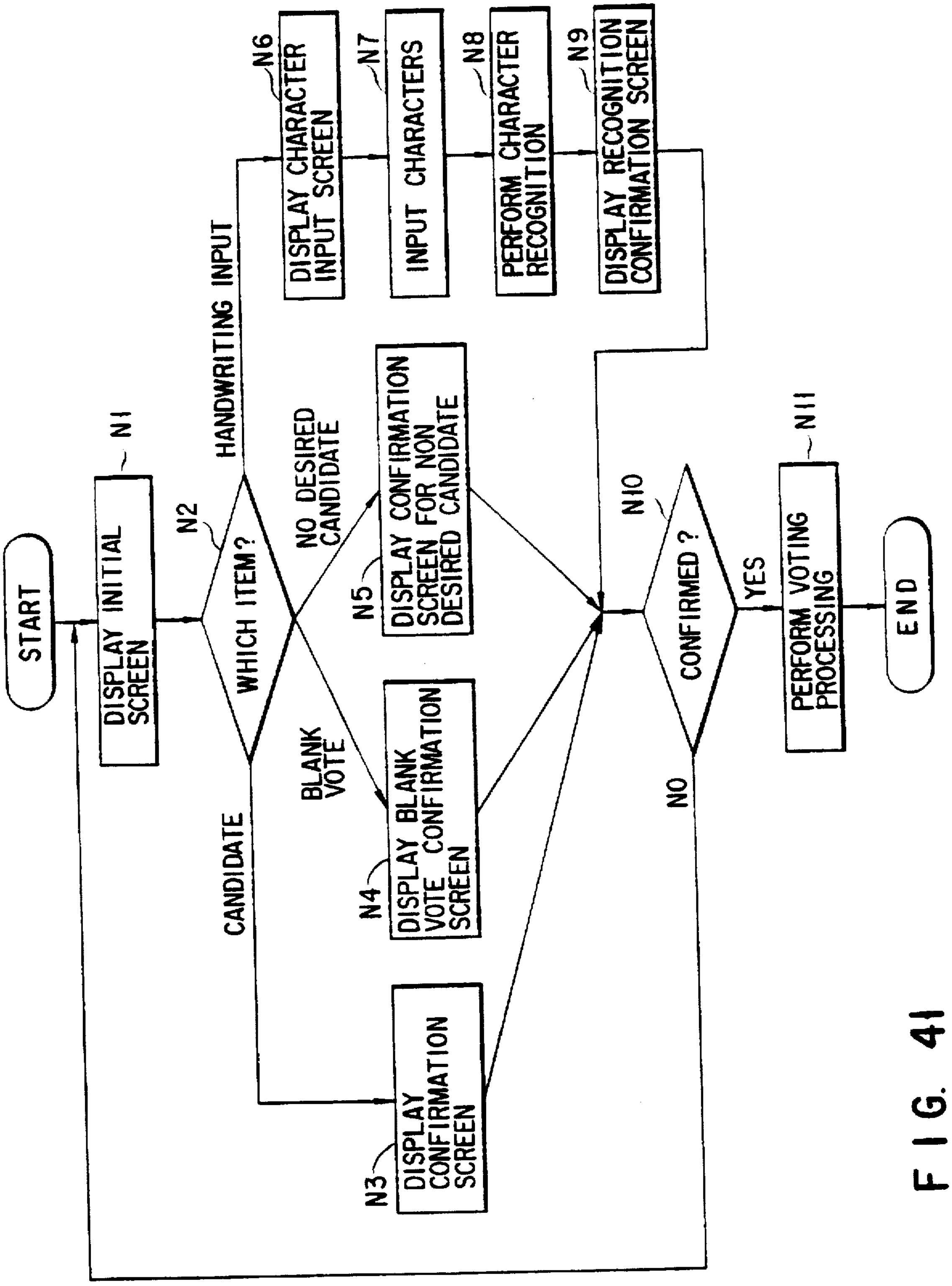
FIG. 41 is a flow chart showing an operation sequence of an election terminal apparatus according to the thirteenth embodiment of the present invention.

When an application program for election is started in the election terminal apparatus, the initial screen shown in FIG. 42 is displayed (step N1 in FIG. 41). This initial screen includes a list of candidates, an icon "BLANK VOTE" used to cast a blank vote, an icon "NO DESIRED CANDIDATE" for voting that there is no appropriate person among the candidates, an icon "HANDWRITING INPUT" used to vote by writing a candidate name with a pen 3, and a guidance message "PLEASE DESIGNATE ONE OF ITEMS WITH PEN".

When a voter designates one of the candidates with the pen 3 while the initial screen is displayed, for example, the confirmation screen shown in FIG. 5 is displayed (step N3). If the voter designates an icon "YES" with the pen 3 while the confirmation screen shown in FIG. 15 is displayed, the flow advances from step N3 to step N11 through step N10. In step N11, the content of the vote is confirmed, and the count value of a corresponding vote count buffer 318 is incremented by one.

If the voter designates an icon "NO" with the pen 3 while the screen shown in FIG. 15 is displayed, the flow returns from step N3 to step N1 through step N10, thus displaying the initial screen.

Figure 43:
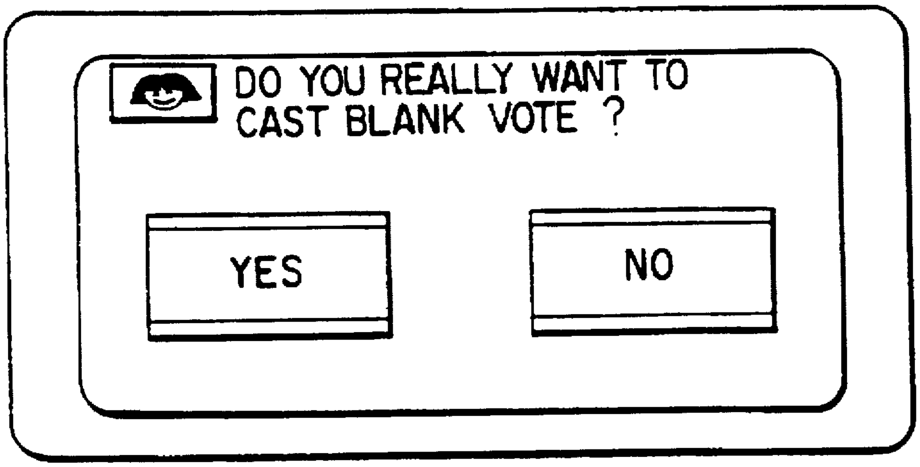

If the voter designates the icon "BLANK VOTE" with the pen 3 while the initial screen is displayed, the blank vote confirmation screen shown in FIG. 43 is displayed (step N4). If the voter designates an icon "YES" with the pen 3 while the blank vote confirmation screen is displayed, the flow advances from step N4 to step N11 through step N10. In step N11, the content of the vote is confirmed, and the count value of a blank vote count buffer is incremented by one. If the voter designates an icon "NO" while the blank vote confirmation screen is displayed, the flow returns from step N4 to step N1 through step N10 to display the initial screen.

Figure 44:
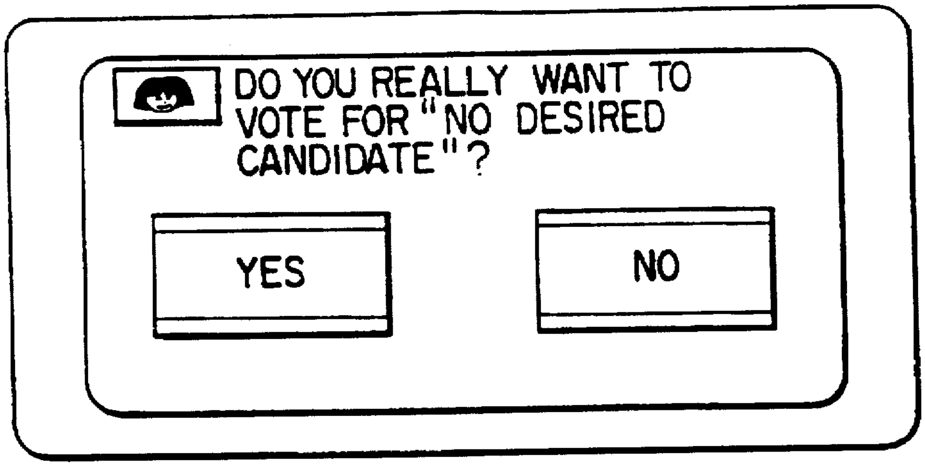

If the voter designates the icon "NO DESIRED CANDIDATE" with the pen 3 while the initial screen is displayed, a no-desired-candidate confirmation screen shown in FIG. 44 is displayed (step N5). If the voter designates an icon "YES" with the pen 3 while the no-desired-candidate confirmation screen is displayed, the flow advances from step N5 to step N11 through step N10. In step N11, the content of the vote is confirmed, and the count value of a no-desired-candidate vote count buffer is incremented by one. If the voter designates an icon "NO" while the no-desired-candidate confirmation screen is displayed, the flow returns from step N5 to step N1 through step N10 to display the initial screen.

If the icon "HANDWRITING INPUT" is designated, for example, the screen shown in FIG. 21 is displayed (step N6). When the voter writes a candidate name within the frame with the pen 3 (step N7), a recognition processing section 23A recognizes the written characters (step N8). A search section 24 searches a candidate buffer 31 to obtain a corresponding candidate, and a display control section 25*a* displays the confirmation screen shown in FIG. 15 which is associated with the corresponding candidate (step N9).

If the voter designates an icon "YES" with the pen 3 while the confirmation screen in FIG. 15 is displayed, the flow advances from step N9 to step N11 through step N10. In step N11, the count value of a corresponding vote count buffer 318 is incremented by one (step S38). If the voter designates an icon "NO" with the pen 3, the flow returns to step N1 to display the initial screen.

According to the thirteenth embodiment, for example, a voter can cast a blank vote or can vote that there is no desired candidate.

(Fourteenth Embodiment)

The fourteenth embodiment of the present invention will be described below. An election terminal apparatus according to this embodiment is designed to perform voting for a plurality of types of elections at the same time. The arrangement of the election terminal apparatus of this embodiment is substantially the same as that of the election terminal apparatus of the first embodiment. For this reason, only an operation of the apparatus will be described below with reference to FIGS. 14, 15, and 45 to 49.

Figure 45:
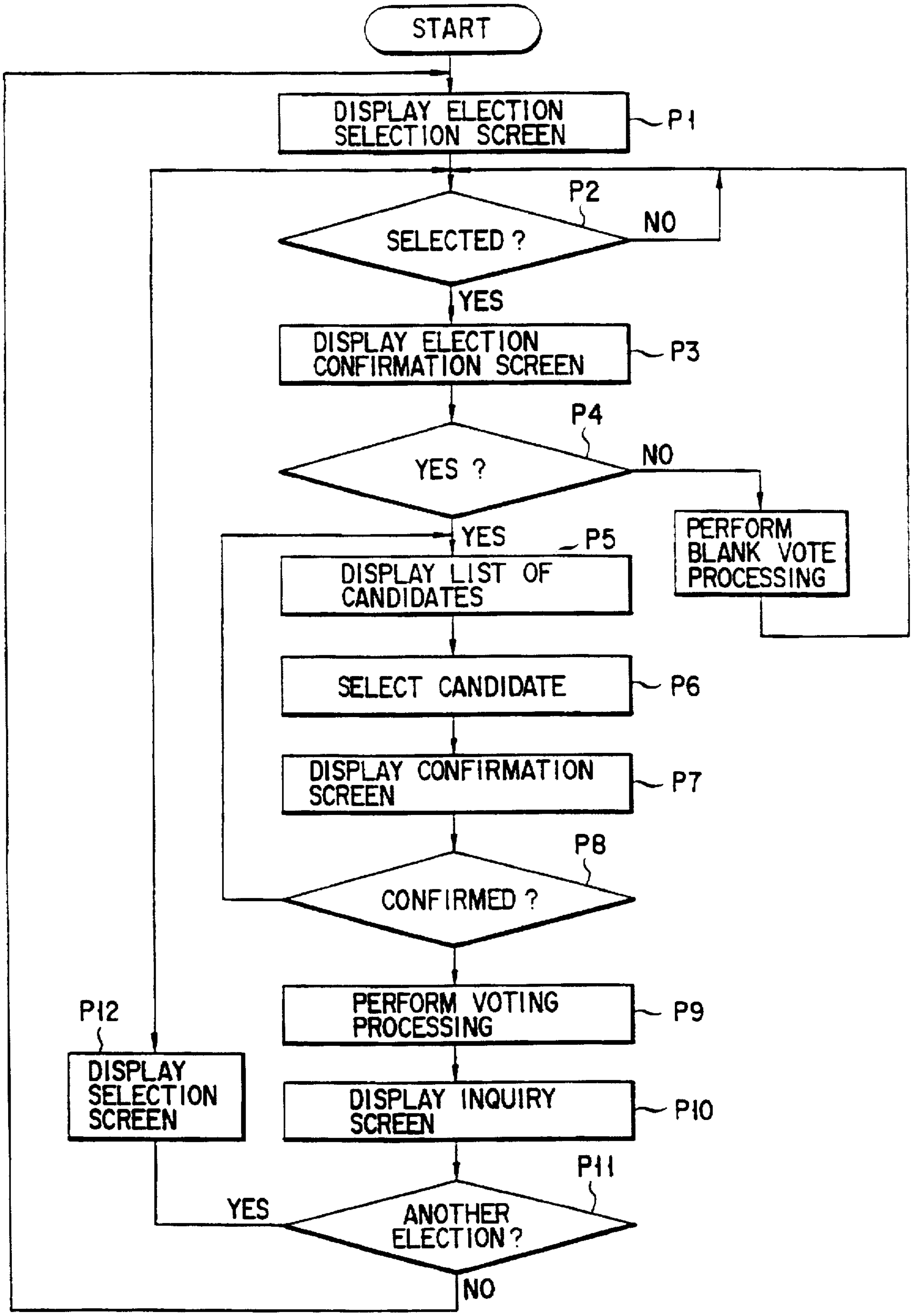
FIG. 45 is a flow chart showing an operation sequence of an election terminal apparatus according to the fourteenth embodiment of the present invention.
Figure 46:
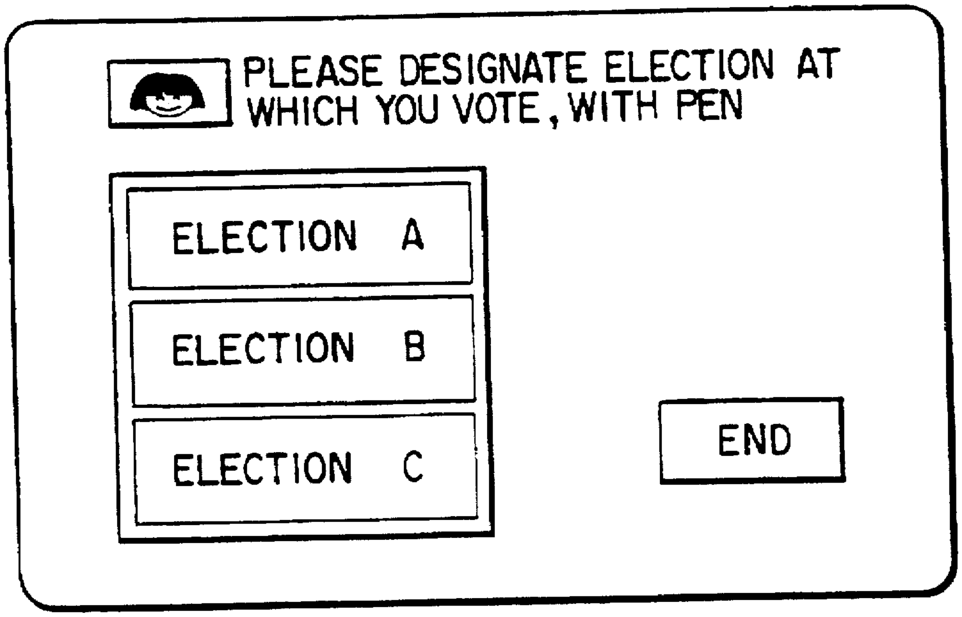
FIGS. 46 to 49 are views respectively showing display screens in the fourteenth embodiment.
Figure 47:
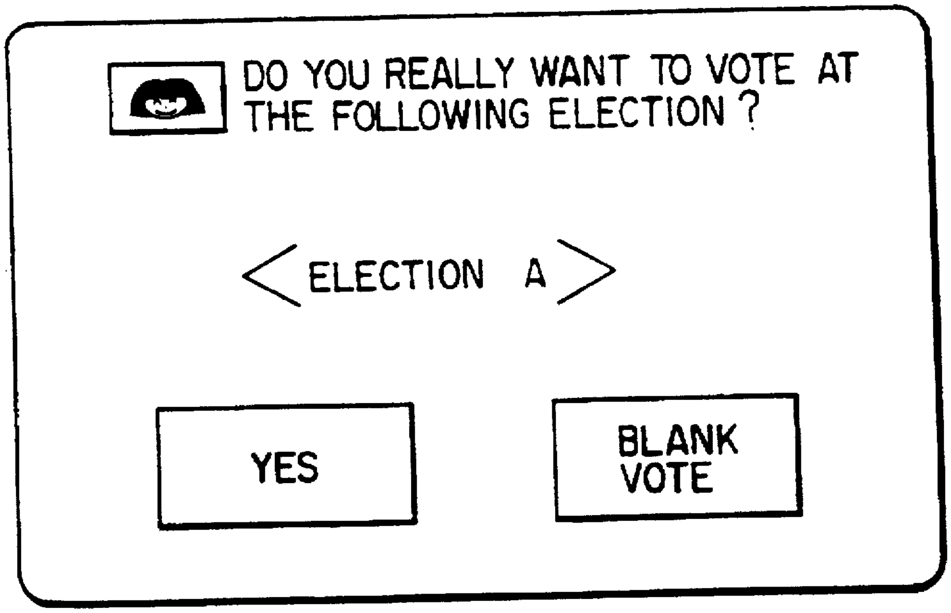

When an application program for election is started in the election terminal apparatus, the election selection screen shown in FIG. 46 is displayed first to urge a voter to select one of the elections (step P1 in FIG. 45). If, for example, the voter selects an election A with a pen 3, this operation is detected in step P2. As a result, a screen for confirming the type of election, such as the one shown in FIG. 47, is displayed (step P3).

If the voter selects an icon "YES", a list of candidates for the selected election, such as the one shown in FIG. 14, is displayed (steps P4 and P5). When the voter designates one of the candidates with the pen 3 (step P6), the confirmation screen shown in FIG. 15 is displayed (step P7). If the displayed candidate is not the one for whom the voter wants to vote, the voter designates "NO" with the pen 3. The flow then returns from step P8 to step P5.

If the displayed candidate is the one for whom the voter wants to vote, the voter designates "YES" with the pen 3. As a result, the content of the vote is confirmed, and the count value of a vote count buffer 318 corresponding to the selected candidate is incremented by one (steps P8 and P9).

Figure 48:
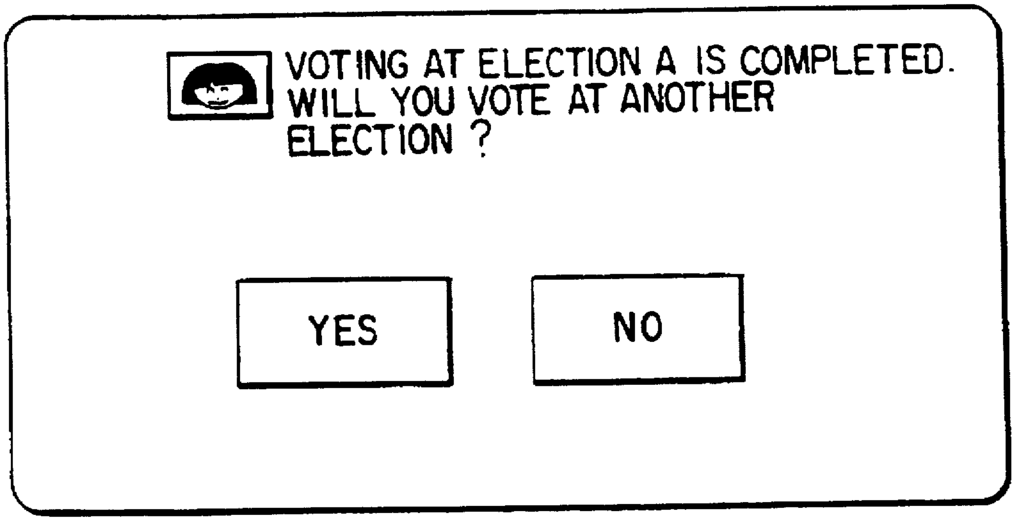
Figure 49:
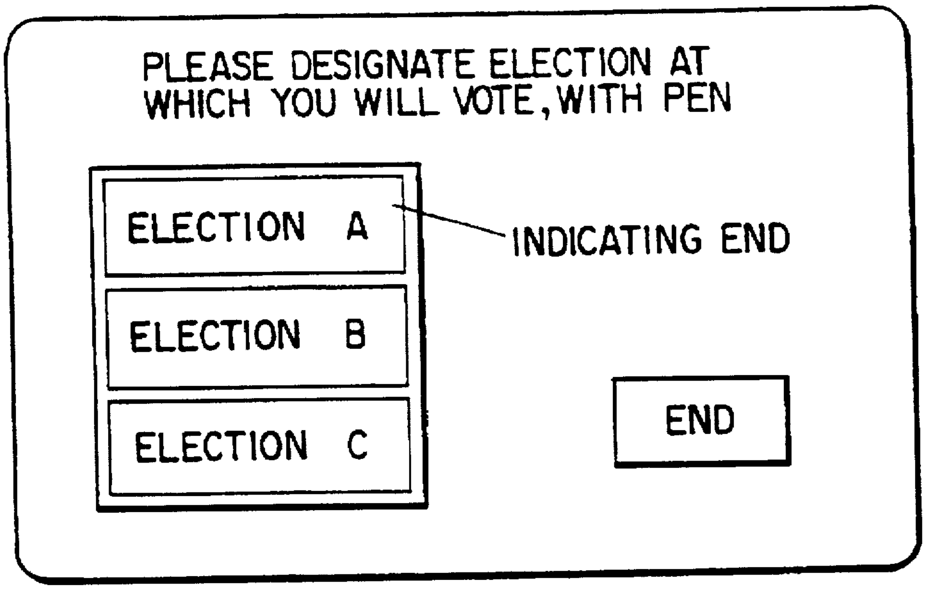
Figure 50:
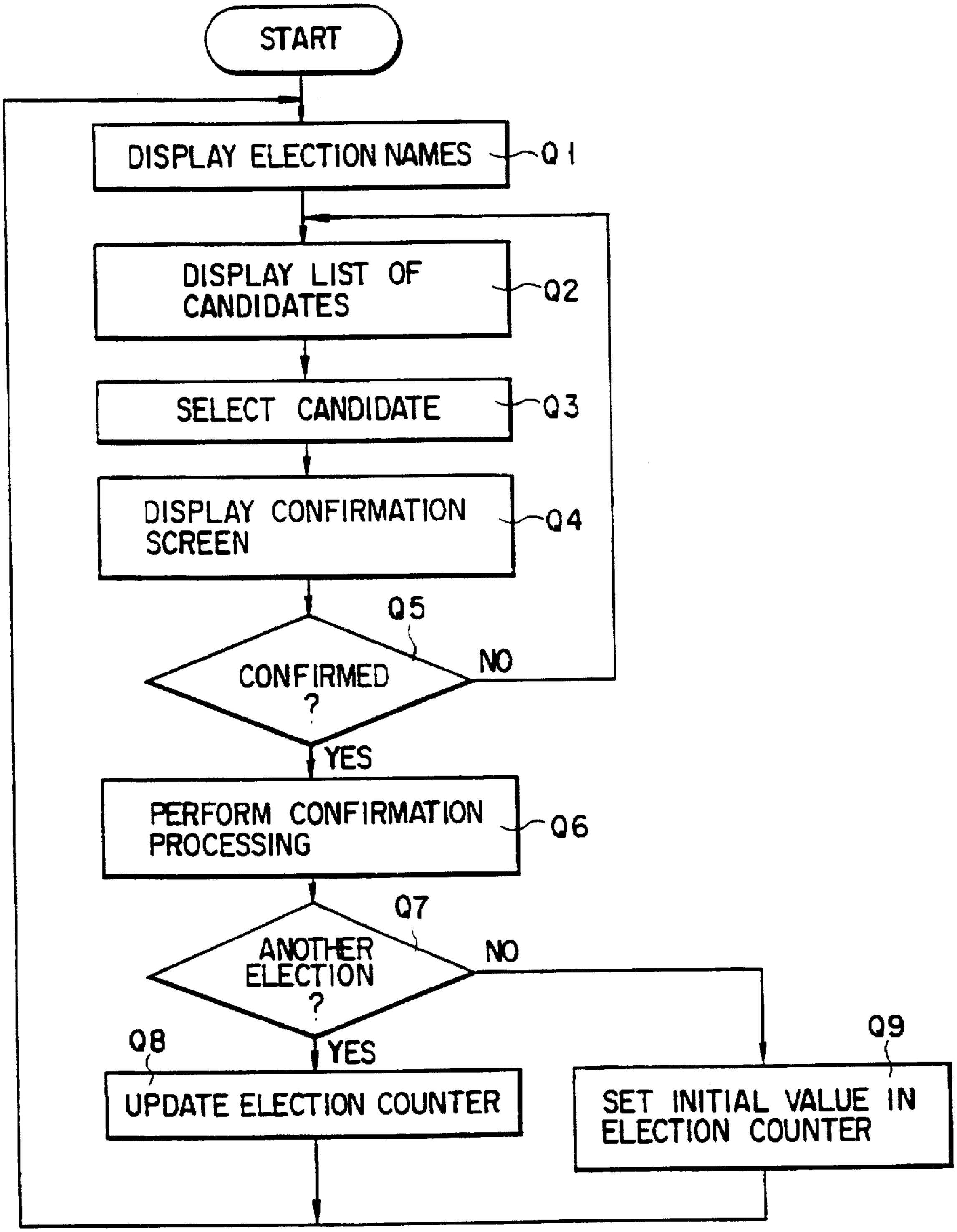
FIG. 50 is a flow chart showing an operation sequence of an election terminal apparatus according to the fifteenth embodiment of the present invention.

Subsequently, an inquiry screen for inquiring whether to vote for another election, such as the one shown in FIG. 48, is displayed (step P10). If voting for another election is to be performed, the voter designates "YES" with the pen 3. As a result, for example, the election selection screen shown in FIG. 49 is displayed while selection of the previous election is inhibited (steps P11 and P12).

If the voter designates "NO" on the inquiry screen shown in FIG. 48, or voting for all elections is completed, the flow returns from step P11 to step P1 to display the initial screen. If the voter designates "BLANK VOTE" on the confirmation screen shown in FIG. 47, the count value of a blank vote counter is incremented by one.

According to this arrangement, voting for a plurality of elections can be efficiently performed with one election terminal apparatus.

(Fifteenth Embodiment)

The fifteenth embodiment of the present invention will be described next.

Similar to the fourteenth embodiment, an election terminal apparatus of this fifteenth embodiment is designed to perform voting for a plurality of types of elections at the same time. The arrangement of the election terminal apparatus of this embodiment is substantially the same as that of the election terminal apparatus of the first embodiment. For this reason, only an operation of the apparatus will be described below with reference to FIGS. 14, 15, and 50 to 52.

When an application program for election is started in the election terminal apparatus, the name of an election to be executed first is displayed on a liquid crystal display 6 for a predetermined period of time upon referring to the count value of an election counter (step Q1). A list of candidates, such as the one shown in FIG. 14, is then displayed (step Q2). When a voter designates one of the candidates with a pen 3 (step Q3), the confirmation screen shown in FIG. 15 is displayed (step Q4). If the voter designates "NO" on the confirmation screen, the flow returns from step Q5 to step Q2 to display the candidate list again. If the voter designates "YES" on the confirmation screen, the content of the vote is confirmed (step Q6), and the count value of a vote count buffer 318 corresponding to the selected candidate is incremented by one.

Figure 51:
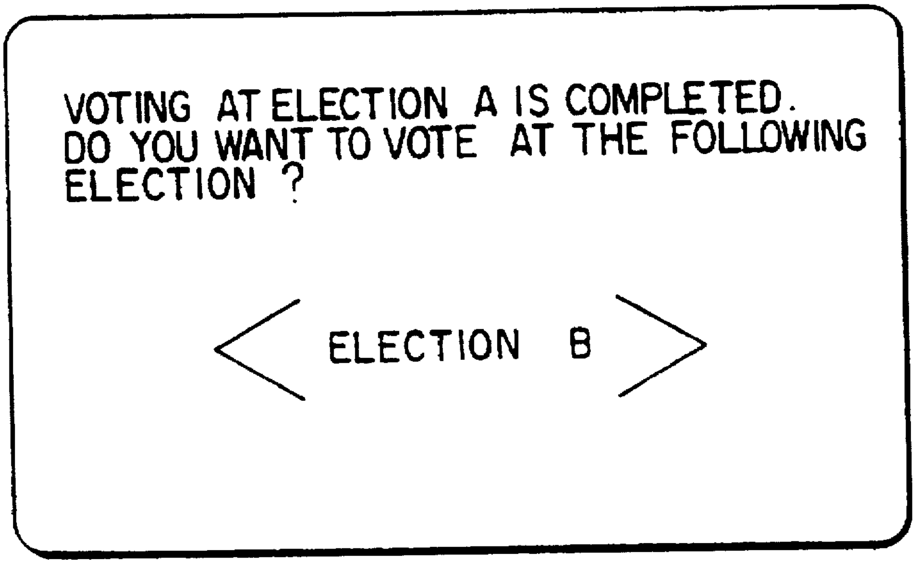
FIGS. 51 and 52 are views respectively showing screen displays in the fifteenth embodiment.

It is then checked in step Q7 whether there is another election for which the voter should vote. If YES in step Q7, the count value of the election counter is updated to indicate that the voting for the above election is completed, and a screen such as the one shown in FIG. 51 is displayed to perform voting processing for the next election (step Q1).

Figure 52:
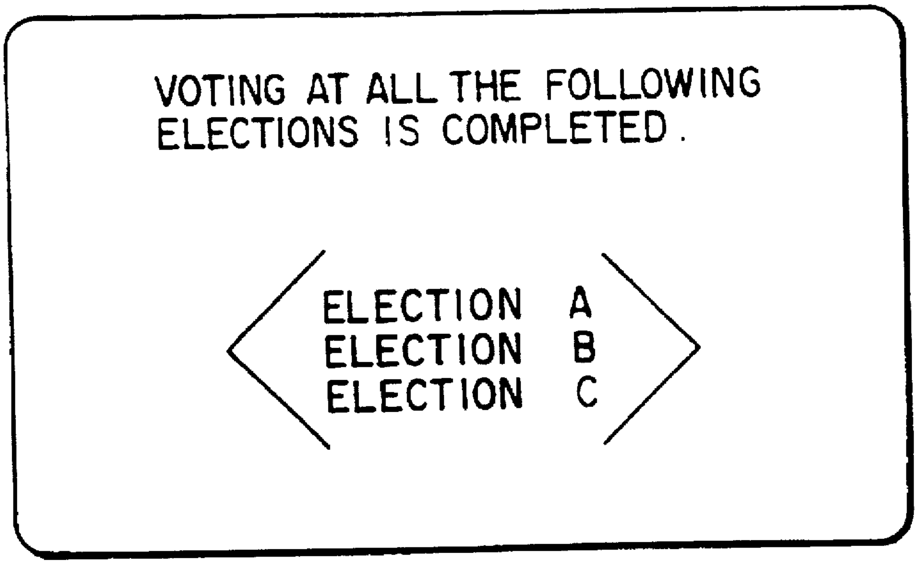

If it is determined in step Q7 that voting for all elections is completed, a screen such as the one shown in FIG. 52 is displayed, and an initial value is set in the election counter (step Q9) to start processing for the next voter.

According to the fifteenth embodiment, voting for a plurality elections can be efficiently performed by using one election terminal apparatus.

(Sixteenth Embodiment)

Figure 53:
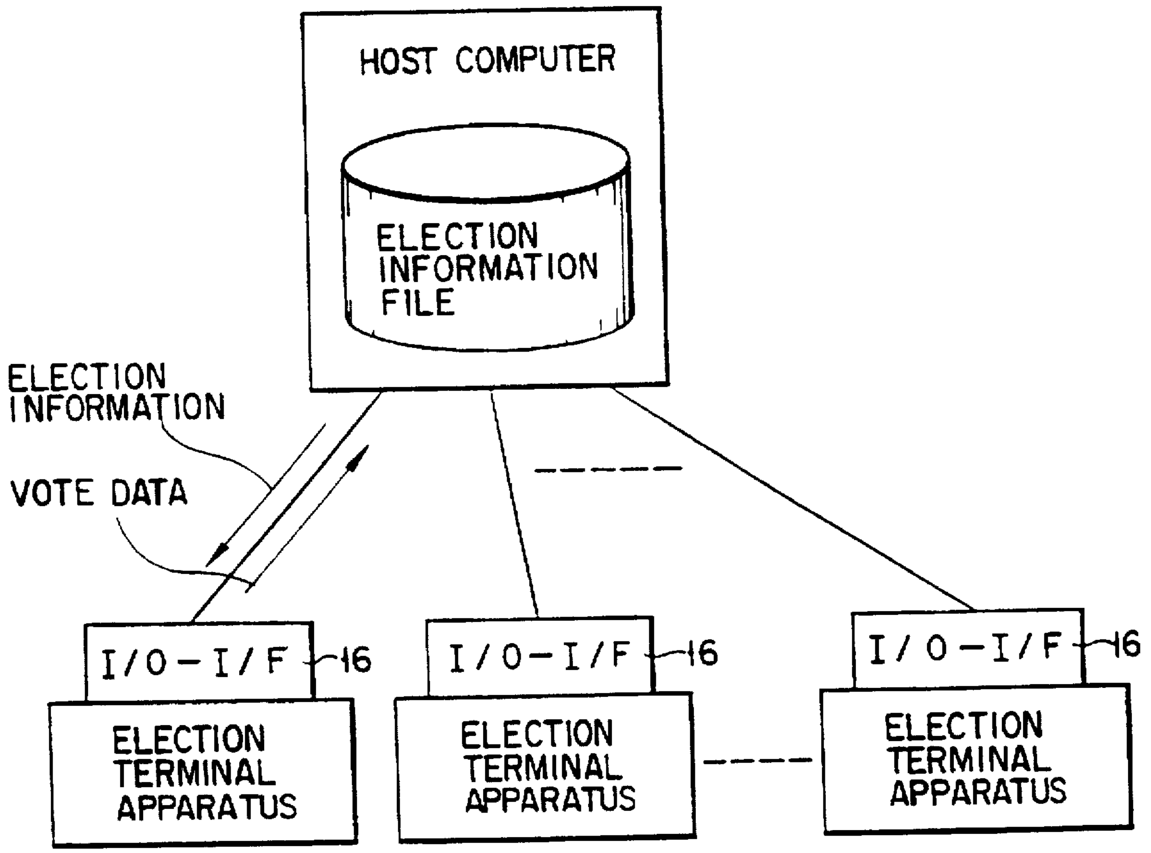
FIG. 53 is a block diagram showing the arrangement of an election voting system according to the sixteenth embodiment of the present invention.

In the first to fifteenth embodiments, each election terminal apparatus has a list of candidates, detailed information associated with each candidate, and the like in the form of the election information file 17. This information is transferred to the RAM 13 when the system is started. However, the present invention is not limited to this. For example, as shown in FIG. 53, a host computer connected to a plurality of election terminal apparatuses may have an election data file (database), and each election terminal apparatus may obtain election information from the election data file of the host computer through a communication interface 16 and a network (wired or radio).

The timing at which each election terminal apparatus accesses the election data file of the host computer can be arbitrarily changed in accordance with the scale of an election.

For example, each election terminal apparatus can obtain election information by accessing the election information file of the host computer every time voting is performed or an operation is performed by a voter. In this case, for example, data representing a voting result is transmitted to the host computer through the communication interface 16 every time voting is performed. This method is effective for a relatively small-scale election. Each election terminal apparatus need not have an election information file 17.

The contents of the election information file of the host computer may be transferred to the election information file 17 of each election terminal apparatus through the communication interface 16 and the network when the election terminal apparatus is started. In this case, each election terminal apparatus obtains vote count data in a vote count buffer 318, and transmits the data to the host computer after the election is over. Alternatively, vote count data may be transmitted to the host computer at intervals of a predetermined time or vote count. This method is effective for a relatively large-scale election.

(Seventeenth Embodiment)

The seventeenth embodiment of the present invention will be described next. The election terminal apparatus of this embodiment is characterized in that when a voter selects, with a pen, a candidate for whom he/she wants to vote, a symbol (e.g., o, X, or v) indicating that the candidate is selected is displayed at a position adjacent to an icon indicating the selected candidate.

Note that the arrangement of the election terminal apparatus of the seventeenth embodiment is substantially the same as that of the election terminal apparatus of the first embodiment, and hence only an operation will be described with reference to FIG. 16 and FIGS. 54 to 57.

Figure 54:
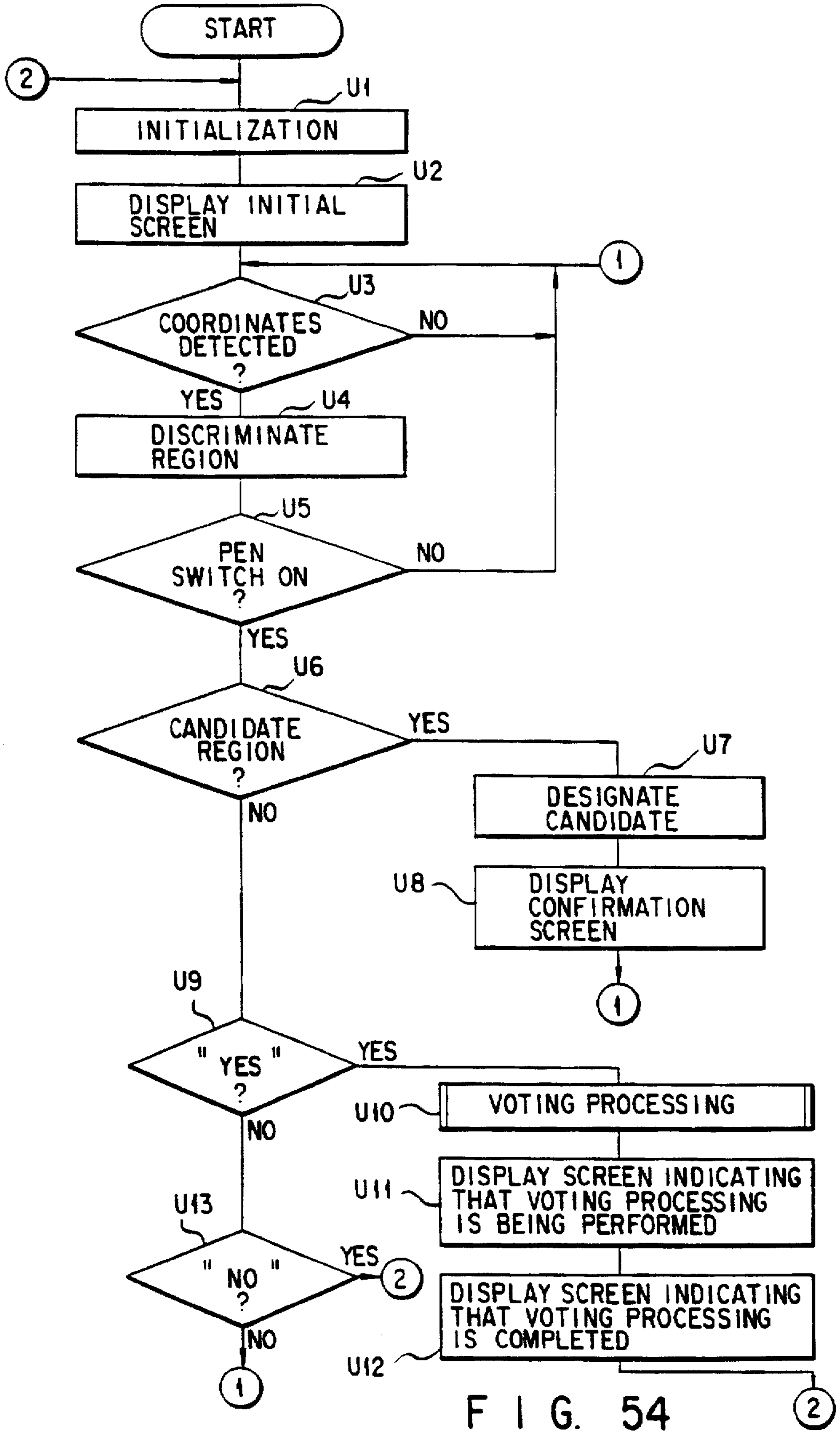
FIG. 54 is a flow chart showing an operation of an election terminal apparatus according to the seventeenth embodiment of the present invention.
Figure 55:
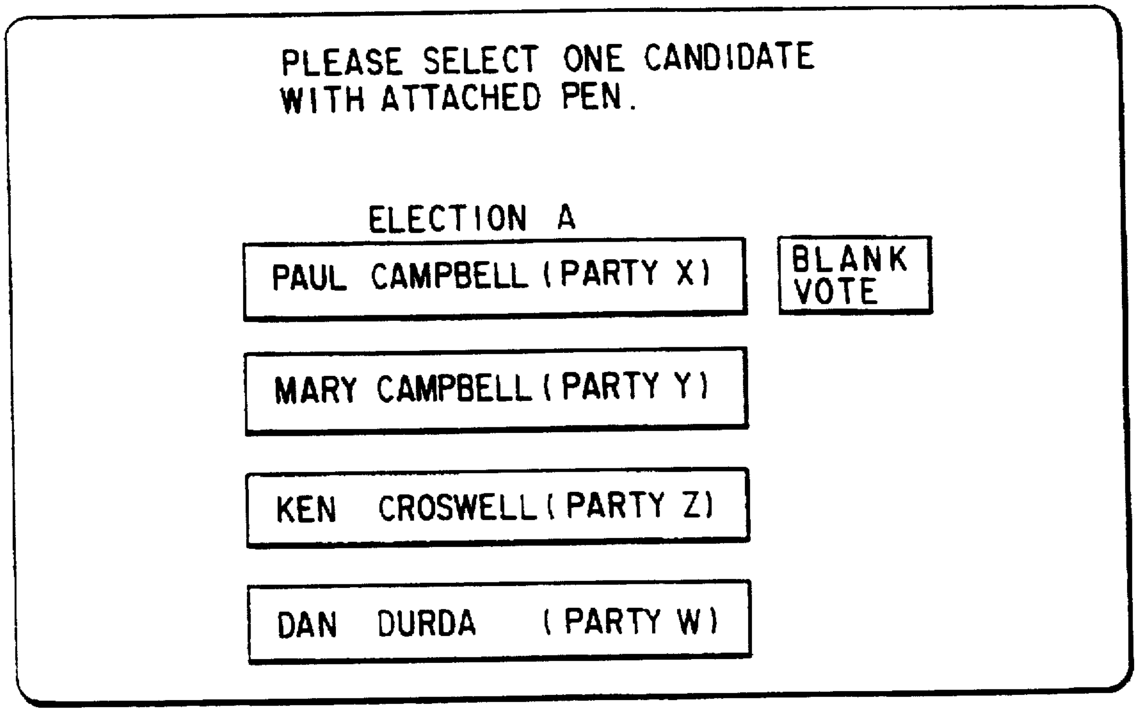
FIG. 55 is a view showing an initial screen of the election terminal apparatus according to the seventeenth embodiment.

When a voting application program is started in the election terminal apparatus, initialization processing including initialization of data, processing of ensuring a memory area, and the like is performed under the control of a CPU 12 (step U1 in FIG. 54). An initial screen is then displayed (step U2). As shown in FIG. 55, the initial screen includes a message for urging the voter to cast a vote, a message for specifying an election, a list of candidate names and the names of the parties to which the candidates belong, and a blank vote column.

When the voter brings a pen 3 near a transparent tablet 5, a tablet controller 10 detects the coordinate values of a position designated by the pen 3 and the state of a pen switch incorporated in the pen 3.

The CPU 12 causes interruptions with respect to the tablet controller 10 at predetermined intervals under the control of an input control section 21, and stores detected coordinate values and switch state data in a position data buffer 27A.

In step U3, the CPU 12 refers to the contents of the position data buffer 27A to check whether coordinates are detected. If NO in step U3, the CPU 12 waits until coordinates are detected.

if coordinates are stored in the position data buffer 27A, a region discriminating section 23B discriminates a region to which the detected coordinates belong, on the basis of the stored contents of a region data buffer 29 (step U4).

The CPU 12 checks on the basis of the data held in the position data buffer 27A whether the pen switch is ON (step U5). If the pen switch is OFF, the flow returns to step U3. If the pen switch is ON, the flow advances to step U6.

In step U6, the CPU 12 checks whether the position designated by the pen 3 is within an icon indicating a candidate or an icon indicating a blank vote on the initial screen. If the position designated by the pen 3 is within a candidate column or the blank vote column, the CPU 12 refers to the stored contents of the region data buffer 29 to specify the designated candidate or blank vote (step U7). The CPU 12 controls an LCD controller 11 to display a confirmation screen (step U8).

Figure 56:
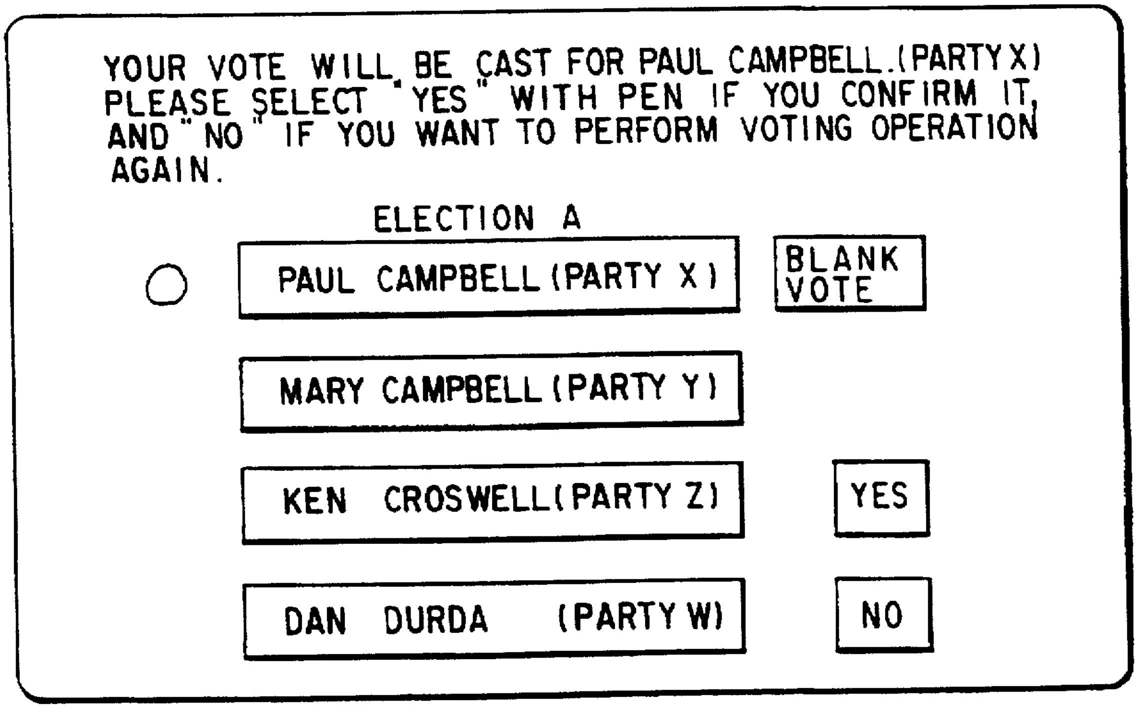
FIGS. 56 and 57 are views respectively showing confirmation screens of the election terminal apparatus according to the seventeenth embodiment.

FIG. 56 shows an example of the confirmation screen. This confirmation screen includes a message indicating the candidate name selected by the voter, a message for explaining an operation to be performed by the voter next, a list of candidates, the symbol "o" indicating the selected candidate, a confirmation icon for requesting the voter to confirm whether to vote for the selected candidate, and a cancel icon for canceling the selection. The column of the selected candidate is displayed to be discriminated from the columns of the remaining candidates. For example, in FIG. 56, the frame of the column of the selected candidate is highlighted.

Figure 57:
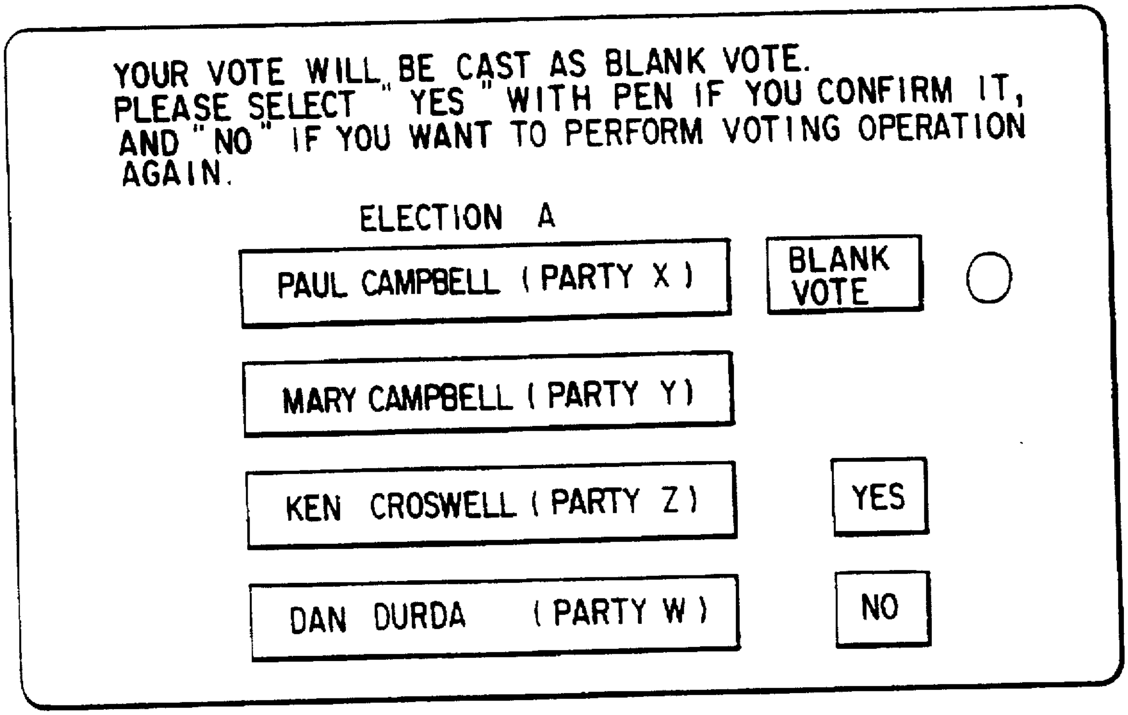

FIG. 57 shows a confirmation screen for a case wherein an icon "BLANK VOTE" is designated with the pen 3.

If a portion other than the candidate icons (including the icon "BLANK VOTE") is designated on the initial screen with the pen 3, or a position on a confirmation screen is designated with the pen 3, the flow advances to step U9.

Figure 58:
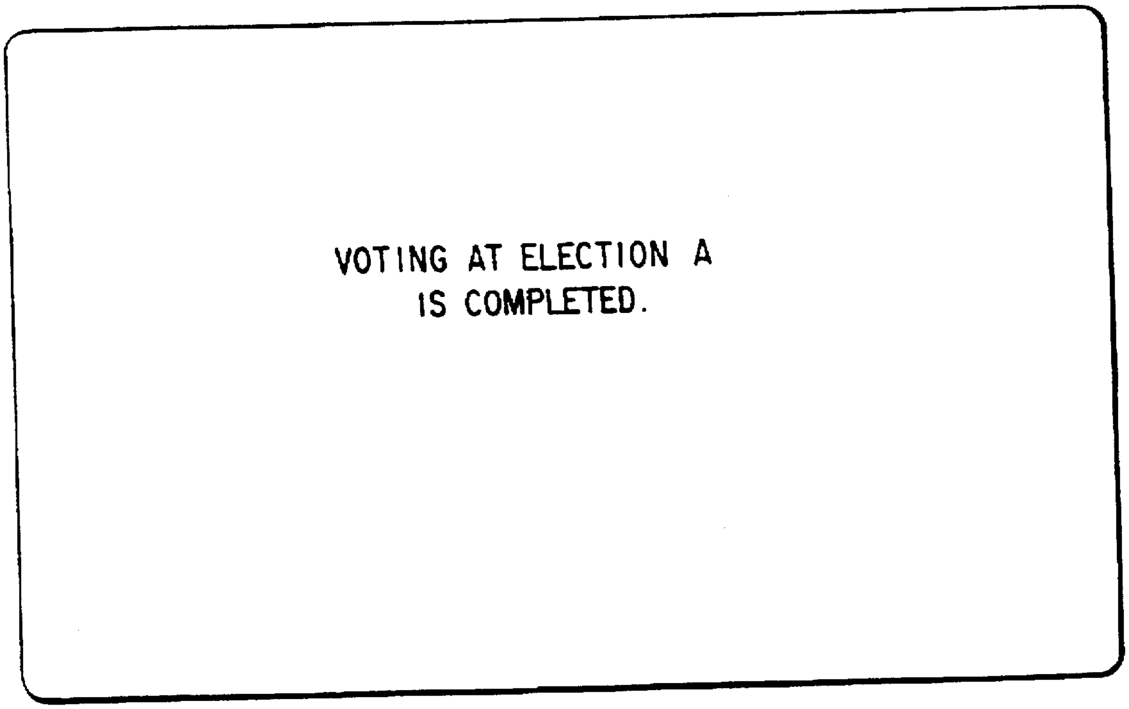
FIG. 58 is a view showing a voting end screen of the election terminal apparatus according to the seventeenth embodiment.
Figure 59:
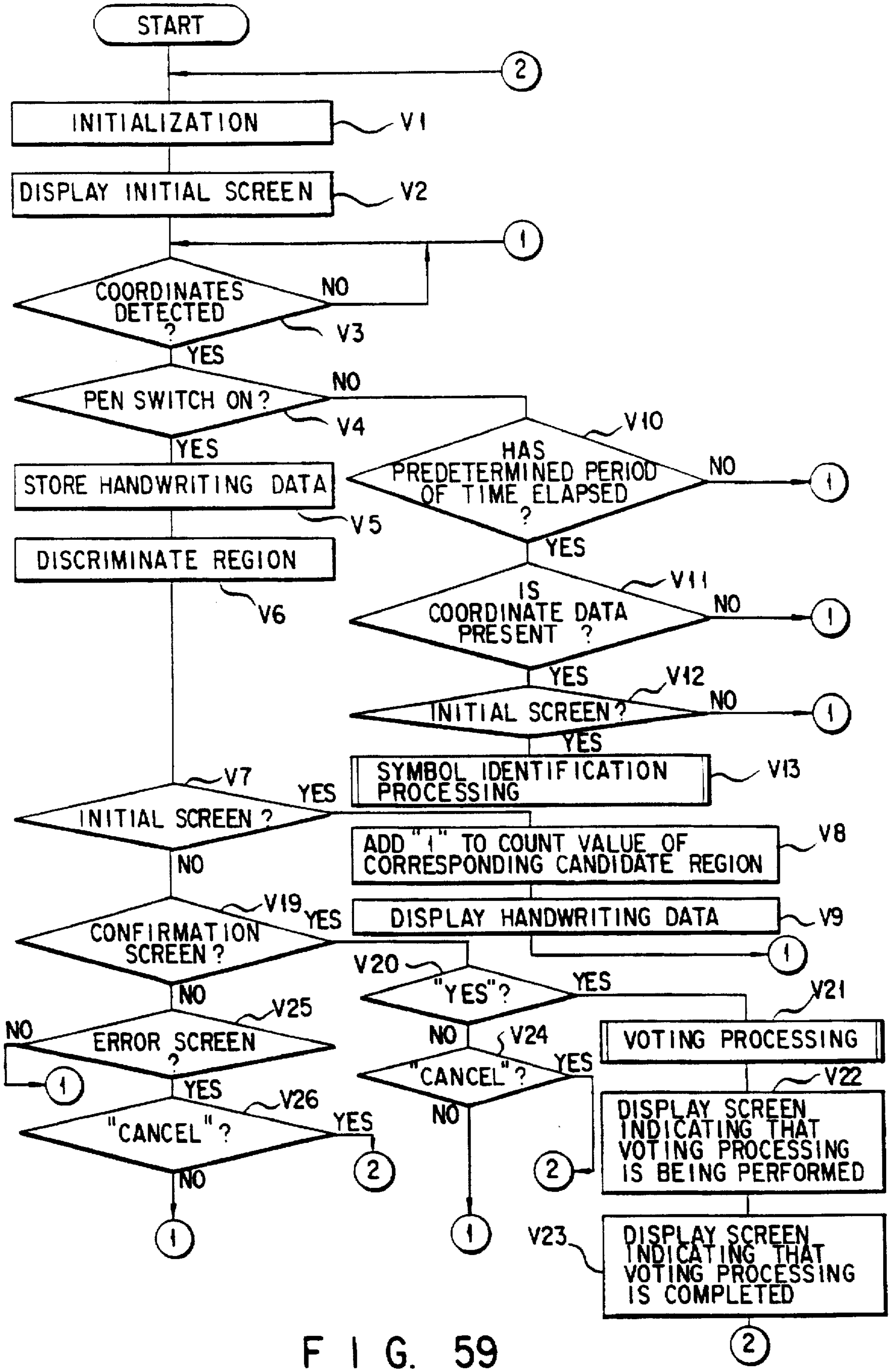
FIG. 59 is a flow chart showing an operation of an election terminal apparatus according to the eighteenth embodiment of the present invention.

In step U9, it is checked whether the "confirmation" icon on the confirmation screen is designated by the pen 3 (step U9). If it is determined that the "confirmation" icon is designated, i.e., the voter confirms that he/she votes for the selected candidate, voting processing is performed (step U10). In this voting processing, the CPU 12 adds "1" to the value held in a vote count buffer 318 for the selected candidate in a candidate buffer 31. If "BLANK VOTE" is selected, "1" is added to the value held in a blank vote count buffer. On the display screen, a screen indicating that voting processing is being performed, and a screen indicating that the voting processing is completed are consecutively displayed (steps U11 and U12). The screen indicating that the voting processing is being performed is shown in, e.g., FIG. 16. The screen that the voting processing is completed is shown in, e.g., FIG. 58.

The flow then returns to step U1.

If an icon "CANCEL" on the confirmation screen is designated, this operation is detected in step U13, and the flow returns to step U1 to cause the voter to select a candidate again.

If other regions are designated, NO is obtained in steps U6, U9, and U13, and the flow returns to step U3.

According to this embodiment, since a selected candidate is displayed with the symbol "o", "X", "v" or the like, the voter can easily confirm his/her selection.

(Eighteenth Embodiment)

The eighteenth embodiment of the present invention will be described next. An election terminal apparatus of this embodiment is characterized in that when a voter writes a symbol ("o", "X", or "v") in a symbol entry column with a pen 3, voting processing is performed upon recognition of the symbol.

Note that the arrangement of the election terminal apparatus of the eighteenth embodiment is substantially the same as that of the election terminal apparatus of the first embodiment, and hence only an operation will be described with reference to FIGS. 59 to 71.

Figure 60:
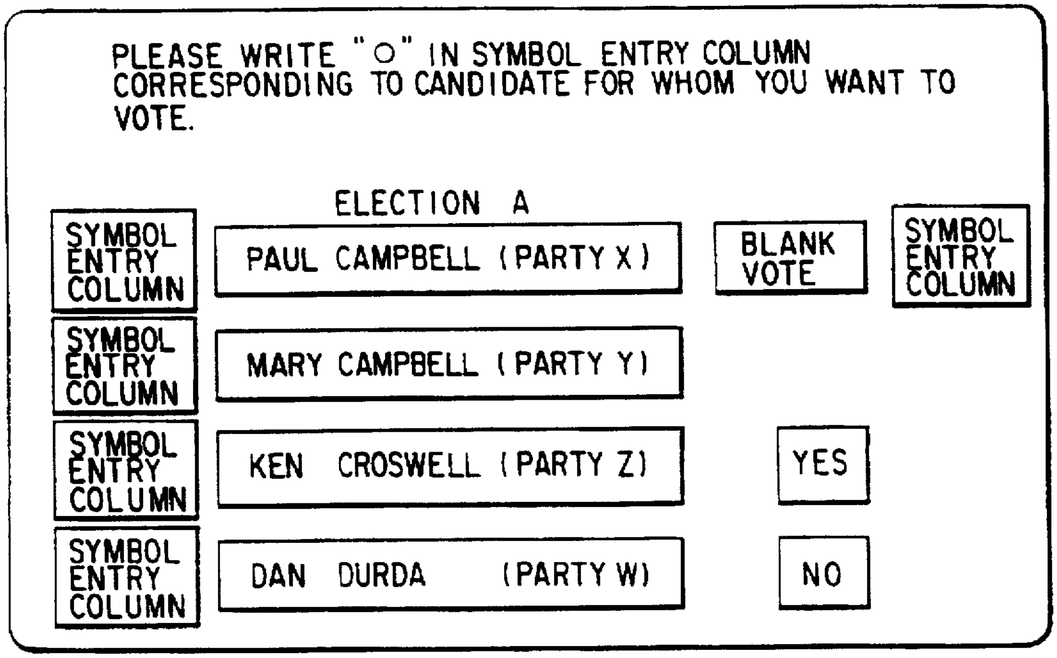
FIG. 60 is a view showing an initial screen of the election terminal apparatus according to the eighteenth embodiment.

When a voting application program is started in the election terminal apparatus, initialization processing including initialization of data, processing of ensuring a memory area, and the like is performed under the control of a CPU 12 (step V1 in FIG. 54). An initial screen is then displayed (step V2). As shown in FIG. 60, the initial screen includes a message for urging the voter to cast a vote, a message for specifying an election, the columns of candidate names and the names of the parties to which the candidates belong, a blank vote column, and symbol entry regions, each for allowing the voter to write the symbol with respect to a candidate for whom he/she wants to vote.

The CPU 12 causes interruptions with respect to the tablet controller 10 at predetermined intervals under the control of an input control section 21, and stores detected coordinate values and switch state data in a position data buffer 27A.

In step V3, the CPU 12 refers to the contents of the position data buffer 27A to check whether coordinates are detected. If NO in step V3, the CPU 12 waits until coordinates are detected.

Subsequently, the CPU 12 checks on the basis of the data held in the position data buffer 27A whether the pen switch is ON (step V4). If the pen switch is OFF, the flow advances to step V10. If the pen switch is ON, the flow advances to step V5.

In step V5, the CPU 12 refers to the contents of the position data buffer 27A to store a series of coordinate values, designated by the distal end of the pen 3, in a handwriting data buffer 27B. The coordinate values stored in the handwriting data buffer 27B are used to display the symbol written by the voter on the screen, as will be described later.

If coordinates are stored in the position data buffer 27A, a region discriminating section 23B discriminates a region to which the detected coordinates belong, on the basis of the stored contents of the region data buffer 29 (step V6).

It is then checked whether the display screen is the initial screen (step V7).

If the display screen is the initial screen (YES in step V7), "1" is added to the value held in a candidate discrimination data buffer (not shown) for the candidate corresponding to the symbol entry column to which the detected coordinates belong, on the basis of the discrimination result obtained by the region discriminating section 23B (step V8). Note that a candidate discrimination data buffer is arranged for each symbol entry column and is designed to count the dots of the symbol written in a corresponding symbol entry region. The value held in each candidate discrimination data buffer is used to specify a corresponding candidate who has received the vote. In addition, the CPU 12 controls an LCD controller 11 to display the symbol written by the voter at the corresponding entry position on the basis of the coordinate values stored in the handwriting data buffer 27B (step V9). Thereafter, the flow returns to step V3.

When the voter finishes writing the symbol and separates the pen 3 from a table 2, the pen switch is turned off.

Consequently, NO is obtained in step V4, and the flow advances to step V10. The processing in steps V10 to V12 is performed to check whether to perform identification processing (step V13) for identifying the candidate indicated by the written symbol.

In step V10, it is checked whether a predetermined period of time or more in the pen switch OFF state has elapsed. If the predetermined period of time has not elapsed yet, a wait state is set, and the flow returns to step V3. If the pen switch is kept OFF after the lapse of the predetermined period of time, it is determined that writing of the symbol is completed, and the flow advances to step V11. In step V11, it is checked whether coordinate data is stored in the handwriting data buffer 27B.

If no data is stored in the handwriting data buffer 27B, the flow returns to step V3. If data is stored in the handwriting data buffer 27B, it means that the symbol may be written in a symbol entry column. The flow then advances to step V12 to check whether the current display screen is the initial screen. If NO in step V12, the flow returns to step V3. If YES in step V12, the flow advances to step V13 to perform symbol identification processing for specifying the selected candidate.

Figure 61:
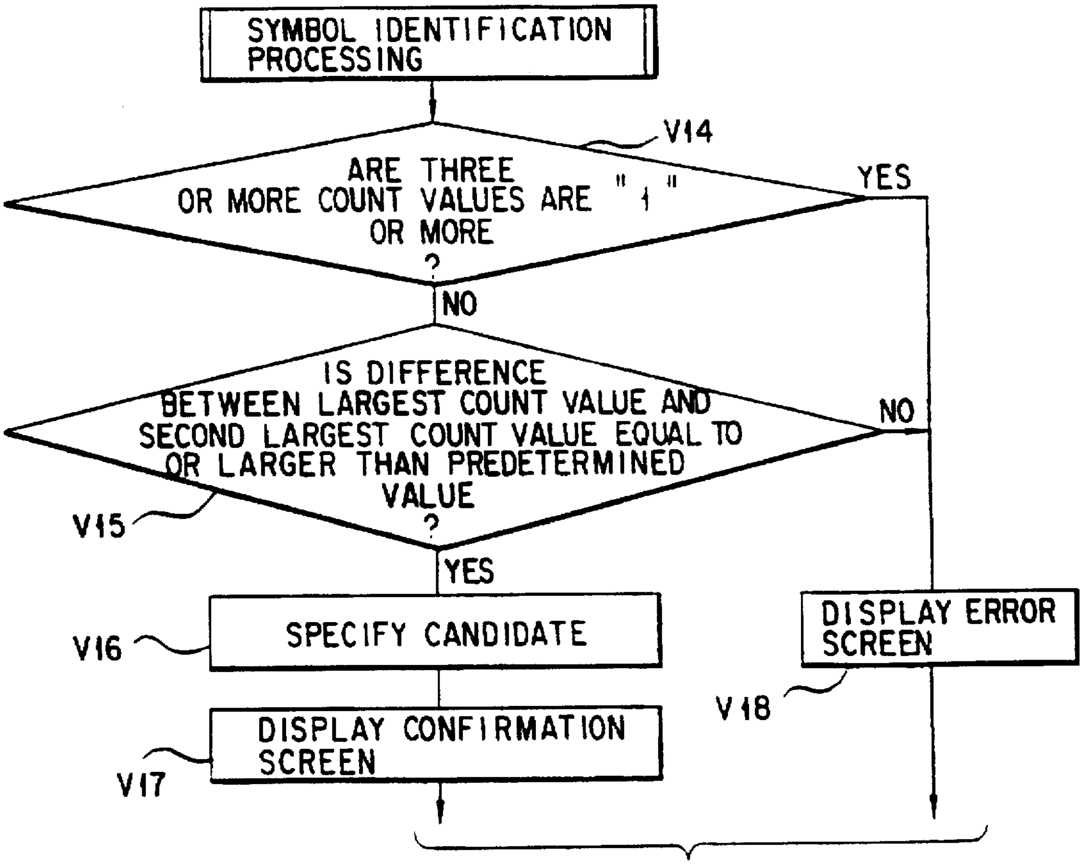
FIG. 61 is a flow chart showing symbol discrimination processing.

This symbol identification processing will be described below with reference to FIG. 61.

Figure 62:
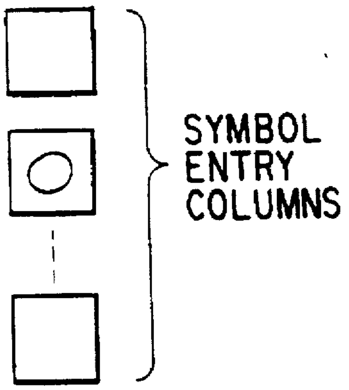
FIGS. 62 to 65, 67 and 69 are views each showing the positional relationship between a symbol entry column and an entered symbol.
Figure 63:
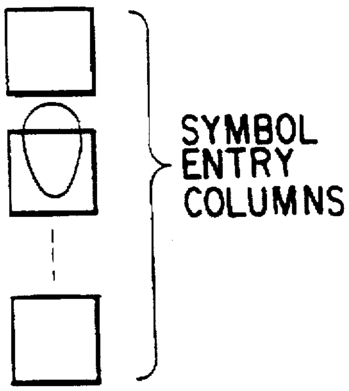
Figure 64:
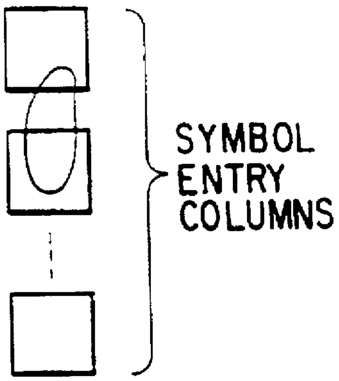
Figure 65:
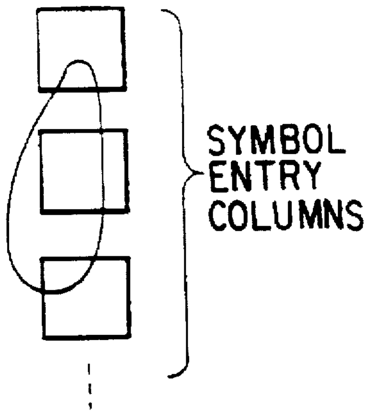
Figure 67:
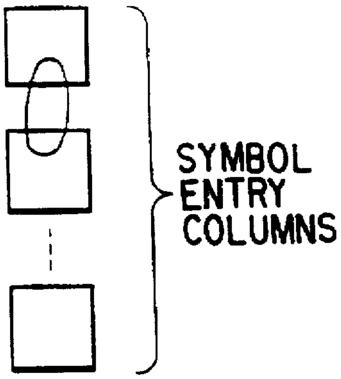

If the symbol is written in one symbol entry column, as shown in FIGS. 62 and 63, it is determined that the candidate corresponding to the entry column is selected. If the symbol is written over two symbol entry columns, as shown in FIG. 64, it is determined that the candidate corresponding to one of the columns in which the entry amount is larger is selected. If the symbol is written over three or more symbol entry columns, as shown in FIG. 65, it is determined that the symbol is invalid.

In order to perform the above-described determination, it is checked first in step V14 whether the count values of three or more candidate discrimination data buffers are "1" or more. If YES in step V14, it means that the symbol is written over three or more symbol entry columns, as shown in FIG. 65. In this case, the flow advances to step V18 to display the error screen shown in FIG. 66. Thereafter, the flow returns to step V1.

If NO in step V14, the largest value of the count values of the candidate discrimination data buffers is compared with the next largest value, and it is checked whether the difference is equal to or larger than a predetermined value. For example, in the case shown in FIG. 64, it is determined that the difference between the largest value of the count values of the candidate discrimination data buffers and the next largest count value is equal to or larger than the predetermined value. In the case shown in FIG. 67, it is determined that the difference between the largest value of the count values of the candidate discrimination data buffers and the next largest count value is less than the predetermined value. If the difference is less than the predetermined value, the flow advances to step V18 to display the error screen shown in FIG. 66. If the difference is equal to or larger than the predetermined value, the flow advances to step V16 to discriminate the candidate corresponding to the candidate discrimination data buffer having the largest count value as the selected candidate. Thereafter, a confirmation screen for confirming whether to vote for the selected candidate is displayed (step V17), and the flow returns to step V3.

Figure 68:
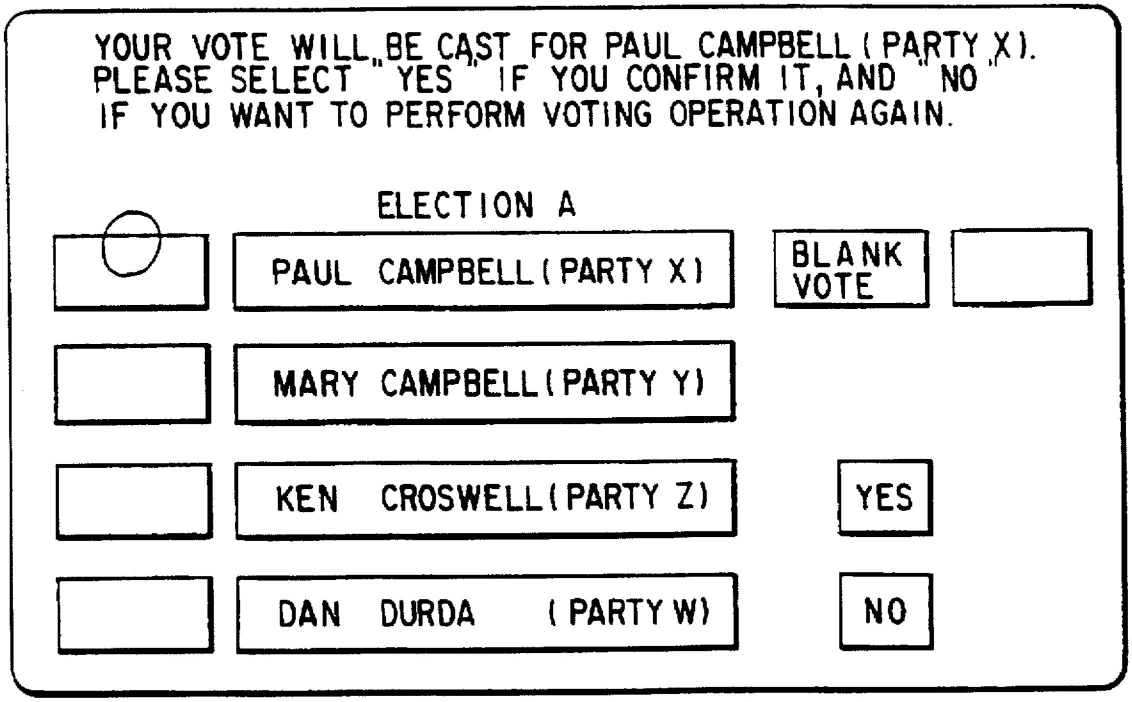
FIG. 68 is a view showing a confirmation screen of the election terminal apparatus according to the eighteenth embodiment.

An example of the confirmation screen is shown in FIG. 68. This confirmation screen includes a message indicating the candidate name selected by a voter, a message for explaining an operation to be performed by the voter next, a list of candidates, the symbol written by the voter, a "confirmation" icon for causing the voter to confirm whether to vote for the selected candidate, and a "cancel" icon for canceling the selection.

Note that if the symbol is written in the symbol entry column corresponding to a blank vote, the same processing as described above is performed.

If it is determined in step V7 (FIG. 59) that the display screen is not the initial screen, the flow advances to step V19. In step V19, it is checked whether the display screen is a confirmation screen. If YES in step V19, the flow advances to step V20 to check whether the "confirmation" icon is designated with the pen 3. If YES in step V20, i.e., if the voter confirms that he/she votes for the displayed candidate, voting processing is performed (step V21). In this voting processing, the CPU 12 adds "1" to the value held in a vote count buffer 318 for the selected candidate in a candidate buffer 31. If the blank vote icon is selected, "1" is added to the value held in a blank vote count buffer.

Subsequently, a screen indicating that voting processing is being performed (FIG. 16) and a screen indicating that the voting processing is completed (FIG. 58) are consecutively displayed (steps V22 and V23), thereby informing the voter that the voting processing is terminated. Thereafter, the flow returns to step V1.

If it is determined in step V19 that the display screen is not a confirmation screen, the flow advances to step V24 to check whether the icon "CANCEL" on a confirmation screen is selected. If YES in step V24, the flow returns to step V1 to allow the voter to select a candidate again. If NO in step V24, the flow returns to step V3.

If it is determined in step V19 that the display screen is not the initial screen, the flow advances to step V25. In step V25, it is checked whether the display screen is the error screen. If NO in step V25, the flow returns to step v3. If YES in step V25, the flow advances to step V26. In step v26, it is checked whether the icon "CANCEL" is selected. If YES in step V26, it is determined that the voter confirms the error, and the flow returns to step V1. If other regions are designated, it is determined that the voter has not confirmed the error yet, and the flow returns to step V3 while the error screen is displayed.

As has been described above, according to this embodiment, a voter can perform a voting operation by writing a symbol in a symbol entry column displayed on the tablet with the pen.

In the above-described embodiment, a selected candidate is specified by counting the number of coordinate points of a symbol written in a symbol entry column. The following methods of identifying a symbol may be employed. In one method, only a specific symbol is written, and character (symbol) recognition processing is performed. In another method, a symbol entry region to which the center of gravity or central position of a symbol belongs is specified as a selected symbol entry region.

Figure 69:
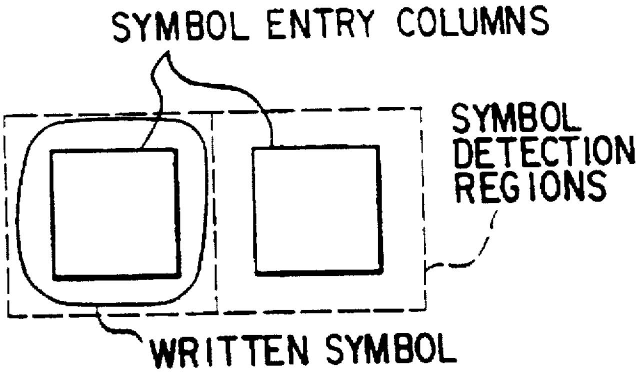
Figure 66:
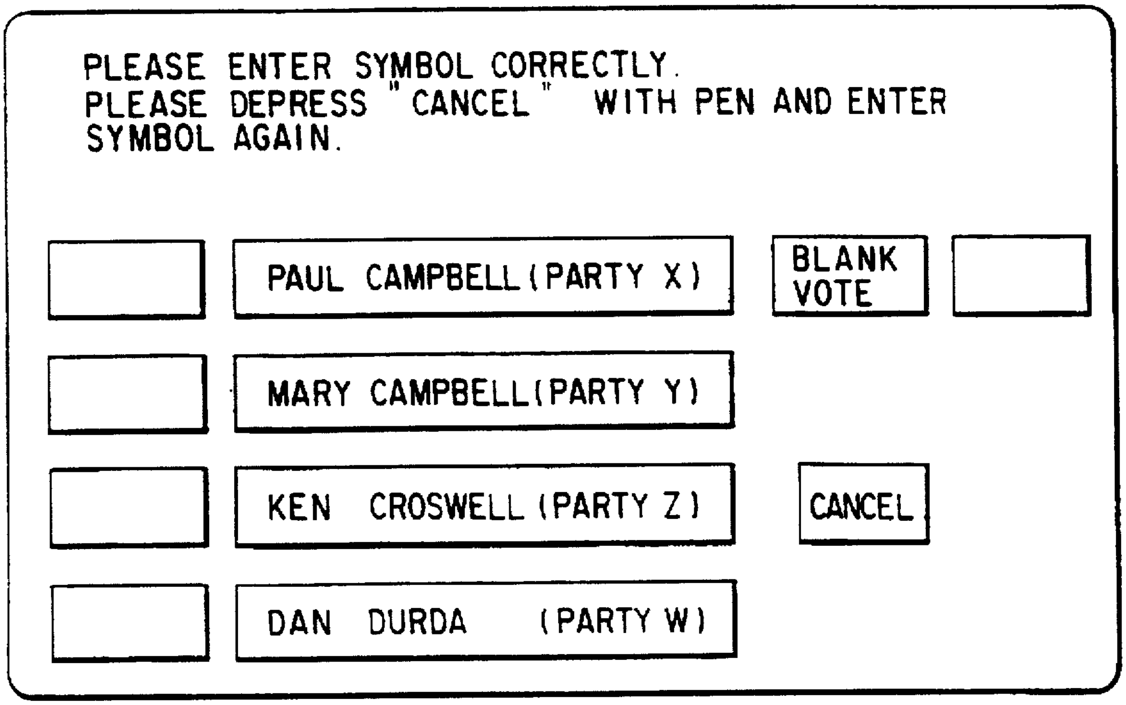
FIG. 66 is a view showing an error screen of the election terminal apparatus according to the eighteenth embodiment.

If a symbol is written over a plurality of symbol entry columns, an error screen may always be displayed. Alternatively, as shown in FIG. 69, a symbol detection region may be set to be larger than a displayed symbol entry column so that even if, for example, a symbol is written to enclose a symbol entry column, the corresponding candidate can be discriminated.

Figure 70:
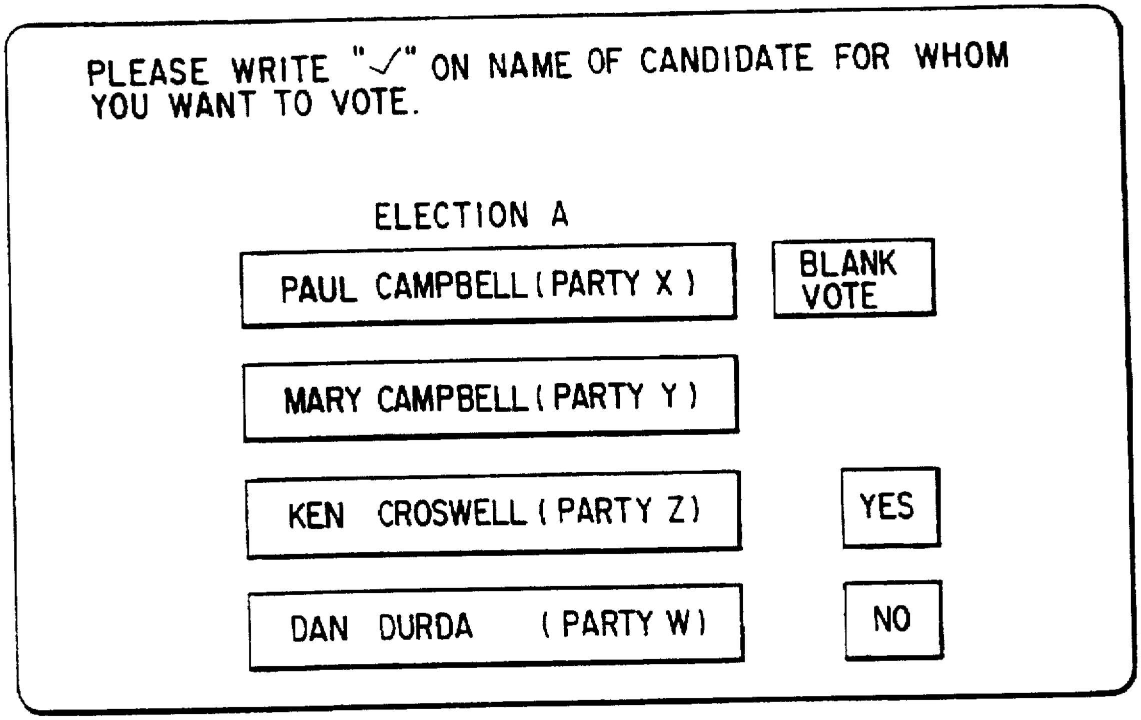
FIG. 70 is a view showing a modification of the initial screen shown in FIG. 60.
Figure 71:
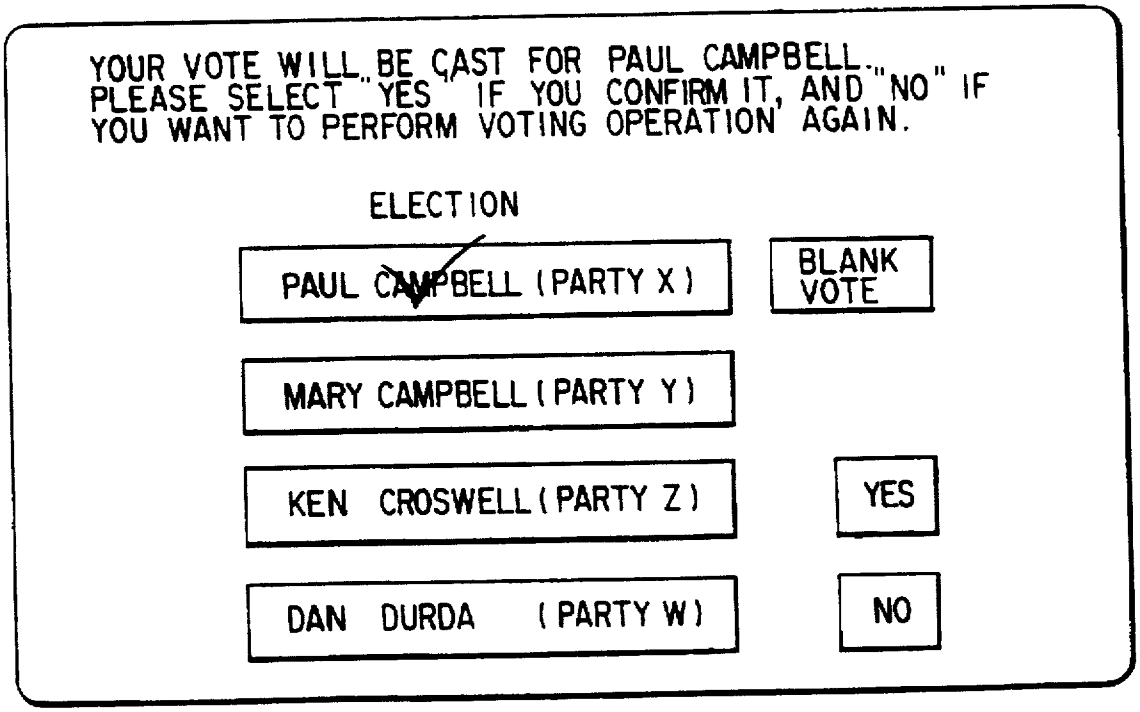
FIG. 71 is a view showing a modification of the confirmation screen shown in FIG. 68.

Furthermore, an initial screen having no symbol entry column may be displayed, and a symbol may be directly written on a "candidate" icon. FIG. 70 shows such an initial screen. FIG. 71 shows a confirmation screen in such a case.

(Nineteenth Embodiment)

The nineteenth embodiment of the present invention, which is associated with a totaling terminal apparatus for totaling vote count data acquired by election terminal apparatuses, will be described below with reference to the accompanying drawings.

Figure 72:
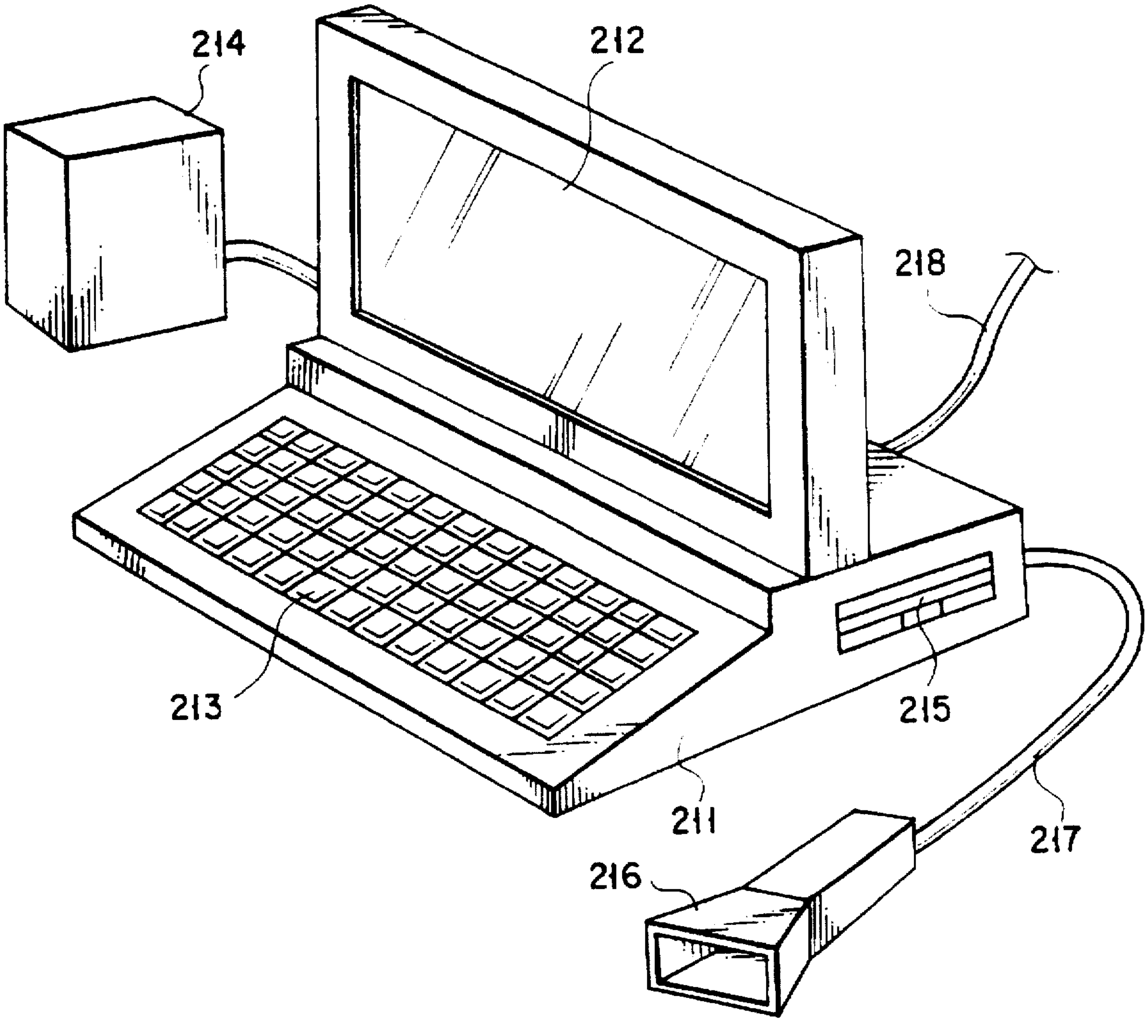
FIG. 72 is a perspective view showing an outer appearance of a totaling terminal apparatus according to the nineteenth embodiment of the present invention.

FIG. 72 shows an outer appearance of the totaling terminal apparatus. Reference numeral 211 denotes a terminal apparatus main body. The terminal apparatus main body 211 includes a liquid crystal panel 212 with a backlight, a keyboard 213 for entering various commands and data, and a floppy disk drive 215 for reading vote data from a floppy disk sent from a polling station. The terminal apparatus main body 211 is connected to a hard disk drive 214 for storing vote data sent from each polling station, and a bar code reader 216 for reading vote data sent, as bar codes, from a polling station, and is also connected to the election terminal apparatus in each polling station and the host computer through a cord 218 and a network.

Figure 73:
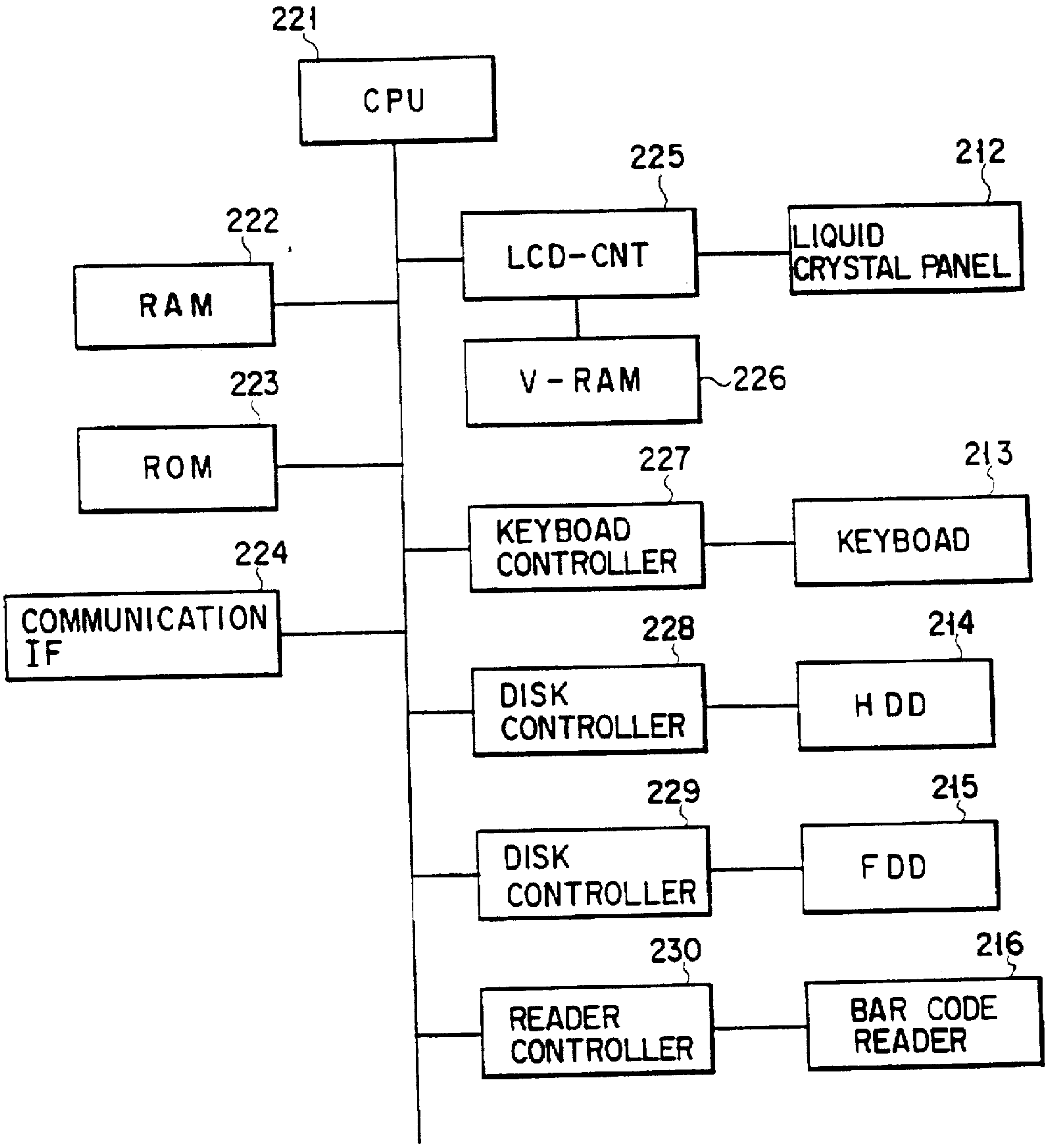
FIG. 73 is a block diagram of the totaling terminal apparatus according to the nineteenth embodiment.

FIG. 73 shows the circuit arrangement of the totaling terminal apparatus. Referring to FIG. 73, reference numeral 221 denotes a microprocessor (CPU) for controlling the overall operation of the totaling terminal apparatus. The CPU 221 is connected to the following components through a bus: a RAM 222, a ROM 223, a communication IF 224, a liquid crystal controller (LCD-CNT) 225, a keyboard controller (keyboard-CNT) 227, disk controllers (disk-CNTs) 228 and 229, and a reader controller (reader-CNT) 230.

The RAM 222 is a memory capable of read/write operations. The RAM 222 stores operation programs and various data read out from the ROM 223 and used by the CPU 221, data key-input through the keyboard 213, and the like.

The ROM 223 is a read-only memory for storing a diagnosis program used after the power switch of the apparatus is turned on, a boot program for starting the system, a data loading program used for totaling of vote data, a data read processing program, an analysis processing program, a sort processing program, a totaling processing program, an interim result display program, and the like.

The communication IF 224 includes a communication unit of a wired or radio scheme, and controls data communication with an external election terminal apparatus or a host computer (neither of which are shown). The liquid crystal controller 225 develops display data in a VRAM 226, and controls the liquid crystal panel 212 on the basis of the developed display data.

The keyboard controller 227 decodes data input through the keyboard 213, and supplies the input data to the CPU 221. The disk controllers 228 and 229 control read/write operations of the hard disk drive 214 and the floppy disk drive 215. The reader controller 230 controls the bar code reader 216.

Figure 74:
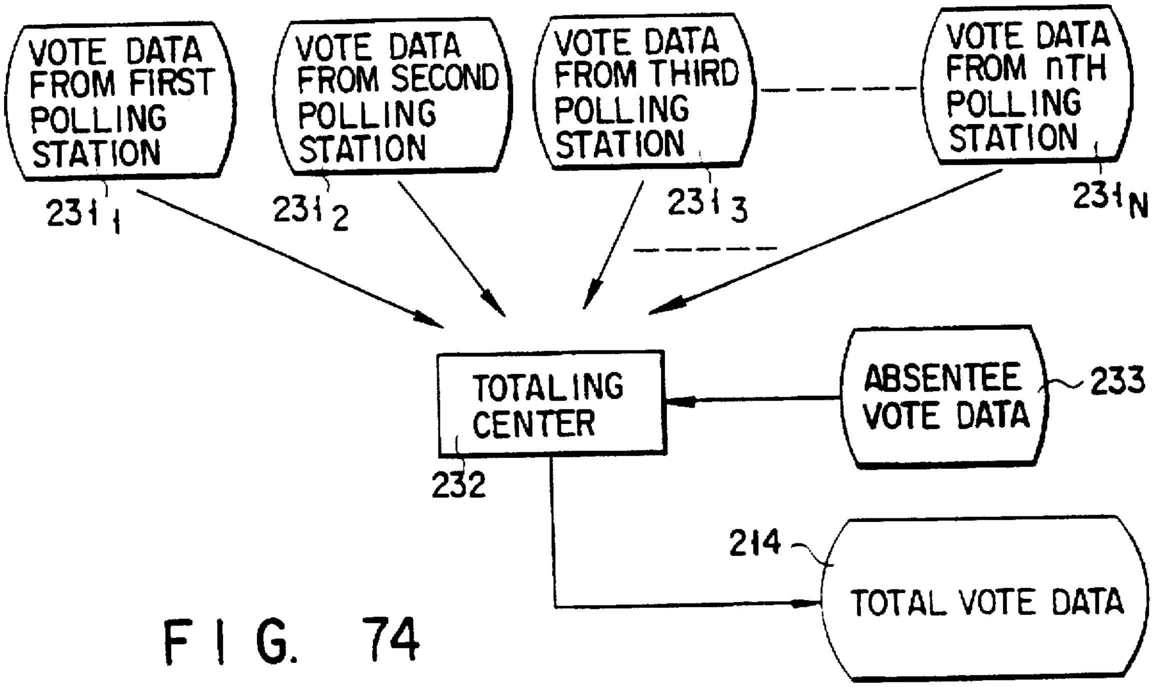
FIG. 74 is a view showing the flows of vote data.

The flows of vote data sent from the respective polling stations to the totaling terminal apparatus will be described below with reference to FIG. 74. As shown in FIG. 74, vote data obtained at n (n is two or more) polling stations $231_1$ to $231_n$ are directly sent to the totaling terminal apparatus in a totaling center 232 through a network. Alternatively, such vote data are sent by means of recording media such as floppy disks or bar codes. In addition to the vote data from the polling stations $231_1$ to $231_n$, absentee vote data 233 and the like are supplied to the totaling terminal apparatus.

Figure 75:
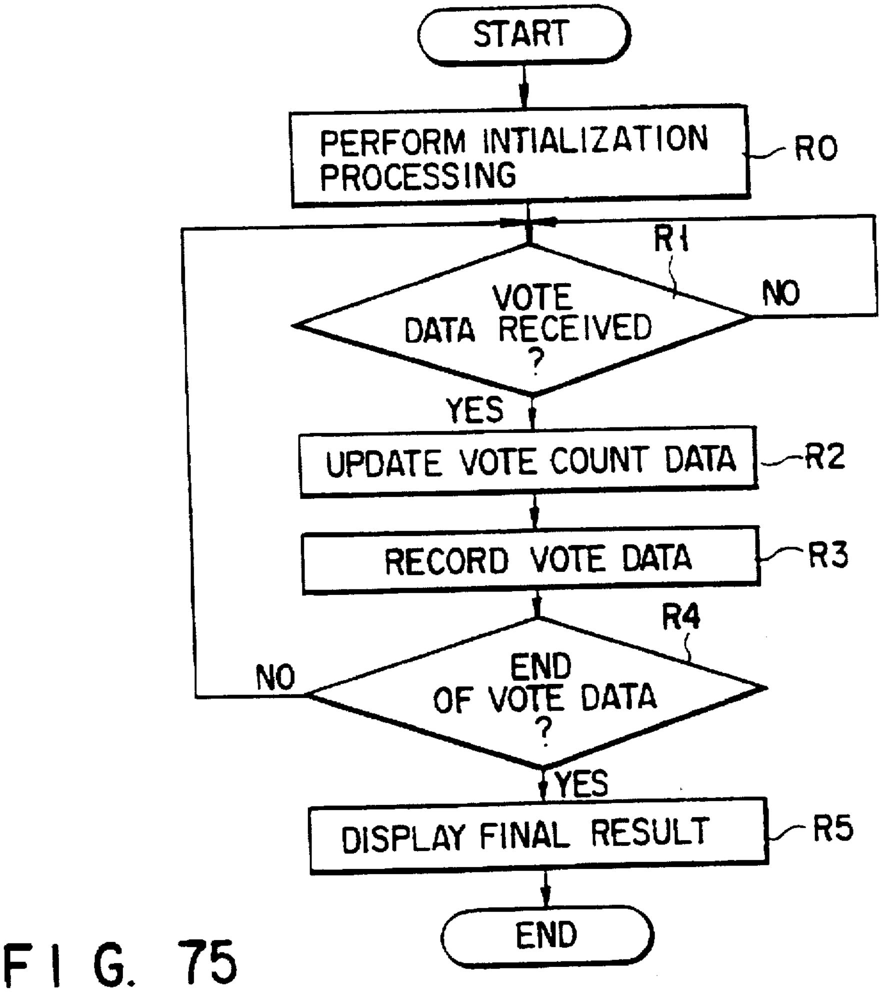
FIG. 75 is a flow chart showing an operation sequence (totaling processing) of the totaling terminal apparatus according to the nineteenth embodiment.

An operation of the totaling terminal apparatus according to the nineteenth embodiment of the present invention will be described below with reference to FIG. 75.

When the totaling terminal apparatus is started, variables used for a totaling operation, such as the vote count of each candidate, are initialized (step R0).

In the first to eighteenth embodiments, each election terminal apparatus obtains the vote count of each candidate and stores it in a vote count buffer 318. Therefore, vote data (subtotals) totaled by each election terminal apparatus are sent to the totaling terminal apparatus. The totaling terminal apparatus receives the vote data in units of polling stations through the network or recording media such as floppy disks (step R1).

The totaling terminal apparatus temporarily stores the received data in the RAM 222, and updates the vote counts of the respective candidates on the basis of the received data (step R2). Thereafter, the totaling terminal apparatus causes the hard disk drive 214 to store the received data stored in the RAM 222 (step R3). The totaling terminal apparatus checks in step R4 whether data to be received are left, i.e., whether there is any polling station from which no vote data have been received. If there is any polling station from which no vote data have been received, the flow returns to step R1 to wait for the reception of vote data.

If it is determined in step R4 that vote data from all the polling stations are received, and calculation of the vote count of each candidate is completed, the vote count of each candidate is displayed, as the final vote count data, on the liquid crystal panel 212 (step R5), thus terminating the totaling processing.

As described above, if each election terminal apparatus calculates subtotals of vote counts in units of candidates, the load of the totaling terminal apparatus is greatly reduced, and vote count data can be quickly obtained.

(Twentieth Embodiment)

In the first to nineteenth embodiments, each election terminal apparatus calculates subtotals of vote counts in units of candidates. However, for example, each election terminal apparatus may simply store the coordinates of each position designated by each voter or image data (a set of coordinate data) of each character written by each voter in an election information file 17. In this case, a totaling terminal apparatus performs recognition, totaling, and the like of the contents of designation by each voter and characters written by each voter. The twentieth embodiment associated with a totaling terminal apparatus having such a function will be described below.

The outer appearance and circuit arrangement of the totaling terminal apparatus of this embodiment are the same as those of the totaling terminal apparatus described with reference to FIGS. 72 and 73, and hence a description thereof will be omitted.

As shown in FIG. 74, vote data obtained at n (n is two or more) polling stations $231_1$ to $231_n$ are supplied to the totaling terminal apparatus of a totaling center 232 directly through a network or by using recording media such as floppy disks. The vote data sent from the polling stations $231_1$ to $231_n$ are collectively stored in a hard disk drive 214. Absentee vote data 233 and the like are also stored in the hard disk drive 214. The hard disk drive 214 stores the received vote data while sequentially updating the data in the order of reception, but does not discriminate, for example, between vote data sent from a given polling station and vote data sent from another polling station and between normal vote data and absentee vote data.

An operation sequence in which the totaling terminal apparatus loads vote data in the hard disk drive 214, and performs totaling processing to obtain final vote count data will be described below with reference to FIG. 76.

Figure 76:
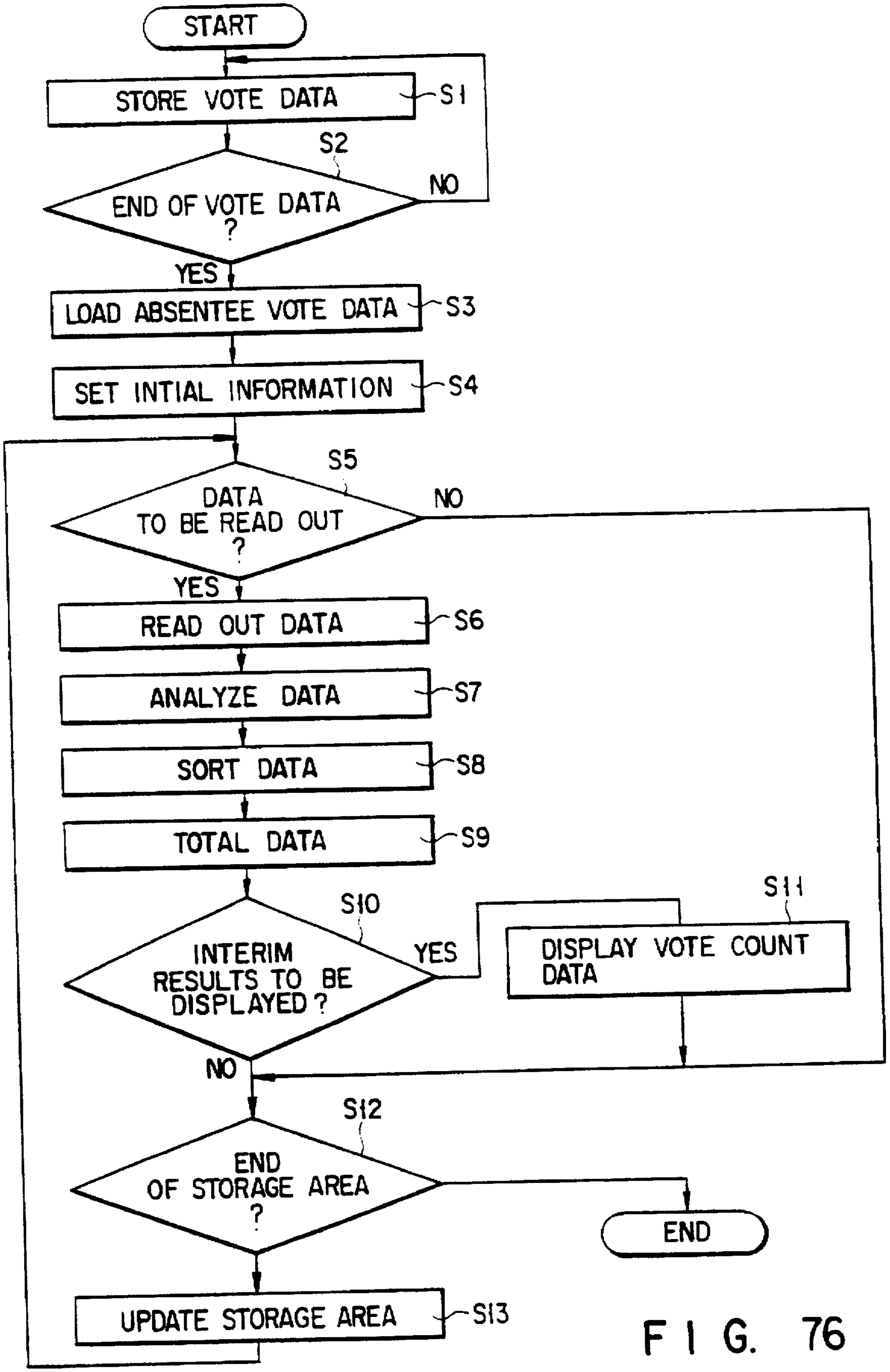
FIG. 76 is a flow chart showing an operation sequence (totaling processing) of a totaling terminal apparatus according to the twentieth embodiment of the present invention.

Referring to FIG. 76, the totaling terminal apparatus causes the hard disk drive 214 to sequentially store vote data and data indicating polling stations (step S1). As described above, vote data are supplied to the totaling terminal apparatus through the network or by using recording media such as floppy disks. When storage of data obtained at one polling station in the hard disk drive 214 is completed, it is checked whether all vote data are completely stored (step S2). This decision can be easily realized by, for example, searching out data indicating a polling station name stored in the hard disk drive 214. If It is determined in step S2 that data to be stored is left, the flow return to step S1 to continue storage processing.

When storage of vote data from all polling stations is completed, absentee vote data are stored in the hard disk drive 214 (step S3). With the above-described operation, storage of vote data in the hard disk drive 214 is completed.

Subsequently, in order to perform ballot counting, a storage area for vote data read out from the hard disk drive 214 is ensured, the number of data to be read out by one read operation is set, and initial information such as the vote count of each candidate is set (step S4).

It is confirmed that vote data to be read out is stored in the hard disk drive 214 (step S5). Vote data is read out from the hard disk drive 214 (step S6). The read vote data is analyzed (step S7).

If the vote data read out from the hard disk drive 214 is image data of written characters representing a candidate name or a party name, this analysis processing is mainly constituted by character recognition processing. If the read vote data is coordinate data indicating an icon representing a candidate name or a party name, this analysis processing is mainly constituted by processing of determining a region (icon) to which a position indicated by a pen 3 belongs.

Subsequently, sort processing is executed on the basis of the analysis result obtained in step S7 (step S8). This sort processing is executed as follows. (1) If the coordinates obtained by the analysis result represent a position in a region to which an icon representing a specific candidate belongs, sorting is performed to increment the vote count of the corresponding candidate by one. (2) If the characters recognized by the analysis processing correspond to a proper candidate or party name, sorting is performed to increment the vote count of the corresponding candidate by one. (3) If there is no candidate name exactly coinciding with the characters recognized by the analysis processing, or a plurality of candidate names correspond thereto, the vote is sorted in accordance with preset rule information.

An example of this sort processing will be described with reference to FIGS. 77 and 78A to 78C. Assume, in the following description, that there are two candidates, Dan Durda and Dan Croswell. FIG. 77 shows rule information for sort processing. As shown in FIG. 77, a list of a proper name and valid names is arranged for each candidate. A list of valid names includes information indicating whether each name corresponds to other candidates. FIGS. 78A to 78C respectively show characters recognized by the data analysis processing in step S7.

"Dan Durda" shown in FIG. 78A coincides with the proper name of a candidate whose name is "Dan Durda" according to the rule shown in FIG. 77. Therefore, the vote is sorted into the candidate "Dan Durda" to increment his vote count.

"Dan" shown in FIG. 78B is sorted into both the candidate names "Dan Durda" and "Dan Croswell" according to the rule information in FIG. 77. For example, such votes may be counted, and the count values (vote counts) may be distributed to the two candidates in accordance with the ratio of the vote count of one candidate to the vote count of the other candidate after totaling of all other votes is completed.

"D. Durda" shown in FIG. 78C is sorted into "Dan Durda" to increment his vote count according to the rule information in FIG. 77.

If there is no candidate corresponding to the recognition result, the vote is regarded as an "invalid vote". If no candidate name is written, the vote is regarded as a "blank vote".

When sort processing (step S8 is completed, totaling processing is executed in accordance with the sorting result (step S9). In this totaling processing, the vote count of the candidate to which the vote has been cast is incremented by one.

When the totaling processing (step S9) is completed, it is checked whether to display interim results of totaling (step S10). When, for example, the processed vote count (the number of votes counted) reaches a predetermined value, a predetermined time has come, or a command for displaying interim results is input through a keyboard 213, it is determined that display is performed. If it is determined that the interim results are displayed, the vote count data at this time is displayed on the liquid crystal panel 212 (step S11).

After the interim results are displayed, or it is determined that the interim results are not displayed, it is checked in step S12 whether vote data to be read out is left in the hard disk drive 214. If YES in step S12, the storage area is updated (step S13), and the processing from step S5 is executed again.

The processing of updating the storage area in step S13 is performed to prevent vote data obtained at one polling station from being intensively read out. As an updating method, for example, the read position within the storage area of the hard disk drive 214 in which vote data is stored is sequentially skipped at intervals of a predetermined skip width, or the read position is irregularly changed by using random numbers.

When the above processing is repeatedly executed, and it is determined in step S12 that there is no further vote data to be read out, totaling processing is terminated. Vote data count, i.e., the vote count of each candidate, an invalid vote count, and the like, is displayed on the liquid crystal panel 212.

Figure 79:
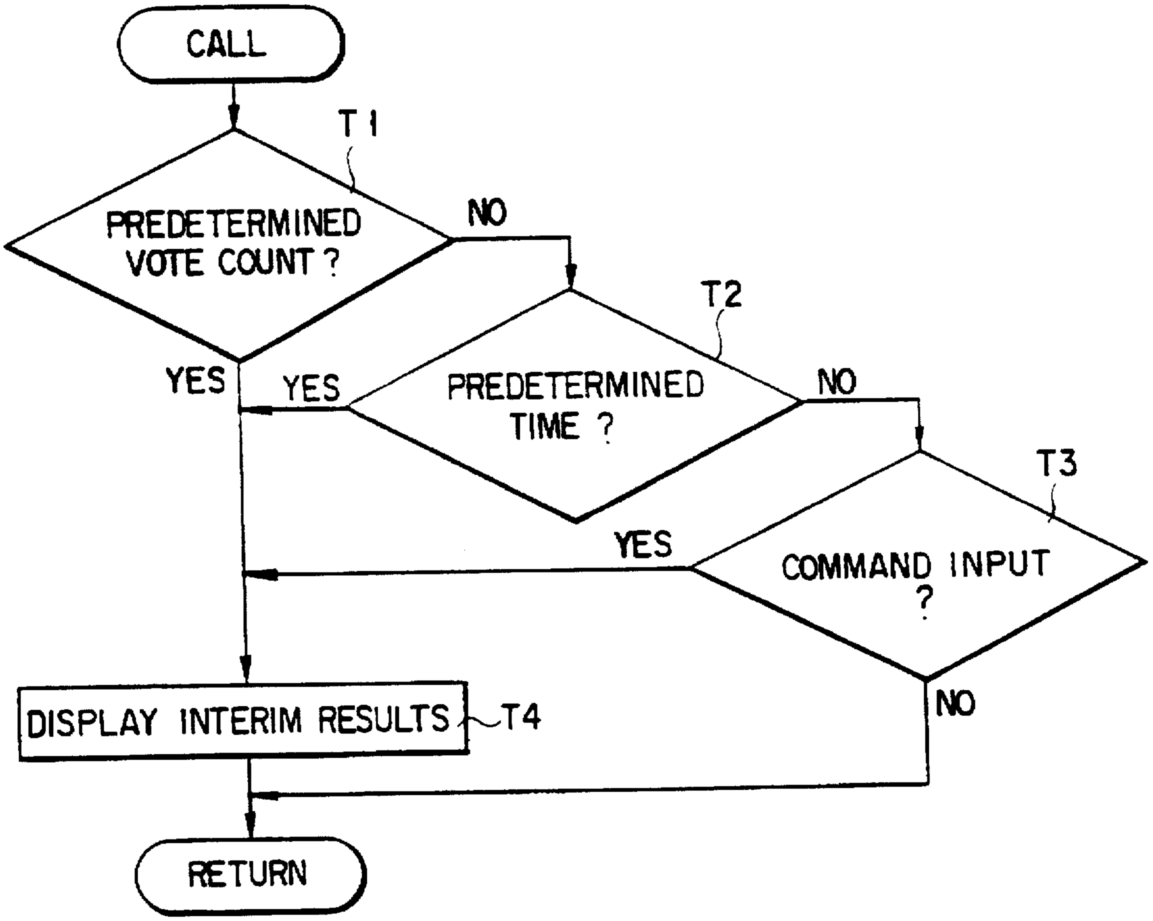
FIG. 79 is a flow chart showing a progress display routine.

In FIG. 76, the processing of determining whether to display interim results is incorporated in the totaling processing. However, the processing of determining whether to display interim results may be arranged into a subroutine. FIG. 79 shows such a subroutine. When this subroutine is called, it is checked whether the number of votes counted (or the vote count of a given candidate) exceeds a preset value, whether a predetermined time has come, or whether a predetermined command is input through the keyboard 213 (steps T1 to T3). When one of the above conditions is satisfied, vote count data is displayed on the liquid crystal panel 212 (step T4). If display of interim results is completed, or none of the conditions are satisfied, the flow returns to the original routine. The subroutine shown in FIG. 79 is called by timer interruption, hardware interruption through the keyboard, or the like.

According to the eighteenth embodiment, since the totaling terminal apparatus has a character recognition function, a totaling function, and the like, the arrangement of each election terminal apparatus is simplified, thus simplifying the overall arrangement of the electronic voting system. In addition, totaling errors and the like are prevented by the embodiment.

The present invention is not limited to the above-described embodiments. For example, the tablet 5 may be of a pressure-sensitive type, an opaque type, or an electromagnetic induction type. The pen 3 may be of a wireless type. The display unit may be constituted by a plasma display, a cathode ray tube (CRT), or the like. A display screen format other than the one used in each embodiment may be used.

Although a region used for voting and a region for displaying detailed information are arranged on the same screen in each embodiment described above, they may be arranged on different screens. In each embodiment described above, when the confirmation button is operated by a voter, detailed information is cleared. However, detailed information may be cleared after it is displayed for a predetermined time by using a timer.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. An election terminal apparatus having a display unit into which a display unit and a coordinate input unit are integrated, comprising:

storage means for registering voting data;

a candidate database for storing candidate data and detailed data of the candidate data;

first screen display control means for displaying a voting menu indicating a plurality of election types to be performed on a same day on the display unit;

election type recognizing means for recognizing by coordinate-designating positional data of the coordinate input unit that one of the election types has been selected from the voting menu displayed by the first screen display control means;

second screen display control means for displaying on the display unit the candidate read out from the candidate database in accordance with the recognized election type data;

candidate recognizing means for recognizing by the coordinate-designating positional data for the coordinate input that a candidate has been selectively specified from the candidate data displayed by the second screen display control means;

third screen display control means for displaying, on the display unit and in accordance with the recognized candidate data, the detailed data of the selectively-specified candidate read out from the candidate database;

voting-confirmation-specifying-recognizing means for recognizing by the coordinate-designating positional data of the coordinate input unit that the voting has been confirmed in accordance with the detailed data displayed by the third screen display control means;

registration control means for registering the voting data according to the recognized confirmation-specifying data into the storage means; and checking means for checking a presence or absence of election voting for which the voting input has not been completed from the voting menu indicating a plurality of election voting, said checking means including means for displaying a menu of the election voting for which voting input has been completed in a display format different from other election voting for which the voting input has not been completed, and for invalidating the selection operation of the menu for which the voting input has been completed.

* * * * *